US006869633B2

(12) United States Patent
Sus et al.

(10) Patent No.: US 6,869,633 B2
(45) Date of Patent: Mar. 22, 2005

(54) AUTOMATED FOOD FRYING DEVICE AND METHOD

(75) Inventors: Gerald A. Sus, Frankfort, IL (US); Ron Dorsten, Oak Brook, IL (US); Henry T. Ewald, Roselle, IL (US); Jenny Hong, Palatine, IL (US); Glenn Schackmuth, Montgomery, IL (US); Mario G. Ceste, Wallingford, CT (US); Curtis Clarence Pinnow, Libertyville, IL (US); John M. Corliss, Lynn, MA (US); Joseph Gerstmann, Framingham, MA (US); James Lozouski, Marlborough, MA (US); William Day, New Port Richey, FL (US); Doug Jones, New Port Richey, FL (US); Roberto Nevarez, Hudson, FL (US); Jerry Sank, Palm Harbor, FL (US); Keith Stanger, New Port Richey, FL (US)

(73) Assignee: Restaurant Technology, Inc., Oakbrook, IL (US)

( * ) Notice: Subject to any disclaimer, the term of this patent is extended or adjusted under 35 U.S.C. 154(b) by 47 days.

(21) Appl. No.: 10/127,203

(22) Filed: Apr. 22, 2002

(65) Prior Publication Data

US 2003/0207009 A1 Nov. 6, 2003

(51) Int. Cl.[7] .............................. A23L 1/01; A47J 37/12
(52) U.S. Cl. .......................... 426/438; 99/403; 99/407; 99/409; 426/439
(58) Field of Search ................................. 426/438, 439; 99/330, 403, 407, 409

(56) References Cited

U.S. PATENT DOCUMENTS 535,847 A 3/1895 Mertz
1,755,699 A 4/1930 Loehr
1,927,318 A 9/1933 McEntee (List continued on next page.)

FOREIGN PATENT DOCUMENTS

| EP | 0 335 698 | 10/1989 |
|---|---|---|
| FR | 2 491 031 | 4/1982 |
| GB | 2 200 039 A | 7/1988 |
| JP | 52.2954 | 11/1977 |
| WO | WO 86/07648 | 12/1986 |

OTHER PUBLICATIONS

Patent Cooperation Treaty, International Searching Authority, International Search Report, Aug. 28, 2003, PCT/US03/12169.

Primary Examiner—George C. Yeung
(74) Attorney, Agent, or Firm—Ryndak & Suri

(57) ABSTRACT

An automated food processing system and method is provided that allows food to be dispensed, fried and packaged in a suitable container, which may be an individual portion-sized container. In one embodiment, the system includes separate automated modules for dispensing, frying and packaging the food.

In one embodiment, an automated dispensing device dispenses a predetermined portion of food from a bulk storage container or food dispensing magazine. Food is dispensed from the automated dispensing device to an automated fry device that can include at least one circular fry wheel having a plurality of food containing compartments. After the food is fried it is dispensed from the fry device to an automated packaging device. The automated packaging device dispenses food to a container that may be an individual portion-sized container that is retrieved, erected and held into position for filling by an automated container handling system. After a food container is filled, a conveyor system transports the filled container to a suitable pick-up location.

14 Claims, 42 Drawing Sheets

U.S. PATENT DOCUMENTS

| | | | |
|---|---|---|---|
| 2,466,386 A | 4/1949 | Curioni | 198/52 |
| 2,807,203 A | 9/1957 | Buechele et al. | 99/404 |
| 2,906,850 A | 9/1959 | Meletio | 219/43 |
| 3,012,697 A | 12/1961 | Rouse, Jr. et al. | 222/181 |
| 3,183,856 A | 5/1965 | Jolly | 107/1 |
| 3,200,737 A | 8/1965 | Ferenc | 99/355 |
| 3,227,313 A | 1/1966 | Morena | 222/57 |
| 3,237,804 A | 3/1966 | Bardy et al. | 221/81 |
| 3,347,152 A | 10/1967 | Congelli et al. | 99/334 |
| 3,369,479 A | 2/1968 | Oppenheimer | 99/325 |
| 3,391,633 A | 7/1968 | Boosalis | 99/357 |
| 3,442,423 A | 5/1969 | Cozad | 222/70 |
| 3,448,677 A | 6/1969 | Dexters | 99/336 |
| 3,456,425 A | 7/1969 | Pezza | 53/236 |
| 3,474,891 A | 10/1969 | Kamila | 198/33 |
| 3,505,072 A | 4/1970 | Rullman | 99/1 |
| 3,525,299 A | 8/1970 | Gouwens | 99/336 |
| 3,558,086 A | 1/1971 | Kraly | 244/118 |
| 3,574,270 A | 4/1971 | Rosendahl | 53/281 |
| 3,591,045 A | 7/1971 | Sturrock | 221/175 |
| 3,611,984 A | 10/1971 | Angold | 118/19 |
| 3,633,245 A | 1/1972 | Partos | 17/32 |
| 3,641,263 A | 2/1972 | Rhoads et al. | 178/6 |
| 3,645,196 A | 2/1972 | Johnston et al. | 99/404 |
| 3,653,540 A | 4/1972 | Offutt | 221/75 |
| 3,653,541 A | 4/1972 | Crum | 221/150 |
| 3,685,432 A | 8/1972 | Hoeberigs | 99/357 |
| 3,690,247 A | 9/1972 | Van Cleven et al. | 99/355 |
| 3,693,840 A | 9/1972 | Starr | 222/193 |
| 3,716,383 A | 2/1973 | Yamamura | 99/333 |
| 3,717,127 A | 2/1973 | Porterfield | 119/52 |
| 3,734,355 A | 5/1973 | Yamada | 222/167 |
| 3,797,710 A | 3/1974 | Soodalter | 222/219 |
| 3,828,971 A | 8/1974 | Offutt et al. | 221/75 |
| 3,830,264 A | 8/1974 | Billett et al. | 141/1 |
| 3,861,561 A | 1/1975 | Wittern et al. | 221/75 |
| 3,883,039 A | 5/1975 | Wittern et al. | 221/75 |
| 3,896,715 A | 7/1975 | Mascret | 99/356 |
| 3,908,531 A | 9/1975 | Morley | 99/336 |
| 3,935,966 A | 2/1976 | Pitel et al. | 221/75 |
| 3,946,702 A | 3/1976 | Mazzini | 119/51.13 |
| 3,952,915 A | 4/1976 | Pitel et al. | 221/75 |
| 3,972,418 A | 8/1976 | Short | 211/78 |
| 4,001,451 A * | 1/1977 | Veeneman et al. | 426/438 |
| 4,028,024 A | 6/1977 | Moreland | 425/133.1 |
| 4,038,433 A | 7/1977 | Manser et al. | 426/615 |
| 4,061,245 A | 12/1977 | Lotspeich | 221/75 |
| 4,089,299 A | 5/1978 | Suchowski | 119/51 |
| 4,095,723 A | 6/1978 | Lerner | 222/56 |
| 4,104,958 A | 8/1978 | Manser et al. | 99/355 |
| 4,109,835 A | 8/1978 | Castro | 222/449 |
| 4,148,412 A | 4/1979 | Lotspeich | 221/75 |
| 4,149,653 A | 4/1979 | Lennartson | 221/75 |
| 4,165,823 A | 8/1979 | Olsson | 222/252 |
| 4,171,067 A | 10/1979 | Faulkner et al. | 222/1 |
| 4,228,730 A | 10/1980 | Schindler et al. | 99/329 |
| 4,240,563 A | 12/1980 | Lennartson | 221/75 |
| 4,247,019 A | 1/1981 | Lerner | 222/56 |
| 4,258,860 A | 3/1981 | Boettcher | 221/75 |
| 4,266,691 A | 5/1981 | Wolwowicz | 222/77 |
| 4,270,669 A | 6/1981 | Luke | 221/13 |
| 4,312,460 A | 1/1982 | Boettcher | 221/75 |
| 4,359,014 A | 11/1982 | Molaug et al. | 119/51 |
| 4,369,896 A | 1/1983 | Boettcher | 221/75 |
| 4,382,527 A | 5/1983 | Lerner | 222/56 |
| 4,385,713 A | 5/1983 | Boettcher | 221/75 |
| 4,436,194 A | 3/1984 | Hanley | 194/63 |
| 4,438,683 A | 3/1984 | Bartfield | 99/330 |
| 4,446,775 A | 5/1984 | Reed | 99/353 |
| 4,478,140 A | 10/1984 | Bullock | 99/404 |
| 4,489,647 A | 12/1984 | Stamps et al. | 99/336 |
| 4,499,818 A | 2/1985 | Strong | 99/483 |
| 4,502,372 A | 3/1985 | Mariotti | 99/330 |
| 4,505,193 A | 3/1985 | Mariotti | 99/330 |
| 4,506,802 A | 3/1985 | Lotspeich | 221/75 |
| 4,529,107 A | 7/1985 | Morine et al. | 222/314 |
| 4,553,222 A | 11/1985 | Kurland et al. | 364/900 |
| 4,554,955 A | 11/1985 | von Lersner et al. | 141/1 |
| 4,558,804 A | 12/1985 | Keck | 222/130 |
| 4,560,088 A | 12/1985 | Tan | 221/75 |
| 4,561,453 A | 12/1985 | Rothchild | 131/304 |
| 4,574,558 A | 3/1986 | Utsumi | 53/128 |
| 4,580,698 A | 4/1986 | Ladt et al. | 222/55 |
| 4,582,023 A | 4/1986 | Zumbahlen et al. | 119/53.5 |
| 4,589,571 A | 5/1986 | Sykes | 221/75 |
| 4,627,785 A | 12/1986 | Monforte | 414/730 |
| 4,646,627 A | 3/1987 | Bartfield et al. | 99/330 |
| 4,665,862 A | 5/1987 | Pitchford, Jr. | 119/51.11 |
| 4,694,742 A | 9/1987 | Dover | 99/404 |
| 4,700,617 A | 10/1987 | Lee et al. | 99/327 |
| 4,712,272 A | 12/1987 | Soodalter | 17/32 |
| 4,719,850 A | 1/1988 | Sowell | 99/404 |
| 4,722,267 A | 2/1988 | Galockin et al. | 99/357 |
| 4,742,455 A | 5/1988 | Schreyer | 364/400 |
| 4,748,902 A | 6/1988 | Maurantonio | 99/326 |
| 4,757,915 A | 7/1988 | Albright et al. | 221/75 |
| 4,809,881 A | 3/1989 | Becker | 221/224 |
| 4,852,471 A | 8/1989 | Lansing | 99/330 |
| 4,874,049 A | 10/1989 | Kee et al. | 177/59 |
| 4,883,508 A | 11/1989 | Lansing | 55/322 |
| 4,889,077 A | 12/1989 | Possis | 119/51.11 |
| 4,911,068 A | 3/1990 | Koether et al. | 99/325 |
| 4,922,435 A | 5/1990 | Cahlander et al. | 364/513 |
| 4,930,663 A | 6/1990 | Ficken | 221/75 |
| 4,973,492 A | 11/1990 | Gibson | 426/461 |
| 4,976,376 A | 12/1990 | Williams | 221/24 |
| 4,979,864 A | 12/1990 | Cahlander et al. | 414/421 |
| RE33,580 E | 4/1991 | Fraioli | 426/242 |
| 5,052,288 A | 10/1991 | Marquez et al. | 99/407 |
| 5,085,138 A | 2/1992 | Fehr et al. | 99/450 |
| 5,104,002 A | 4/1992 | Cahlander et al. | 222/1 |
| 5,106,239 A | 4/1992 | Krebsbach | 406/63 |
| 5,132,914 A | 7/1992 | Cahlander et al. | 364/478 |
| 5,134,927 A | 8/1992 | McCarthy, III. et al. | 99/427 |
| 5,142,968 A | 9/1992 | Caron et al. | 99/404 |
| 5,148,737 A | 9/1992 | Poulson | 99/327 |
| 5,160,068 A | 11/1992 | Fishman et al. | 222/352 |
| 5,172,328 A | 12/1992 | Cahlander et al. | 364/478 |
| 5,186,355 A | 2/1993 | VonDelinde et al. | 221/75 |
| 5,189,944 A | 3/1993 | Rasmussen et al. | 99/334 |
| 5,191,918 A | 3/1993 | Cahlander et al. | 141/1 |
| 5,197,376 A | 3/1993 | Bird et al. | 99/330 |
| 5,199,381 A | 4/1993 | Masopust | 119/51.04 |
| 5,224,415 A | 7/1993 | McFadden et al. | 99/357 |
| 5,230,279 A | 7/1993 | McFadden et al. | 99/334 |
| 5,241,899 A | 9/1993 | Kuhlman | 99/355 |
| 5,246,118 A | 9/1993 | Mosher | 209/592 |
| 5,247,810 A | 9/1993 | Fenty | |
| 5,263,437 A | 11/1993 | Murphrey | 119/53.5 |
| 5,272,961 A | 12/1993 | Campbell et al. | 99/353 |
| 5,275,092 A * | 1/1994 | Fauteux | 99/407 |
| 5,275,093 A | 1/1994 | Chiu | 99/408 |
| 5,282,498 A | 2/1994 | Cahlander et al. | 141/129 |
| 5,305,615 A | 4/1994 | McFadden et al. | |
| 5,314,954 A | 5/1994 | Ohishi et al. | 525/132 |
| 5,319,939 A | 6/1994 | McFadden et al. | 62/63 |
| 5,322,283 A | 6/1994 | Ritchie et al. | 273/177 |
| 5,353,847 A | 10/1994 | Cahlander et al. | |
| 5,353,959 A | 10/1994 | Center et al. | 222/66 |
| 5,365,831 A | 11/1994 | Kuhlman | 99/355 |
| 5,367,949 A | 11/1994 | Nitschke et al. | |

| Patent No. | Date | Inventor | Class |
|---|---|---|---|
| 5,380,957 A | 1/1995 | Giles | 177/16 |
| 5,400,838 A | 3/1995 | Schjerven et al. | |
| 5,405,059 A | 4/1995 | Wadell | 222/306 |
| 5,466,894 A | 11/1995 | Naef | 177/59 |
| 5,469,988 A | 11/1995 | Huang | 222/1 |
| 5,473,866 A | 12/1995 | Maglecic et al. | 53/511 |
| 5,553,736 A | 9/1996 | Healis | 221/62 |
| 5,554,221 A | 9/1996 | Center et al. | 118/19 |
| 5,580,598 A | 12/1996 | Benson et al. | 426/438 |
| 5,586,486 A | 12/1996 | Nitschke et al. | 99/330 |
| 5,588,394 A | 12/1996 | Balistreri | 119/51.11 |
| 5,605,091 A | 2/1997 | Garber | 99/330 |
| 5,607,712 A | 3/1997 | Bourne | 426/321 |
| 5,639,995 A | 6/1997 | Mosher | 177/64 |
| 5,690,018 A | 11/1997 | Hansen | 99/330 |
| 5,706,976 A | 1/1998 | Purkey | 221/6 |
| 5,721,000 A | 2/1998 | Center et al. | 426/289 |
| 5,735,192 A | 4/1998 | Paez | 99/342 |
| 5,767,455 A | 6/1998 | Mosher | 177/64 |
| 5,769,281 A | 6/1998 | Bates | 222/196 |
| 5,778,767 A | 7/1998 | Rudesill | |
| 5,780,780 A | 7/1998 | Ahmed | |
| 5,794,816 A | 8/1998 | Pliler et al. | 221/203 |
| 5,799,822 A | 9/1998 | Rudewicz et al. | 221/150 |
| 5,875,824 A | 3/1999 | Atwell et al. | 141/67 |
| 5,899,169 A | 5/1999 | Jenson | 119/51.13 |
| RE36,241 E | 6/1999 | Phelps et al. | 53/247 |
| 5,908,007 A | 6/1999 | Duin | 119/51.11 |
| 5,915,589 A | 6/1999 | Lim | 221/3 |
| 5,934,516 A | 8/1999 | Strycharske et al. | 222/158 |
| 5,960,990 A | 10/1999 | Radosevich | 222/1 |
| 5,996,838 A | 12/1999 | Bayer et al. | 221/75 |
| 6,058,373 A | 5/2000 | Blinn et al. | 705/26 |
| 6,067,899 A | 5/2000 | Caridis et al. | 99/404 |
| 6,070,539 A | 6/2000 | Flamme et al. | 111/177 |
| 6,101,483 A | 8/2000 | Petrovich et al. | 705/26 |
| 6,121,566 A | 9/2000 | Biquez et al. | 218/7 |
| 6,125,894 A | 10/2000 | Fritze et al. | 141/83 |
| 6,131,622 A | 10/2000 | Fritze et al. | |
| 6,131,766 A | 10/2000 | King et al. | 222/1 |
| 6,135,120 A | 10/2000 | Lofman et al. | 131/112 |
| 6,138,552 A | 10/2000 | Baillieul et al. | 99/331 |
| 6,145,699 A | 11/2000 | Pollock | 221/75 |
| 6,145,708 A | 11/2000 | Schmidt | 222/196 |
| 6,158,332 A | 12/2000 | Nothum, Sr. et al. | 99/494 |
| 6,165,525 A | 12/2000 | Rolle et al. | 426/238 |
| 6,170,229 B1 | 1/2001 | Kim | 53/155 |
| 6,179,206 B1 | 1/2001 | Matsumori | 235/383 |
| 6,192,654 B1 | 2/2001 | Georgitsis et al. | 53/234 |
| 6,202,888 B1 | 3/2001 | Pollock et al. | 221/1 |
| 6,210,727 B1 | 4/2001 | Miller et al. | 426/231 |
| 6,216,418 B1 | 4/2001 | Kim | 53/131.5 |
| 6,250,207 B1 | 6/2001 | Hansen | 99/286 |
| 6,256,963 B1 | 7/2001 | Kim | 53/155 |
| 6,276,517 B1 | 8/2001 | Peterson et al. | 198/716 |
| 6,305,573 B1 | 10/2001 | Fritze et al. | 222/58 |
| 6,321,802 B1 | 11/2001 | Weeks et al. | 141/362 |

\* cited by examiner

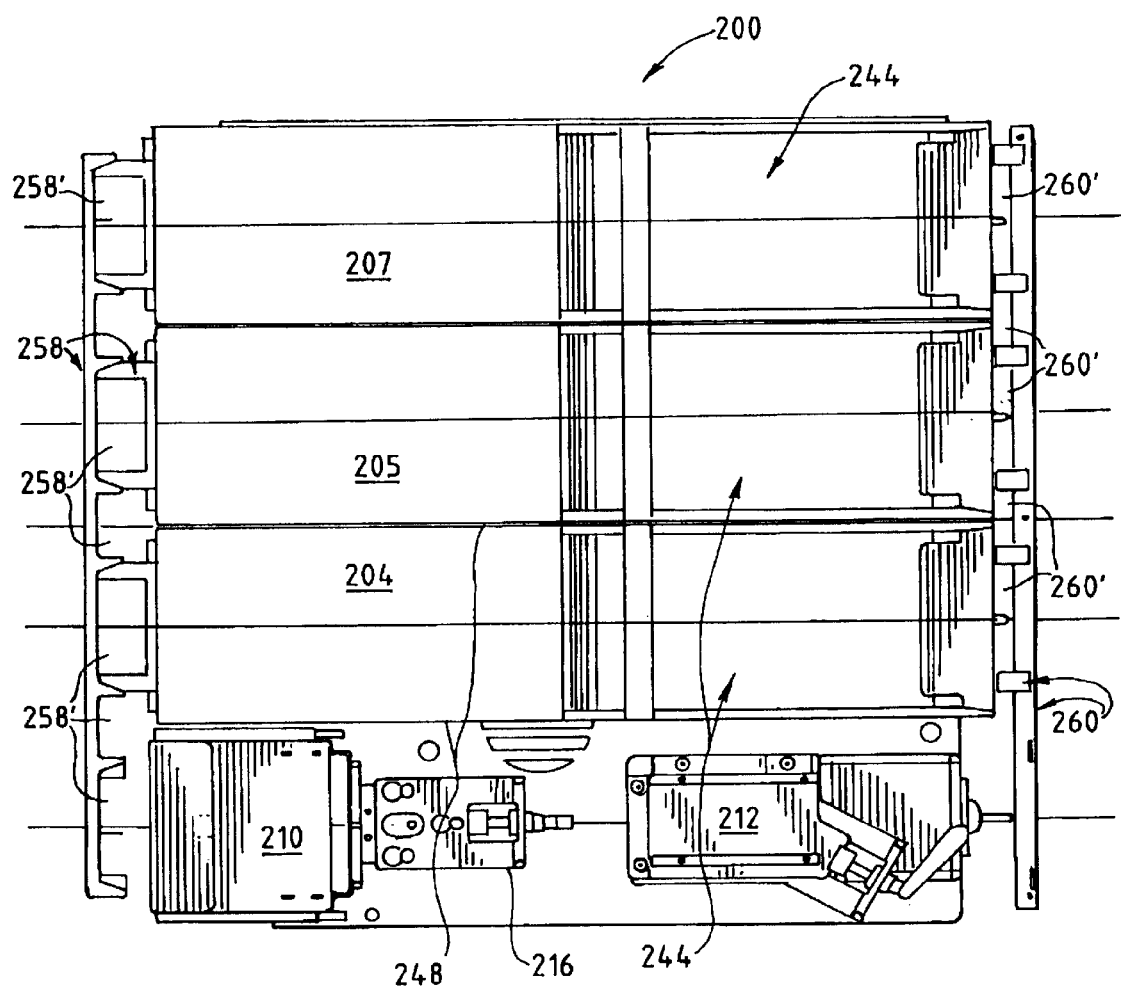

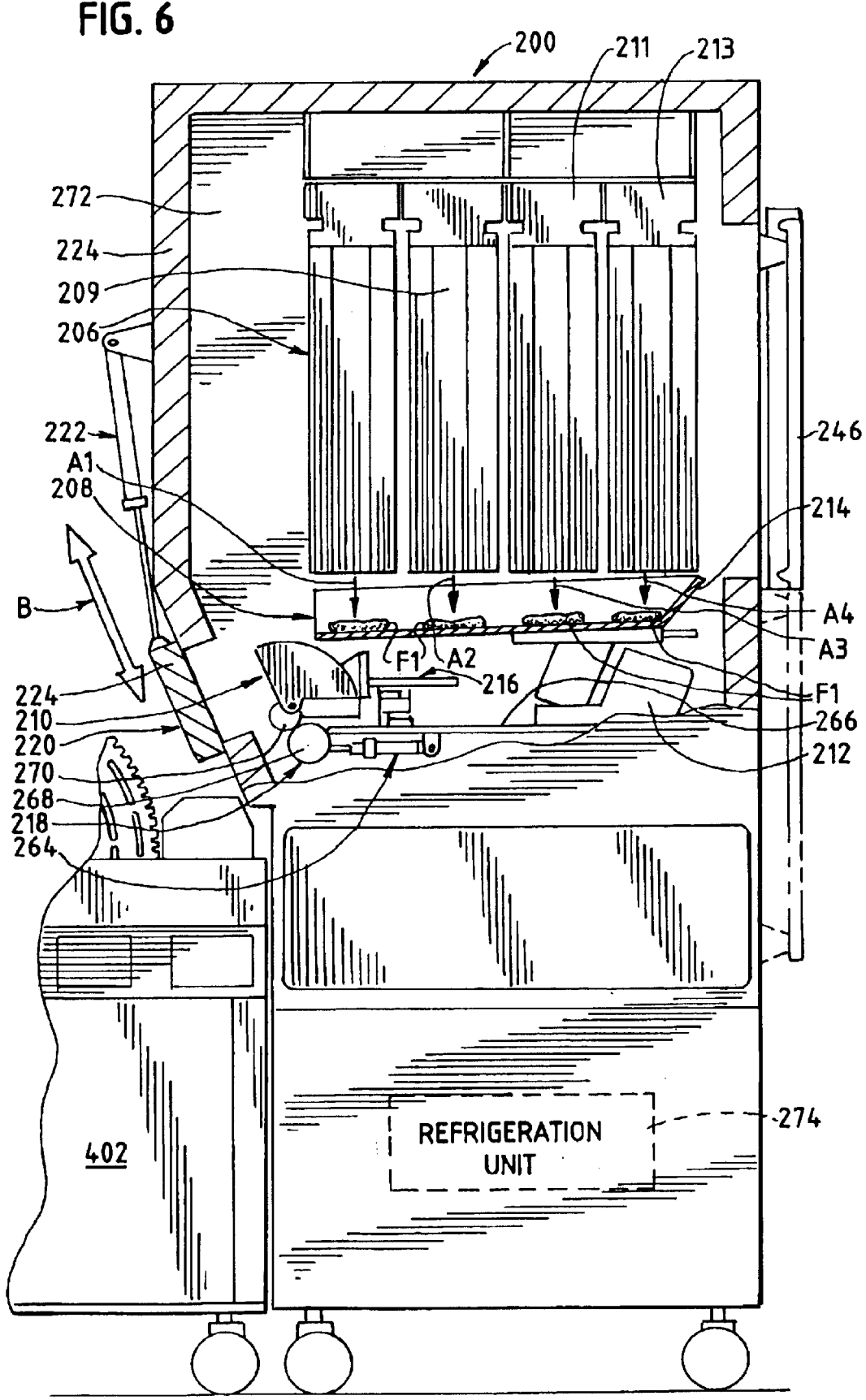

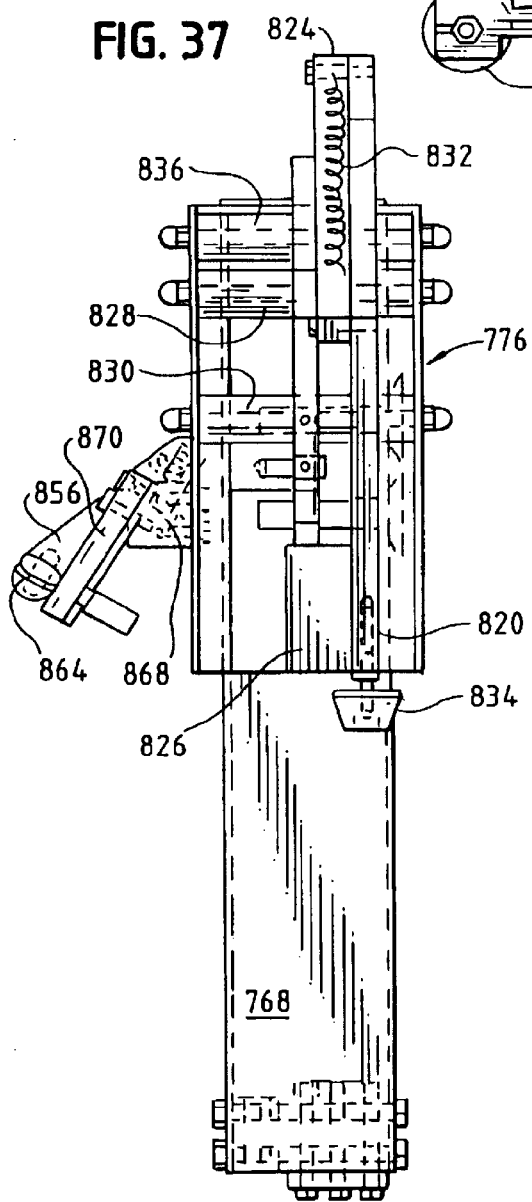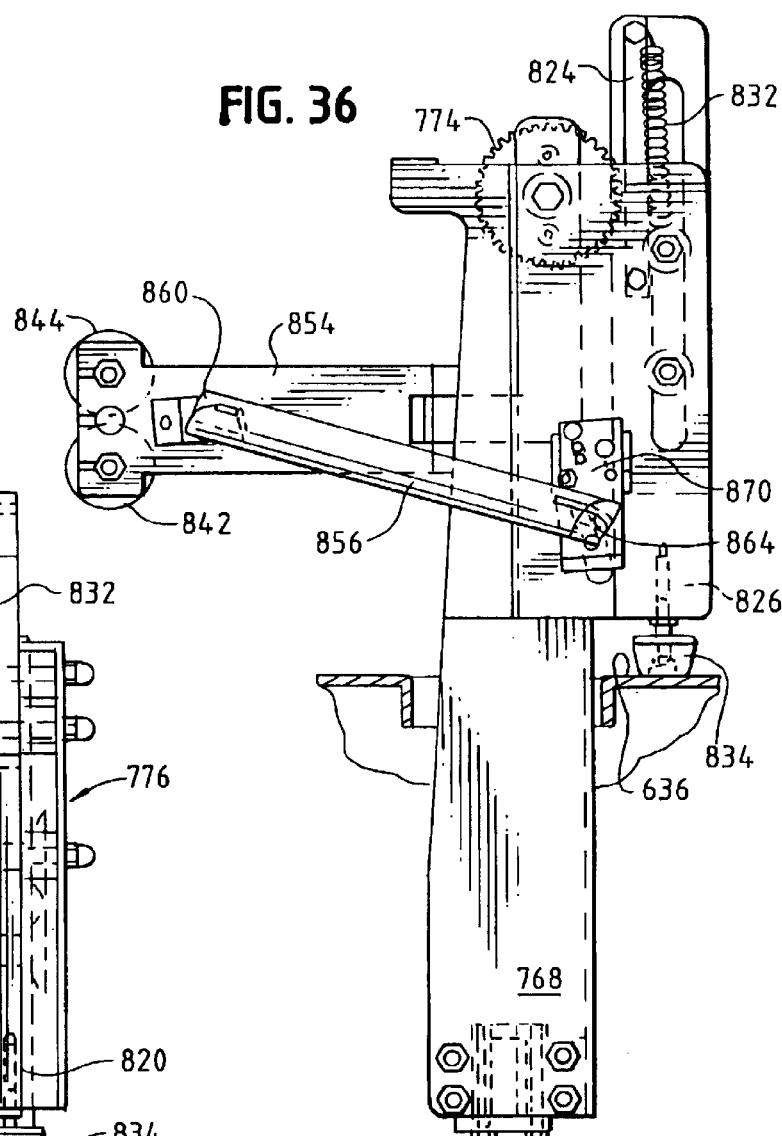
FIG. 36
FIG. 37

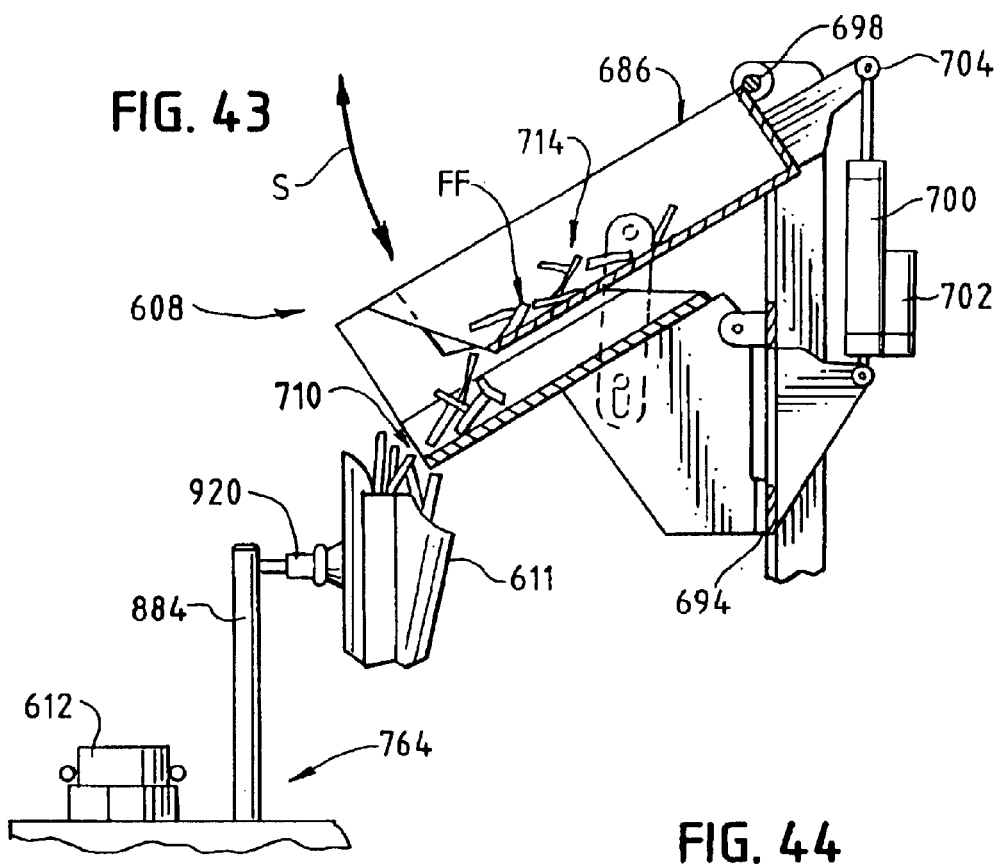
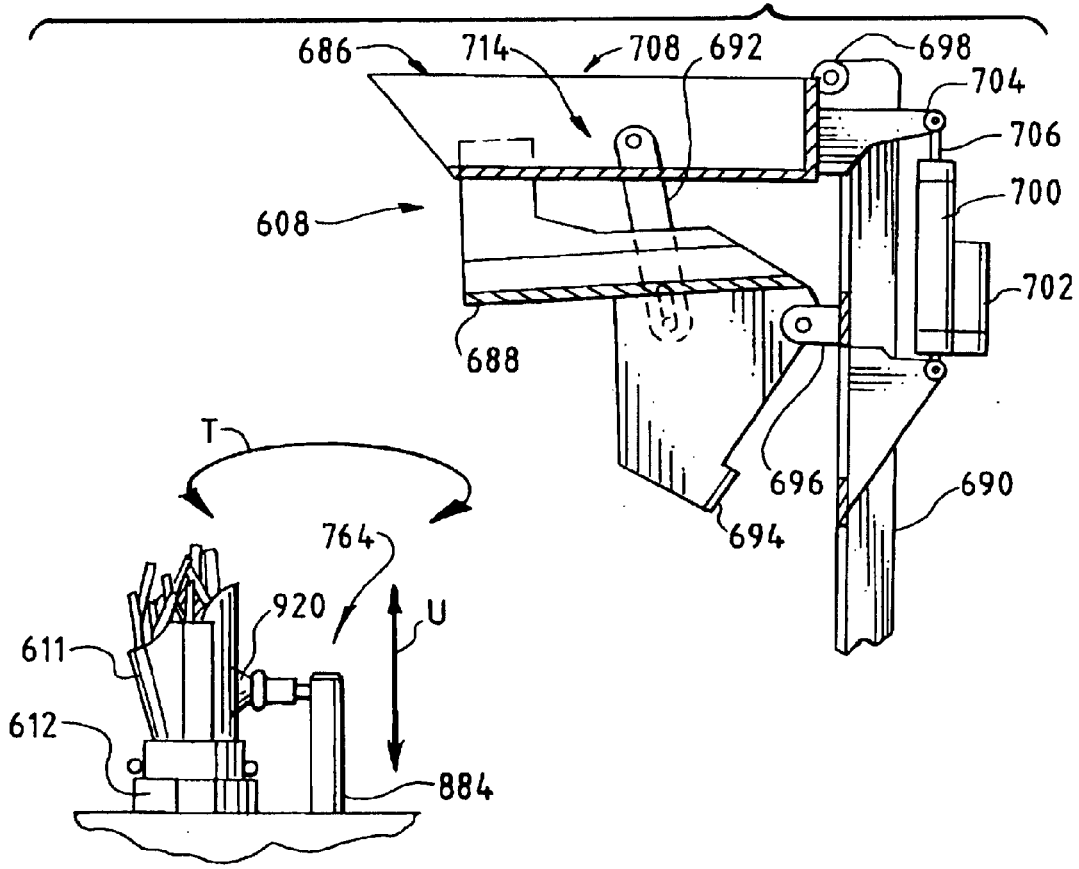

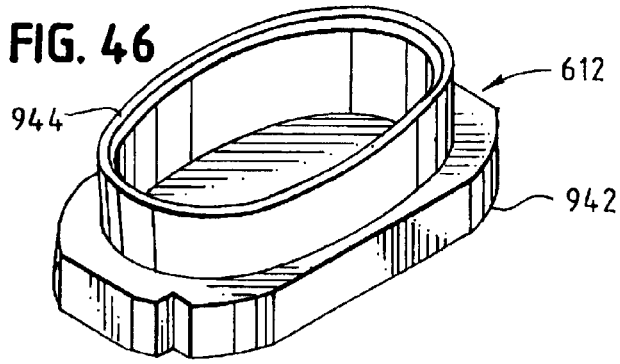
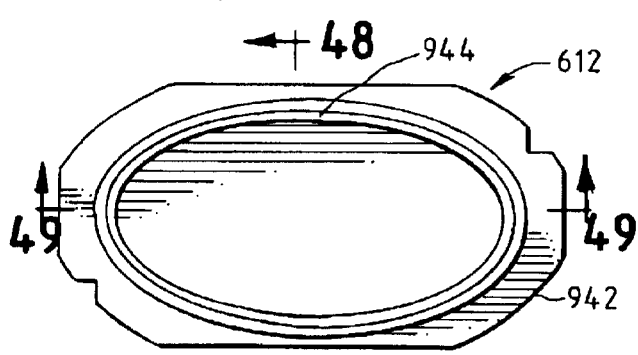
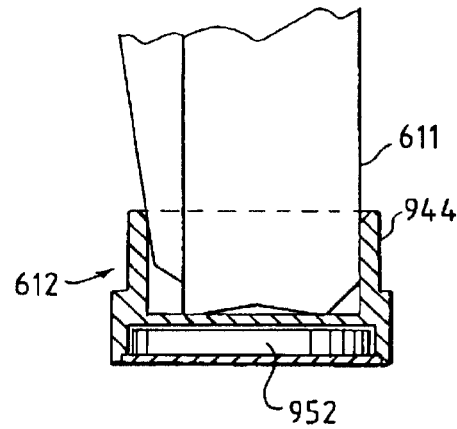
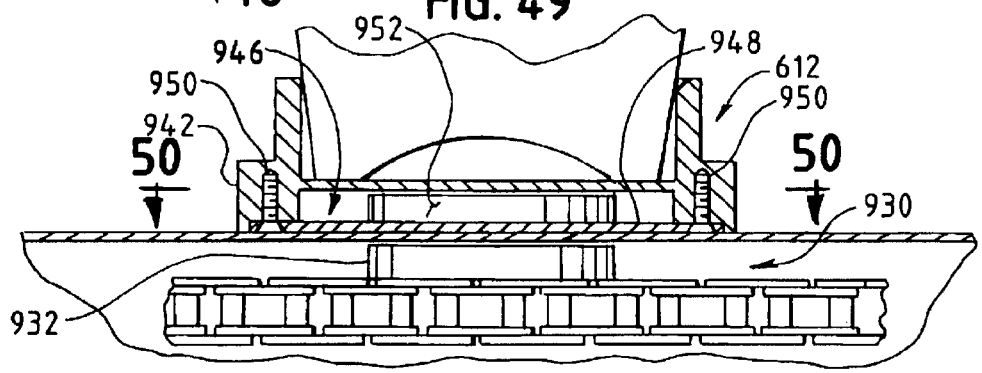
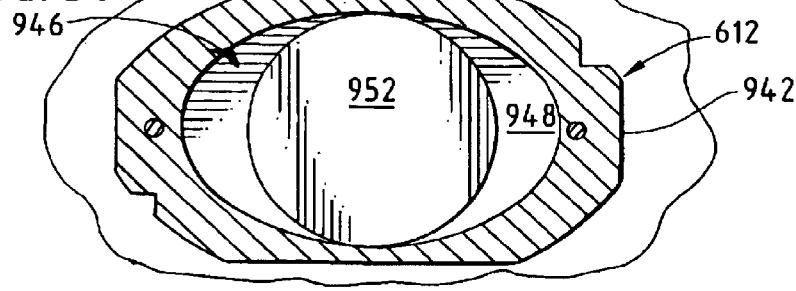

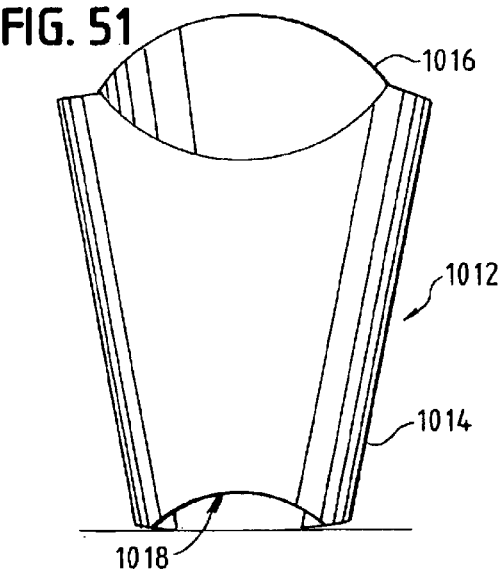
FIG. 51
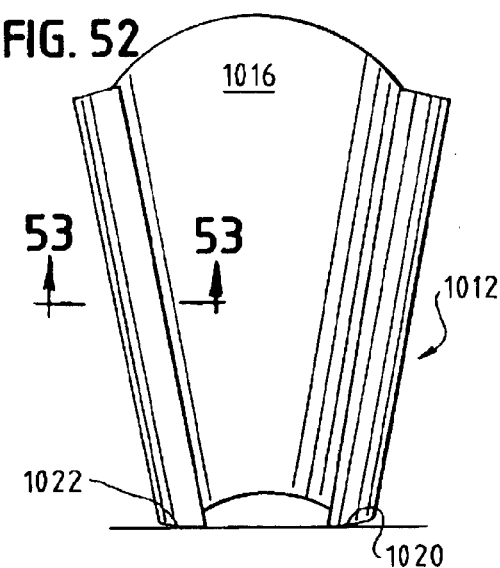
FIG. 52
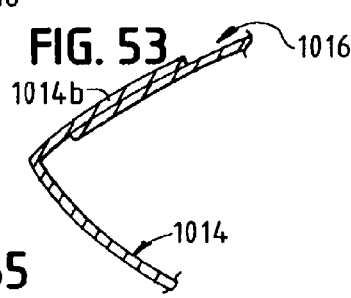
FIG. 53
FIG. 54
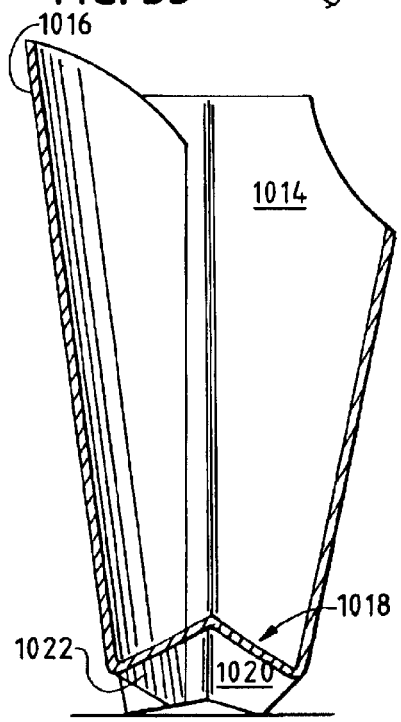
FIG. 55
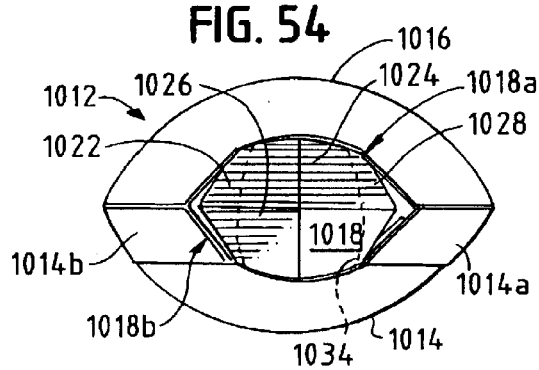
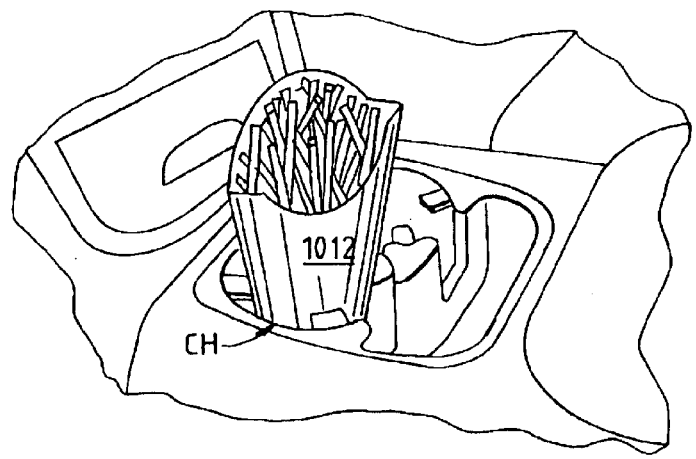
FIG. 56

AUTOMATED FOOD FRYING DEVICE AND METHOD

FIELD OF THE INVENTION

The invention relates to automated food processing. More particularly, the invention relates to automated food dispensing, frying and packaging into individual portion-sized containers such as at a quick-service type restaurant.

BACKGROUND OF THE INVENTION

In restaurants, especially quick service (fast food) restaurants, fast, consistent, efficient and safe food preparation is essential for a successful operation. The quality of the prepared food depends in large part on the consistency of food preparation. The food must be cooked under correct conditions for the proper time.

Consistency in food preparation can vary as a result of many factors. For example, people engaged in food preparation often must perform multiple tasks at frequencies that vary with time because of constantly varying customer demand throughout the day. For example, lunchtime and dinnertime may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food.

Food preparation can be labor intensive, and thus, the labor cost can be a large portion of the total cost of the prepared food. An additional problem is that in sparsely populated and other areas where quick service restaurants are located, such as along interstate highways, for example, recruiting sufficient numbers of suitable employees is difficult.

Quick service restaurants must be able to effectively meet a variable customer demand that is time dependent and not subject to precise prediction. As a result, stores relying totally on human operators will at times be overstaffed and at other times be under-staffed. Also, problems and potential problems can exist in restaurants where people directly prepare food. Health and safety concerns can also be present where food is prepared directly by people. By reducing or minimizing human contact with food and food cooking equipment, health and safety concerns can also be reduced or minimized. For example, in the frying of foods, some type of hot fluid, such as cooking oil or shortening must be utilized. The cooking temperatures required can present a concern for health and safety.

Although quick service restaurants have existed for many years and now number in the tens of thousands, such establishments utilize manual labor to prepare and process food. While there have been various improvements in commercial equipment used for cooking food in quick service restaurants, such restaurants are believed to be substantially all manually operated and relatively labor intensive.

Accordingly, a need exists for an automated, commercially suitable food dispensing, cooking and packaging device, system and method for fried foods that can be operated with a minimum of human intervention, control and maintenance. More particularly, a need exists for an automated device, system and method that is capable of, without human labor, frying various food products in desired quantities, such as French fries, seasoning the cooked food and packaging the cooked food in individual portion-sized containers

SUMMARY OF THE INVENTION

In accordance with the present invention, an automated food processing system and method is provided. The automated food processing system and method in accordance with the invention allows food to be dispensed, fried and packaged in a suitable container or alternatively dispensed to a food holding area for subsequent processing by a human operator.

In accordance with one aspect of the present invention, an automated module system for dispensing, frying and packaging food into individual portion-sized containers is provided. In one embodiment, any suitable automated dispensing device can be used. In another embodiment, the system includes an automated dispensing module capable of dispensing a desired quantity of food to be fried, an automated fry module adjacent the dispensing module to receive and fry the quantity of food dispensed from the dispensing module and to produce and dispense a quantity of fried food and an automated packaging module adjacent the fry module to receive and package the fried food from the fry module into an individual portion-sized container.

Advantageously, in one embodiment, the three modules are independent from each other and can be operated independently. Plus, in one embodiment, any one of the modules can be deactivated and a human operator can manually perform the function of the deactivated module with manually operated equipment.

In accordance with another aspect of the invention, optionally an automated seasoning device is present to apply seasoning to the food.

Typically, the automated dispensing module in accordance with the invention in one embodiment is capable of dispensing one or more of uncooked or unheated French fries, chicken nuggets, hash browns, chicken patties and fish filets or similar types of food items to be cooked and/or heated.

In accordance with another aspect of the invention, the automated dispensing module includes a freezer, a storage container located in the freezer for containing food to be dispensed, structure for dispensing a predetermined quantity of food from the storage container into a secondary or dump container, with the structure for dispensing and the secondary or dump container being located in the freezer, and structure for dispensing the quantity of food from the secondary or dump container to a location outside of the freezer.

In accordance with another aspect of the present invention, the fry module of the automated modular system includes a fry vat for containing and heating cooking oil, at least one circular fry wheel having at least a generally circular perimeter in a plurality of compartments, each compartment having an opening towards the perimeter, the fry wheel mounted for rotational movement relative to the radial axis of the fry wheel, which radial axis is disposed above the normal operating level of the frying oil or the cooking oil in the fry vat. A drive mechanism is provided for rotating the fry wheel. In one aspect of the invention, any suitable type of automated fry device can be utilized.

In accordance with another aspect of the present invention, a control system is provided for causing the drive mechanism to periodically rotate the fry wheel back and forth through a relatively small amount of angular rotation (such as about 2–10°, for example) to simulate shaking of a fry basket. Such control can be accomplished electronically by devices known to those skilled in the art.

In another embodiment, food is delivered from the fry module to a cooked food holding device, which can comprise a heated holding bin or bins.

In accordance with still another aspect of the present invention, the automated packaging module includes a rotatable food dispensing member having an inlet location to receive a quantity of cooked food at a discharge location to discharge cooked food, the packaging module also including a food dispensing chute position to receive cooked food from the discharge location of the rotatable food dispenser, the food dispensing chute having a discharge location.

In accordance with another embodiment of the invention, the automated modular system further includes a carton holding device for holding the individual portion-sized carton or container in position to receive food from the discharge location of the dispensing chute. The packaging module may further include a rotatable food collecting member disposed to collect food from the discharge location of a dispensing chute that is not deposited into the individual portion-sized food container. The so collected food may be subsequently deposited into the food dispensing chute for delivery to a container or alternatively to the rotatable food dispensing member or to a waste receptacle or chute.

In accordance with another aspect of the invention, the automated packaging device includes a conveyor system for transporting filled individual portion-sized food containers from adjacent the filling location to a filled food container holding area, for subsequent pick-up by a human operator, for example. In one embodiment, any suitable automated packaging device can be utilized.

In accordance with another aspect of the present invention, an automated food carton-retrieving device is provided for retrieving and grasping individual portion-sized food containers. The automated retrieving device comprises a moveable member for selectively grasping and releasing the food container. In one embodiment, the retrieving device is capable of grasping and releasing an unerected food container on one side and the device further includes a second device for selectively grasping the unerected food container on the other side with structure for moving the retrieving device and the second device relatively apart when grasping the sides of the container to erect or partially erect the container.

In another embodiment, an automated urging structure is provided for urging the container bottom upwardly relative to the sides of the container when the sides of the container are moved relatively apart.

In accordance with another aspect of the invention, the automated modular system includes an electronic control system that receives current customer order information and the electronic control system causes the selection of a container from a plurality of different container sizes and further causes filling of food with the size of food container in response to a customer order. In one aspect, the electronic control system can receive customer order information and controls the dispensing rate of food dispensed from the food dispensing module to the fry module which dispensing automatically determines the amount of food being fried without further intervention by the electronic control. In one aspect, the control system can include a separate control system for each of the dispensing, fry and packaging systems or modules, each of which interface with a central control system, which in turn optionally interfaces with a POS (point-of-sale) system.

In accordance with another aspect of the invention, the automated modular system is suitable for dispensing, frying and packaging French fries into individual portion-sized containers.

In accordance with another aspect of the present invention, an automated method of dispensing, frying and packaging food into individual portion-sized containers is provided that includes dispensing a desired quantity portion of food to be fried from an automated dispensing module to an automated fry module and thereafter frying the portion of food dispensed from the dispensing module in the automated fry module adjacent the dispensing module to produce a quantity of fried food. Thereafter, the quantity of fried food is dispensed from the fry module to a packaging module where the fried food dispensed from the fry module is packaged into individual portion-sized containers with an automated packaging module.

In another aspect of the invention, the automated method further comprises seasoning the quantity of fried food with a seasoning device.

In accordance with another aspect of the invention, the dispensing includes dispensing a predetermined quantity of food from the storage container into a secondary container located in a freezer and dispensing the quantity of food from the secondary container to a location outside of the freezer.

In accordance with another aspect of the method of the present invention, the frying comprises a rotating fry wheel having at least a generally circular perimeter and a plurality of compartments, each compartment having an opening towards the perimeter, the food being contained in at least one of the compartments during the frying, the fry wheel being mounted for rotational movement relative to the radial axis of the fry wheel in a fry vat with the radial axis being disposed above a normal operating level of the cooking oil in the fry vat. In accordance with this aspect of the invention, the automated method further includes containing a drive mechanism to periodically rotate the fry wheel back and forth through a relatively small amount of angular rotation to simulate shaking of a fry basket during frying.

In accordance with another aspect of the invention, the packaging includes rotating a rotatable food dispensing member having an inlet location to receive a quantity of cooked food in a discharge location to discharge cooked food, the food dispensing member being rotated to dispense food into a food dispensing chute position to receive cooked food from the discharge location of the rotatable food dispenser and thereafter dispensing said food from the dispensing chute to a container to be filled.

In accordance with another aspect of the invention, the method further includes holding an individual portion-sized carton or container positioned to receive food from the dispensing chute with an automated carton holding device.

In accordance with still another aspect of the invention, the method further includes collecting food dispensed from the discharge location of the dispensing chute that is not deposited into the individual portion-sized food container with a rotatable food collecting member disposed to collect such not deposited food.

In accordance with another aspect of the method, the method includes electronically coordinating the operation of the three modules or devices within an electronic control system. In one embodiment, the method further includes electronically receiving current customer order information by the electronic control system which causes selection of a container from a plurality of different sized containers and filling the container with food of the ordered size of food container in response to a customer order by the packaging module. In accordance with another aspect of the method, customer order information is electronically received and the dispensing rate of food dispensed from the food dispensing module to the fry module is controlled, which dispensing automatically determines the amount food being fried without further intervention by the electronic control system.

In accordance with another aspect of the present invention, an automated dispensing device for dispensing a quantity of food to be subsequently cooked is provided. In one embodiment, the automated dispensing device includes a freezer or refrigerated compartment, a storage container located in the freezer for containing food to be dispensed, structure for dispensing a predetermined quantity of food from the storage container into a secondary or dump container, the structure for dispensing the predetermined quantity of food being located in the freezer, and structure is provided for dispensing the quantity of food from the secondary or dump container in the freezer to a location outside of the freezer.

In one embodiment, the structure for dispensing a predetermined quantity of food includes a vibratory conveyor typically located in the freezer below the storage container. The structure for dispensing may further include a device for determining or sensing the quantity of food that has been deposited in the secondary container and structure is provided for terminating the operation of the structure for dispensing when a predetermined quantity of food is sensed in the secondary container.

In accordance with another aspect of the present invention, the automated dispensing device includes structure for dispensing a predetermined quantity of food that comprises a food magazine capable of dispensing individual pieces of food on a piece by piece basis. In accordance with a more specific aspect of this embodiment, the magazine comprises dual rotatable spiral flights with the spiral flights having a spacing therebetween to allow placement of a food item, such as a chicken patty, for example, to be supported by both spiral flights.

In accordance with another aspect of the invention, the magazine dispenser is suspended from a slide mechanism permitting removal of the magazine from the freezer or refrigerated compartment. A plurality of the magazines can be located on a single slide mechanism. An array of the magazines may be located in the freezer, such as a 3×5 array or a 3×4 array, for example.

In one embodiment, a separate drive motor is associated with each food dispensing magazine for selectively rotating spiral flights of a magazine dispenser for dispensing a desired number of the food items. The drive motor may also be located in the freezer.

In accordance with another aspect of the invention, an automated method of dispensing a quantity of food to be cooked is provided. The method includes storing food items in a storage container located in the freezer, dispensing food items from the storage container to a conveyor, conveying the food items on the conveyor to a secondary or dump container located in the freezer, monitoring the amount of food items delivered to the secondary container, terminating delivery of the food items to the secondary container when a desired amount of food items are determined to be present in the secondary container as determined by the monitoring, and dispensing the food items from the secondary container and out of the freezer by at least partially inverting the secondary container. In accordance with another aspect of this embodiment, a freezer or refrigerated compartment is not utilized.

In accordance with another aspect of the present invention, a device for the automated frying of foods is provided. The device in one embodiment includes a fry vat for containing and heating cooking oil, at least one circular fry wheel having at least a generally circular perimeter and a plurality of compartments with each compartment having an opening towards the perimeter, the fry wheel mounted for rotational movement relative to the radial axis of the fry wheel which radial axis is disposed above the normal operating level of the frying oil in the fry vat. A drive mechanism is provided for rotating the fry wheel and a control system is included for causing the drive mechanism to periodically rotate the fry wheel back and forth through a relatively small amount of rotation (such as about 2–10°, for example) to simulate shaking of a fry basket. Such control can be accomplished electronically by devices known to those skilled in the art.

In accordance with another aspect of the present invention, the small amount of rotation is in the range of from about 2° to about 20°. The back and forth rotation in one direction may be of a larger angle or amount of rotation than of the rotation in the other direction.

In one embodiment, a control system is provided that causes periodic incremental rotation of the fry wheel in one direction to cause food deposited into one of the compartments to travel through the cooking oil in the fry vat over a period of time to fry the food and to move the compartments out of the cooking oil for subsequent discharge of the food from the compartment. In one embodiment, the periodic incremental rotation is based on 360° divided by the number of compartments in the fry wheel.

In accordance with another aspect of the present invention, a control system is provided for operating the drive mechanism to rotate the fry wheel in one direction to cause food deposited into one of the compartments to travel through the cooking oil in the fry vat over a period of time to fry the food and out of the cooking oil for subsequent discharge of the food from the compartment, wherein the control system adjusts the speed of rotation based on the level of cooking oil in the fry vat. In one embodiment, the control system causes incremental periodic rotation of the fry wheel and the control system adjusts the period of time between incremental rotations based on the level of cooking oil sensed in the fry vat. The period of time between incremental rotations can also be based on the temperature of the cooking oil in the fry vat.

In accordance with another aspect of the invention, a curved baffle is provided that is disposed in the fry vat adjacent the axial periphery of the portion of the fry wheel that is disposed in the cooking oil for preventing food contained in one or more of the fry wheel compartments from falling out of the compartments.

In accordance with another aspect of the present invention, an automated method of frying food in a fry vat having a heated cooking oil contained therein is provided. The method includes placing food in a fry wheel compartment, each of the compartments having an opening towards the perimeter of the fry wheel, rotating the fry wheel so that the compartment containing the food travels submerged in the heated cooking oil and periodically rotating the fry wheel back and forth in a relatively small amount of rotation to simulate shaking of the fry basket while the food is submerged in the cooking oil. In accordance with another aspect of the method of the present invention, the method comprises rotating the fry wheel in one direction to cause the food deposited into one of the compartments to travel through the cooking oil in the fry vat over a period of time to fry the food and to move the food out of the cooking oil for subsequent discharge of the food from the compartment, wherein the speed of said rotating is related to the level of cooking oil in the fry vat. In accordance with this aspect of the present invention, the rotating may comprise incremental periodic rotation with the period of time between incremental periodic rotations being based on the level of cooking oil sensed in the fry vat. The period of time between incremental periodic rotations may also be based on the temperature of the cooking oil in the fry vat.

In accordance with another aspect of the present invention, an automated method of packaging cooked food, which may be food such as French fries, chicken nuggets and other types of food, in an individual portion-sized container is provided. The method includes delivering a quantity of a cooked food to a rotatable dispensing member, rotating the dispensing member to cause the food items to fall from one or more compartments of the dispensing member into a food dispensing chute and thereafter dispensing the food from the chute and depositing the food into the individual portion-sized food container.

In accordance with one aspect, the method may further include weighing the food in the chute before dispensing the food to the container.

In accordance with another aspect of the invention, the method includes applying seasoning to the food and may further include applying the seasoning by using gravity to cause the seasoning to travel through a nozzle and onto the food.

In accordance with another aspect of the invention, the method further includes shaking the individual portion-sized food container after the dispensing. The shaking may be automated and can include back and forth movement of the container through an arc as desired, and may be in a generally vertical axis. The arc may be a generally circular arc and the rotating back and forth may encompass an arc in the range of from about 3° to about 20°. In addition, the container may be raised and lowered before, during or after the rotating to further simulate shaking or in connection with further container handling.

In accordance with another aspect of the invention, when dispensing food from the chute to the individual portion-sized container, some of the dispensed food is not deposited into the individual portion-sized container and the method further includes collecting the not deposited food. Typically, the not deposited food will be collected in a collection device that returns the not deposited food to the chute for subsequent dispensing. In one embodiment, the collection member is rotatable and can be rotated to deposit the collected food to the chute. This helps to ensure that the not deposited food is subsequently deposited into a container on a first-in, first-out or a generally first-in, first-out basis.

In accordance with another aspect of the present invention, an automated method of packaging food, including food such as French fries, in an individual portion-sized container is provided that includes delivering a quantity of food to a food dispensing chute, selecting and holding with an automated device an individual portion-sized container of a desired size from a plurality of different sizes of individual portion-sized containers that can be selected and held by the automated device. The selected individual portion-sized container is moved by the automated device to a location for receiving food from the dispensing chute and food is dispensed from the chute and into the container. The method may further include depositing the filled food container onto a conveyor by operation of the automated device and transporting the deposited container by the conveyor to a human operator food pickup location.

In accordance with another aspect of the foregoing method, the individual portion-sized food container is unerected and the method further includes after the selecting, erecting the selected individual portion-sized food container by the automated device. In one embodiment, the automated device includes a partial vacuum suction device for holding the individual portion-sized food container and the holding includes applying a partial vacuum through a suction device to the food container. The food container can be released by reducing or eliminating the vacuum applied by the suction device to the food container sufficiently to cause the food container to be disengaged from the automated device.

In accordance with another embodiment of the method, the filled food container is placed in an upright position on a transportable member or container-receiving receptacle which in one embodiment contains a single food container and is maintained in an upright position on the transportable member by cooperation of the recessed volume of the transportable member and the food container.

In accordance with another aspect of the invention, the transporting is performed by a magnetic conveyor.

In accordance with still another aspect of the invention, an automated device for packaging cooked food into a desired container, which may be an individual portion-sized food container is provided. The device includes a rotatable food dispensing member having an inlet location to receive a quantity of the cooked food and a discharge location to discharge the cooked food. A food dispensing chute is positioned to receive the cooked food from the discharge location of the rotatable food dispenser and the dispensing chute has a discharge location. In one embodiment, the dispensing chute has a food holding area for holding a quantity of the cooked food deposited therein. A suitable weighing device can be associated with the dispensing chute to weigh the food that is contained in the chute or in the holding area of the chute. In one embodiment, the weighing device is a load cell.

In accordance with another aspect of the invention, the automated device includes a food carton or container holding device for holding the food carton in position to receive food from the discharge location of the dispensing chute. The carton holding device can include an axially rotatable generally vertically extending elongated first member and a second member that extends from the elongated member, the second member having a gripping member for gripping a food container, which may be an individual portion-sized food container. In one embodiment, the gripping member comprises a suction cup. A vacuum source may be supplied to the suction cup to create at least a partial vacuum, allowing the container to be held. In one embodiment, the carton holding device is capable of moving the food container through an arc of about or of at least about 180° and in which the carton holding device is capable of moving the food container up and down.

In accordance with another aspect of the present invention, the automated device comprises a conveyor system for transporting filled individual portion-sized food containers from adjacent the filling location to a filled container holding area. The conveyor system may comprise in one embodiment a continuous loop raceway and a plurality of discrete moveable food container receptacles that are moveable along the raceway. The conveyor system may include a continuous moveable loop having at least one magnetic element capable of magnetically attracting one of the moveable receptacles at a time for causing movement of the receptacle corresponding to movement of the magnetic element. A plurality of the magnetic elements may be spaced apart along the moveable loop.

In one embodiment, structure is provided for preventing movement of the discrete receptacles when the structure for moving the discrete receptacles along the raceway is activated. The structure for preventing movement can be a barrier that is disposed across the raceway. In one embodiment, the barrier is selectively moveable and in another embodiment the barrier is fixed. In one embodiment, the barrier prevents movement of the receptacles only for a receptacle that has a food carton or container disposed thereon. In this embodiment, the barrier may be located at a height that is above the top of the receptacles located on the conveyor system adjacent the barrier.

In accordance with another aspect of the invention, an automated device is provided to retrieve and grasp a food container, which may be an individual portion-sized food or French fry container or carton. The automated retrieving device includes a member for selectively grasping and releasing the food container and for moving the moveable member horizontally and linearly.

In accordance with another aspect of the invention, a magazine is provided for holding a plurality of food containers in an unerected state.

In accordance with another aspect of the invention, the automated device includes a retrieving device that is capable of grasping and releasing an unerected food container on one side and further includes a second device for selectively grasping the unerected food container on the other side. A structure for moving the retrieving device and the second device relatively apart when grasping the sides of the container is provided. The automated device may further include an automated urging means for urging the container bottom upwardly relative to the sides of the container when the retrieving device and the second device are moved relatively apart when grasping the container.

In accordance with another aspect of the invention, the food dispensing member is a rotatable wheel having an open central area and an outer at least generally circular rim. The rotatable wheel has a plurality of open compartments spaced apart about the circular rim that extend inwardly from the circular rim and open interiorly of the circular rim. A baffle may be provided to prevent food contained in the one or more of the open compartments from falling out of the compartments when the wheel is rotated until the compartment is in position over the food dispensing chute. The baffle may be curved to follow the curvature of the inner part of the wheel and may also be perforated. The automated device may further include a rotatable food collecting member that is disposed to collect food dispensed from the discharge location of the dispensing chute which food is not deposited into a container held in position at the discharge location. Typically, the collection member will have a discharge location to discharge collected food. In one embodiment, the discharge location is the food dispensing chute. The collecting member may be a rotatable food collecting wheel having an open central area and an outer circular rim having a plurality of open compartments spaced apart about the circular rim that extend inwardly from the circular rim and that are open towards the rim interior. The rotatable food dispensing member and the rotatable food collecting member can be rotatable in one direction to discharge food at a discharge location and into a food dispensing chute and can be rotatable in an opposite direction to discharge the food at a second discharge location which may be to a waste chute.

The discharge to the waste chute feature can be activated, for example, when the food is held in the dispensing device for too long a period of time.

The packaging device may also include an automated seasoning device for depositing a predetermined quantity of seasoning to food contained in the packaging device.

In accordance with another aspect of the invention, the device for applying seasoning includes a seasoning delivery tube having an inlet and a discharge location. A seasoning delivery head is positioned to deliver seasoning to the food to be seasoned with the head in communication with the outlet of the delivery tube and located below the inlet of the delivery tube. Structure is provided for depositing a predetermined quantity of seasoning into the inlet of the delivery tube so that the quantity of seasoning falls by gravity through the delivery tube and into and through the seasoning head and onto the food to be seasoned. Typically, the structure for depositing the predetermined quantity of seasoning will receive seasoning from a bulk hopper by gravity feed. The quantity of seasoning to be dispensed can be determined volumetrically, for example.

BRIEF DESCRIPTION OF THE DRAWINGS

FIG. 5 is a top plan view of a portion of the bulk food dispensing device in accordance with the present invention;

FIG. 6 is a side elevation view, partly in section, of a bulk food dispensing device in accordance with the present invention and also illustrating a portion of a device for frying food in accordance with the present invention;

FIG. 36 is a side elevation view, partially broken away of the container handling system of FIG. 34;

FIG. 37 is a rear elevation view of the container handling system of FIG. 34;

FIGS. 43–44 illustrate a side elevation view, partly in section, of a portion of the food packaging apparatus in accordance with the invention;

FIG. 46 is a perspective view of a container-receiving receptacle in accordance with the present invention;

FIG. 47 is a top plan view of the device of FIG. 47;

FIG. 48 is a sectional view along line 48—48 of FIG. 47;

FIG. 49 is a cross-sectional view along line 49—49 of FIG. 47 and further including a portion of a conveyor system in accordance with the present invention;

FIG. 50 is a sectional view along line 50—50 of FIG. 49;

FIG. 51 is a front elevation view of a carton useful in accordance with the present invention;

FIG. 52 is a rear elevation view of a carton useful in accordance with the present invention;

FIG. 53 is a sectional view along line 53—53 of FIG. 52;

FIG. 54 is a bottom plan view of the container of FIG. 51;

FIG. 55 is a sectional view along line 55—55 of FIG. 57;

FIG. 56 is a perspective view showing use of the food container of FIG. 51;

DETAILED DESCRIPTION OF THE INVENTION

General

In accordance with the present invention, an automated food processing system and method is provided. The automated food processing system and method in accordance with the invention allows food to be dispensed, fried and packaged in a suitable container or alternatively dispensed to a food holding area for subsequent processing by a human operator.

Figure 1:
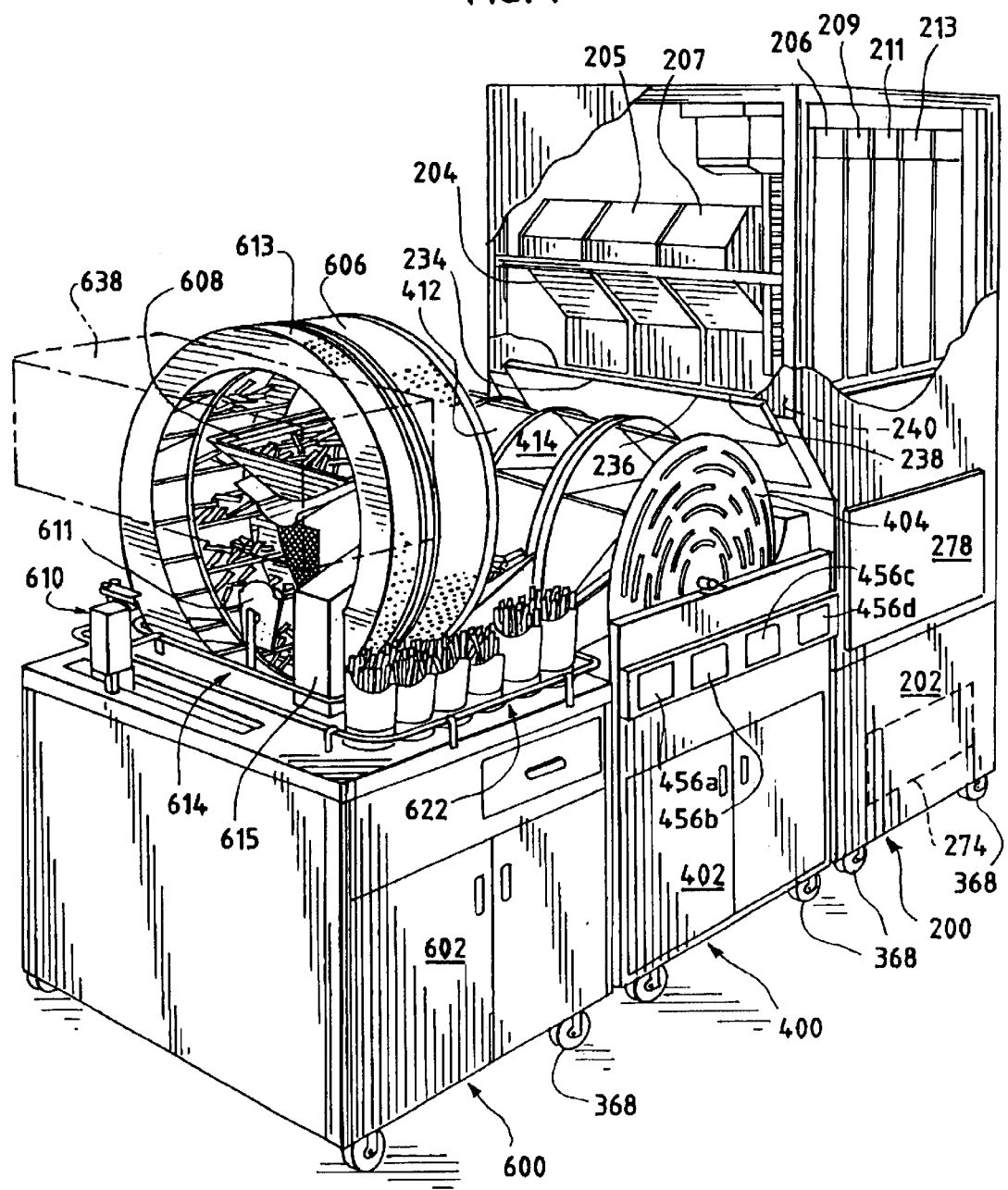
FIG. 1 is a perspective view of an automated food processing system in accordance with the invention.
Figure 3:
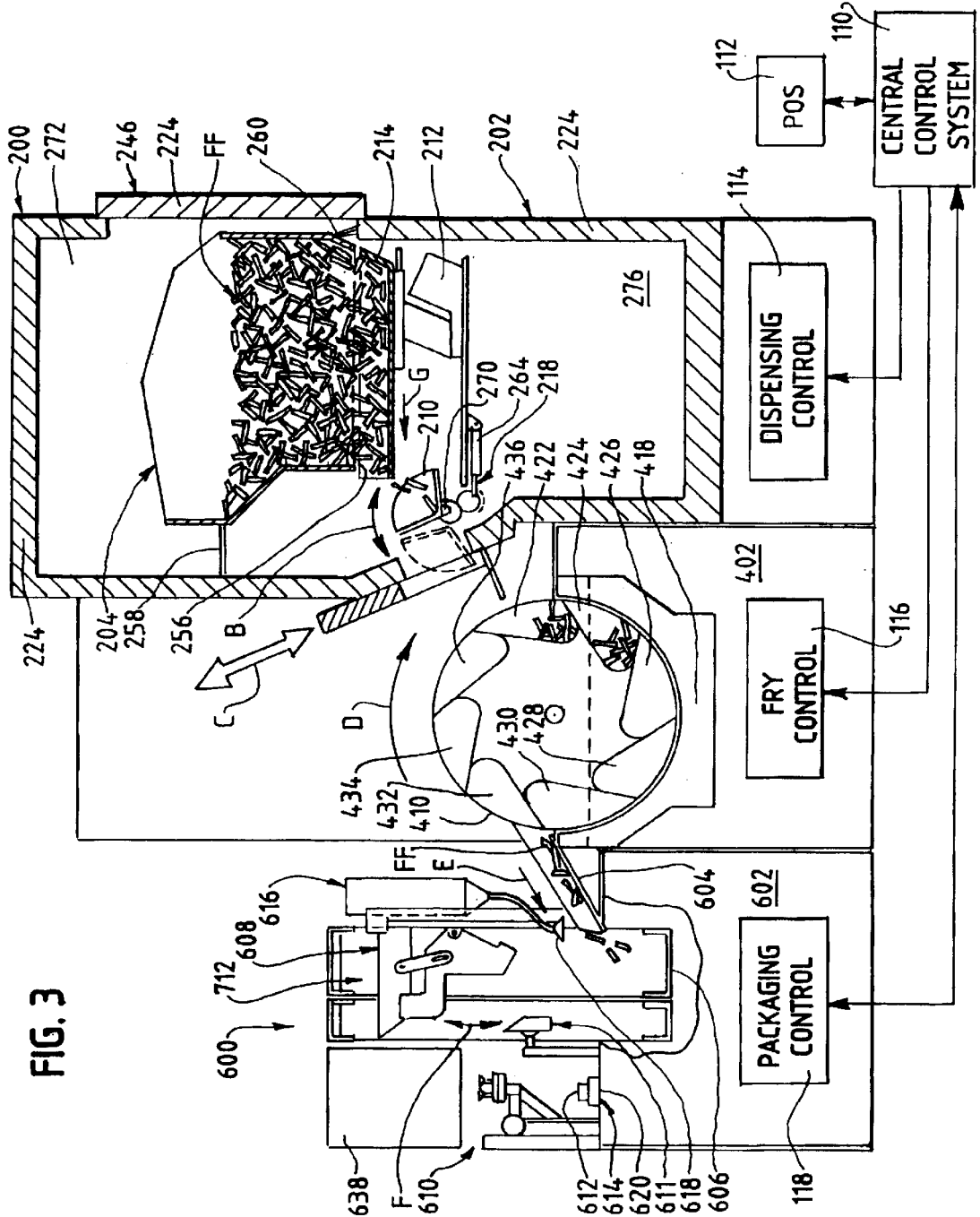
FIG. 3 is a schematic view, partly in section, of the food processing system of FIG. 1.

Referring to the Figures generally and in particular to FIGS. 1 and 3, there is illustrated an automated food processing system 100 in accordance with the invention. Automated food processing system 100 includes a food dispensing device 200, a fry device 400 and a food packaging device 600. In accordance with one embodiment of the present invention, each of dispensing, fry and packaging devices 200, 400 and 600, respectively, can be constructed and are sometimes illustrated in "modular" construction or form. By "modular" construction or form it is meant that dispensing, fry and packaging devices 200, 400 and 600, respectively, can exist and be contained in separate cabinets, for example, and also operate independently of the other devices. Thus, if one of dispensing, fry and packaging devices 200, 400 and 600, respectively, are inoperative or are otherwise deactivated, the function of the deactivated or inoperative device can be performed manually. For example, food to be fried could be manually dispensed in place of dispensing device 200. Alternatively, food to be fried could be fried in a conventional fry vat after being dispensed from dispensing device 200 in place of using fry device 400 and food that is dispensed and fried in dispensing and fry devices 200 and 400, respectively, could, in turn, be packaged manually, for example.

To facilitate such modular construction and use, each of dispensing, fry and packaging devices 200, 400 and 600, respectively, can be contained in a separate wheeled cabinet, 202, 402 and 602, respectively, as illustrated in FIG. 1. Alternatively, dispensing, fry and packaging devices 200, 400 and 600, respectively, could be mounted as a single unit or in a single cabinet or in "non-modular form," as desired, or more than one of such devices 200, 400 and 600 could be so mounted or combined.

A suitable control system for the dispensing, fry and packaging devices is also provided. As will be described more completely hereafter, in one embodiment, the control system includes a central control system 110 that can interface with a point-of-sale system 112. The central control system will communicate with separate subcontrol systems 114, 116 and 118, one for each of the dispensing, fry and packaging devices 200, 400 and 600, respectively. Alternatively, a single central control system (not shown) could be utilized in place of individual control systems for each of devices 200, 400 and 600. Similarly, as another alternative, a single central control system could be utilized to control the overall operation of automated food processing system 100 as well as controlling the individual functions and aspects of dispensing, fry and packaging devices 200, 400 and 600.

The basic operations of dispensing device 200, fry device 400 and food packaging device 600 will now be briefly discussed and discussed in detail hereafter.

Briefly, dispensing device 200 functions to dispense a quantity of food to be fried to fry device 400. In one aspect of the invention, any suitable food dispensing device can be utilized. Dispensing device 200 can include a cabinet 202 to house the components of dispensing device 200. In one embodiment, cabinet 202 will be refrigerated, preferably below 32° F. so that the food contents therein will remain frozen. This allows the food stored in dispensing device 200 to remain therein for a long period of time, much longer than if the contents were merely refrigerated (above freezing) or merely at room temperature.

In the illustrated embodiment, dispensing device 200 includes an uncooked bulk food dispensing container 204. Uncooked bulk food dispensing container 204 may be utilized for food such as French fries or chicken nuggets, for example. Other types of food may also be contained in a dispenser such as uncooked bulk food dispensing container 204. Typically, those types of food would be in the form of relatively small pieces compared to relatively large food pieces such as chicken patties, for example.

For relatively large food pieces, a large food dispensing container is utilized. In one embodiment, the large food dispensing container is in the form of a magazine food dispenser 206.

Food dispensed from a dispenser of dispensing device 200 is deposited on a conveyor 208 that, in turn, directs the deposited food to a secondary or dump container 210 for subsequent discharge from dispensing device 200.

In the illustrated embodiment, uncooked bulk food dispensing container 204, magazine food dispenser 206, conveyor 208 and secondary container 210 are contained in cabinet 202, which is a refrigerated environment, preferably maintained below freezing (32° F. or lower).

While any suitable conveyor can be utilized in one aspect, conveyor 208 is preferably a vibratory conveyor, vibrated by a suitable vibratory mechanism that vibrates a conveyor body 214. Conveyor body 214 may take the form of a suitably shaped tray, for example.

By containing the foregoing components in a refrigerated and preferably frozen environment, consistency in food preparation and dispensing is achieved, thereby contributing to the overall efficient, effective and uniform performance of automated food processing system 100.

Secondary container 210 can be of a form as desired and includes suitable weighing mechanism 216 to permit a determination of the quantity of food contained in secondary container 210. Weighing mechanism 216 can be any suitable device to weigh the contents or otherwise determine the amount of food in secondary container 210. Weighing mechanism 216 may comprise a load cell or a mechanism for determining the volume of food deposited into secondary container 210, for example. In this manner, the amount of food that is charged to fry device 400 at a particular time can be determined. In addition, weighing mechanism 216 can be operated during operation of conveyor 208 and the operation of conveyor 208 continued until a desired amount of food is deposited in secondary container 210. In this manner, a precise amount of food can be delivered to secondary container 210 thereby permitting consistency and uniformity in the portion of food that is delivered to fry device 400. This is also important to ensure that a sufficient quantity of food is being cooked by automated food processing system 100.

Prior to activation of dumping mechanism 218, discharge door 220 of cabinet 202 is opened by operation of a door opening device which can be any suitable device as desired and in the illustrated embodiment is a cylinder 222 attached to discharge door 220 and moveable up and down in the direction of arrow B. Cabinet 202 is preferably insulated with a suitable insulating material 224 that is also provided in discharge door 220. The provision of a suitable insulating material is important, particularly since dispensing device 200 will typically be located proximate or adjacent fry device 400 that operates at a substantially elevated temperature, thereby typically generating substantial heat.

In the illustrated embodiment, dispensing device 200 includes four dispensing lanes from which food is discharged from dispensing device 200 and to a suitable location such as fry device 400. After dispensing through discharge door 220, cylinder 222 is activated to close discharge door 220. Similarly, dumping mechanism 218 of secondary container 210 is activated to return secondary container 210 to its upright position to receive more food.

Fry device 400 includes a fry wheel 404, a fry vat 406 for containing and heating a suitable cooking oil and a drive mechanism 408 for suitably rotating fry wheel 404. It is to be understood that in accordance with one aspect of the invention any suitable frying device can be utilized.

In the illustrated embodiment of FIGS. 3 and 11–16, fry device 400 includes a plurality, in this case four, of separate fry wheels 404, 410, 412 and 414, as well as four separate fry vats 416, 406, 420 and 418 and a separate drive mechanism 408 for each fry wheel, each dedicated to a particular one of fry wheels 404, 410, 412 and 414.

In one embodiment, a separate drive mechanism is provided for each of fry wheels 404, 410, 412 and 414 and can be suitably located in cabinet 402, preferably in a location that is above the level of cooking oil present in the associated one of fry vats 416, 406, 420 and 418, respectively.

The suitable rotation of each of fry wheels 404, 410, 412 and 414 can be as desired to direct food articles loaded therein down and through the fry vat until reaching the other side of the fry vat whereupon the food articles are discharged. The rotation can be either continuous or a periodic incremental rotation. For example, a suitable drive mechanism can be provided to periodically rotate fry wheel 410 in a desired rotational increment, which may be based on the number of compartments contained in fry wheel 410. In the illustrated embodiment of FIG. 13, for example, fry wheel 410 comprises eight food compartments 422, 424, 426, 428, 430, 432, 434, and 436. Each of food compartments 422–436 is a perimeter food compartment and open to the perimeter or exterior of fry wheel 410. Each of fry wheels 404, 412 and 414 can be similarly configured.

As described in more detail hereafter, each of compartments 422–436 is formed from a perforated curved compartment forming member 510.

Figure 13:
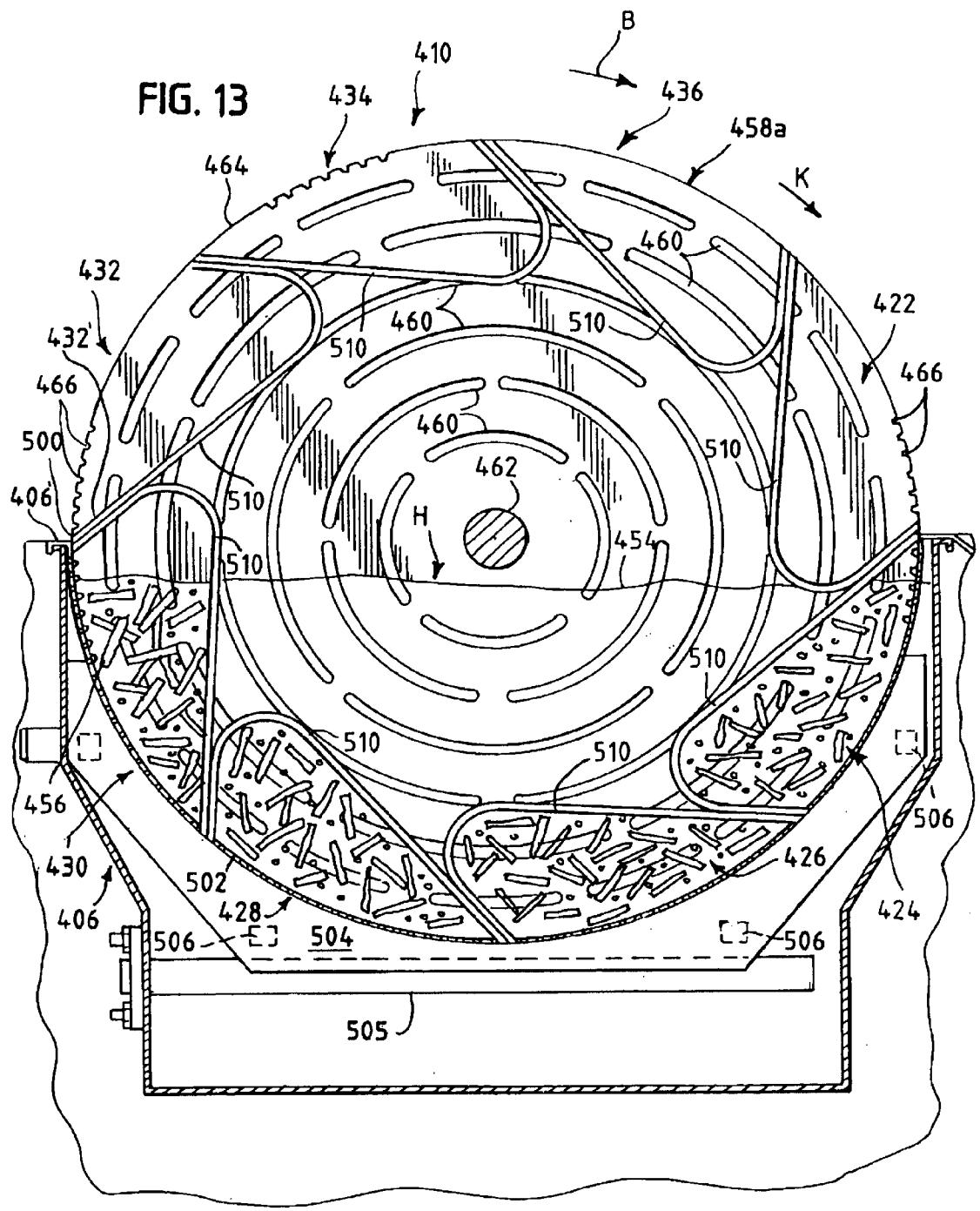
FIG. 13 is a partial fragment sectional view along line 13—13 of FIG. 11.

In the rotation of fry wheel 410, a periodic incremental rotation can be based upon 360° divided by the number of compartments. Thus, for example, in the illustrated embodiment of FIG. 13, each periodic rotation would consist of a rotation of 360° divided by eight compartments or a periodic rotation increment of 45°. Thus, as illustrated in FIG. 13, the food contained, in this case French fries, in compartments 424–430 would remain in cooking oil 454 contained in fry vat 406 for all or part of four incremental rotations, after which the food would be discharged from fry wheel 410 in the next incremental rotation thereof. For example, as illustrated in FIG. 13, compartment 422 is ready to receive a charge of food to be fried, compartment 424 has a charge of food that has been just immersed in cooking oil 454. Cooking oil 454 is at a level H as illustrated in FIG. 13, which is dependent upon the amount of food contained in compartments 422–436 that are submerged in cooking oil 454.

Similarly, compartment 426 has food contained therein that has gone through two incremental 45° rotations of fry wheel 410, compartment 428 has food contained therein that has undergone three incremental rotations and food compartment 430 has food contained therein that has undergone four incremental rotations of fry wheel 410 and compartment 432, which is now empty, has discharged the food contained therein upon the last incremental rotation of fry wheel 410. Thus, upon the next incremental rotation of fry wheel 410, which is in the clockwise direction as shown by arrow B of FIG. 13, the food contained in food compartment 430, which in this case is a quantity of French fries 455, will be discharged from compartment 430 to the food packaging device which is hereafter briefly described.

Upon discharge of food, which in this case is a quantity of French fries from one of compartments 422–436 of a fry wheel, such as fry wheel 410 as illustrated in FIG. 3, the food is deposited onto an inlet chute 604 of food packaging device 600.

From inlet chute 604, the food from inlet chute 604 received from fry wheel 410 is deposited into rotatable food dispensing member 606. Typically, rotatable food dispensing member 606 will be compartmented into a plurality of compartments that are arrayed along the periphery of rotatable food dispensing member 606.

Rotatable food dispensing member 606 has a discharge location to discharge the food deposited therein. The discharge location is generally located towards an upper portion of rotatable food dispensing member 606. A food dispensing chute mechanism 608 is positioned to receive cooked food from the discharge location of rotatable food dispensing member 606. In a preferred embodiment, food dispensing chute mechanism 608 incorporates a device for weighing or otherwise determining the quantity of food that has been deposited into food dispensing chute mechanism 608. This ensures that when food is dispensed from food dispensing chute mechanism 608 a minimum quantity of food will be dispensed, thereby ensuring that a container 611 or other package that is to receive the food from mechanism 608 will receive a desired charge.

Food packaging device 600 preferably also includes a suitable automated container handling system 610. Automated container handling system 610 is capable of, in a preferred embodiment, selecting container 611 of a desired size, retrieving and grasping container 611, erecting unerected container 611 into an erected form and holding the erected container 611 in position to receive food dispensed from food dispensing chute mechanism 608.

After food container 611 receives food from food dispensing chute mechanism 608, automated container handling system 610 is capable of moving container 611 having food deposited therein to a container receiving receptacle 612 which receptacle 612 can be transported via a conveyor system 614 to a desired location for subsequent pickup of container 611 having food contained therein by a human operator, for example.

Preferably, a food overflow collection member is provided to collect any food dispensed by food dispensing chute mechanism 608 that is not deposited into container 611. In one embodiment, the overflow food collection device is a rotatable food collection member 613. Overflow food collection member 613 functions to collect food dispensed by food dispensing chute mechanism 608 that is not received in container 611 and to recycle food collected by overflow food collection member 613 into food dispensing chute mechanism 608 for subsequent dispensing to a container in a first-in, first-out manner so that overflow food is promptly recycled to dispensing chute 608 for dispensing to a container.

Preferably, food packaging device 600 is configured to include a provision by which food contained in dispensing device 600 is routed to waste where it is not desired to dispense such food into a food container. Such a condition could arise, for example, if food is held for too long a period in food packaging device 600. This function may be accomplished, for example, by providing a waste discharge location which can be in the form of a waste chute 615 to which food from rotatable food dispensing member 606 and overflow food collection member 613 can be directed. In one embodiment, chute mechanism 608 is lowered and member 606 is rotated to dispense food to chute mechanism 608, which in turn dispenses into member 613. Member 613 is rotated counterclockwise to deliver food to waste chute 615. This process can be continued until all of the food in device 600 is so emptied, if desired.

Preferably, a suitable structure for applying a desired quantity of seasoning to food contained in food packaging device 600 is provided. In the embodiment illustrated in FIG. 3, a food seasoning device 616 is provided. Food seasoning device 616 can be any suitable seasoning device as desired. In one embodiment, food seasoning device 616 dispenses a desired quantity of seasoning from a bulk storage container through a delivery tube and onto food located in rotatable food dispensing member 606.

Preferably, and in the embodiment illustrated in FIG. 3, a food seasoning device 616 is provided that directs a desired quantity of seasoning onto food that is contained in a bottom portion of rotatable food dispensing member 606 and inlet chute 604 via a seasoning dispensing head 618.

Preferably, conveyor system 614 is composed of a raceway 620 that is an endless loop around the periphery of the top surface of cabinet 602 of food packaging device 600, which in one embodiment can be a modular, wheeled cabinet. Conveyor system 614 causes container receiving receptacle 612 to travel around raceway 620 to a food container pickup location 622 where a human operator can pickup food containers having food therein. Preferably, conveyor system 614 includes structure for stopping movement of a container/receiving receptacle 612 at a predetermined location when carrying a food container, such as at food container pick up location 622. Such structure in one embodiment may comprise a gate structure 928 or 928' of FIG. 45 and FIGS. 25–27, respectively, that extends across at least a portion of raceway 620 in the vicinity of the predetermined location. Any suitable type of barrier structure can be utilized to prevent the desired movement. Most preferably, gate structure 928 or 928' will be located at a height that is above the top of the receptacle when located on conveyor system 614 so that movement of container/receiving receptacle 612 is prevented or stopped only for a receptacle 612 that has a food container 611 disposed thereon. Note that the pickup location can be configured as desired and slightly different configurations 622 and 622' are shown in FIG. 45 and FIGS. 25–27, respectively.

Figure 2:
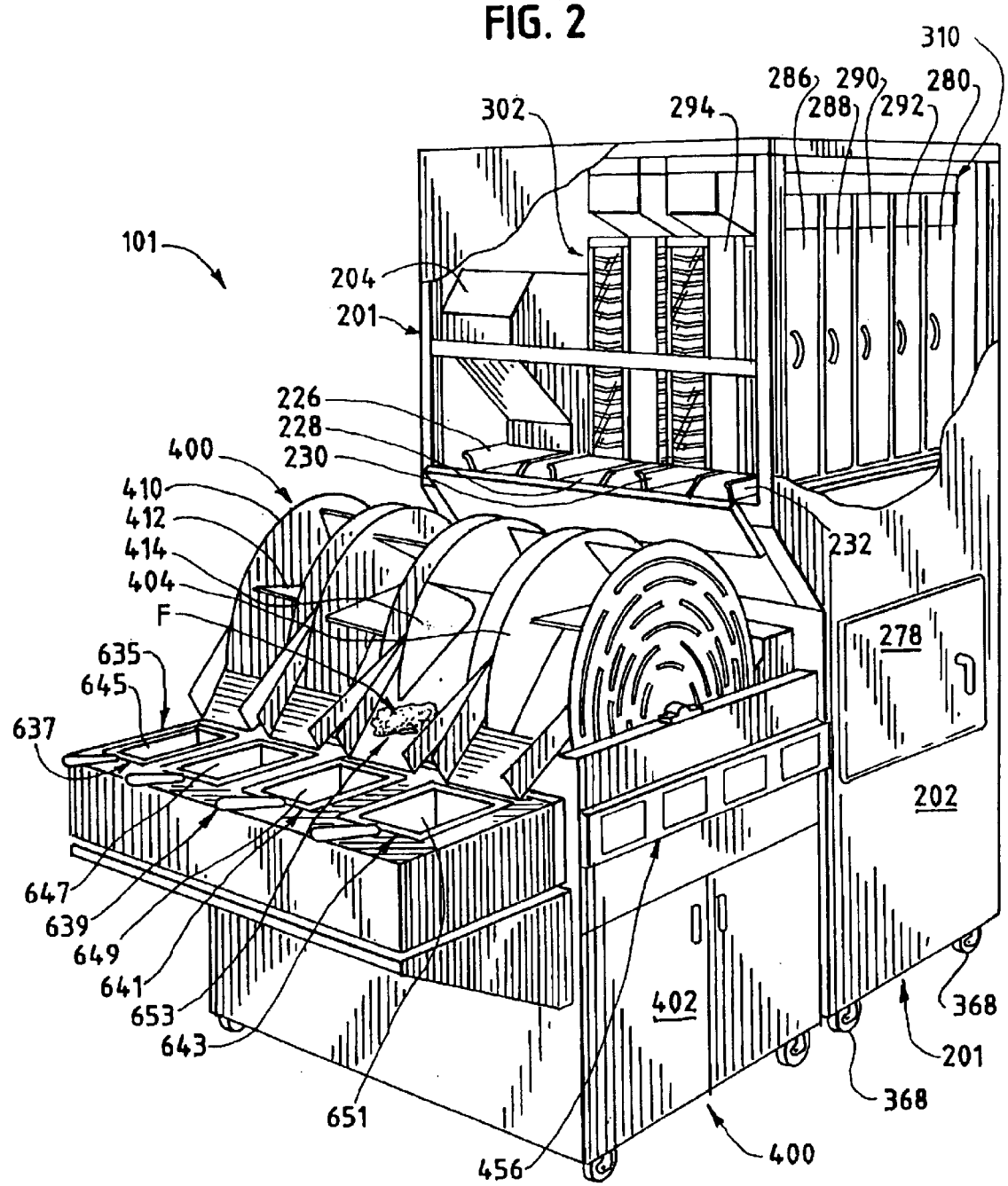
FIG. 2 is a perspective view of an alternate embodiment of a food processing system in accordance with the present invention.

Referring to FIG. 2, there is illustrated an alternate embodiment of an automated food processing system 101 in accordance with the invention. Automated food processing system 101 includes a food dispensing device 201 which is similar to food dispensing device 200, previously briefly described, where like reference numerals represent like elements. Food dispensing device 201 includes fewer uncooked bulk food dispensing containers 204 and additional magazine food dispensers that are similar to magazine food dispenser 206, previously referred to. Otherwise, dispensing device 201 is similar to dispensing device 200 previously described.

Automated food processing system 101 also includes fry device 400, which has been described.

One primary distinction between automated food processing system 100 and automated food processing system 101 is that automated food processing system 101 does not include an automated packaging device such as automated packaging device 600. In place of food packaging device 600, a food storage device 635 is provided. Food storage device 635 allows food cooked by food frying device 400 to be stored in a heated environment for subsequent manual processing. As configured in FIG. 2, food storage device 635 includes separate heated product receiving receptacles 637, 639, 641 and 643. Each receptacle 637, 639, 641 and 643 is dedicated to receiving food from a respective one of fry wheels 410, 412, 414 and 404, respectively. In addition, each receptacle 637–643 can have placed therein a suitable container to receive food, such as handled trays 645, 647, 649 and 651.

As illustrated in FIG. 2, a food item F is being discharged from fry wheel 414 down a chute 653 and into handled tray 649 contained within heated receptacle 641. Food item F can be stored therein for a period of time until it is ready for subsequent processing.

Food Dispensing Device

Referring to the Figures generally and in particular to FIGS. 1–10, there is illustrated various embodiments of food dispensing devices and portions thereof in accordance with the invention.

In one embodiment, food dispensing device 200 is illustrated or partially illustrated in FIGS. 1 and 3–8. Food dispensing device 200 includes a cabinet 202, bulk uncooked food dispensing containers 204, 205 and 207, magazine food dispenser 206, 209, 211 and 213, and a suitable conveyor system for each lane 234, 236, 238 and 240 of food dispensing device 200. Any suitable number of magazine dispensers can be used for a particular lane, such as one, two, three, four, five or more, and the illustrated embodiment of four is merely an example. As configured in FIG. 1, for example, lane 234 receives material from bulk hopper 204, lane 236 receives food material from bulk hopper 205, lane 238 receives food material from bulk hopper 207 and lane 240 receives dispensed food from magazine food dispensers 206, 209, 211 and 213 as will be described hereinafter in greater detail, particularly with respect to food dispensing device 201 of FIG. 2, for example.

Each lane 234, 236, 238 and 240 dispenses food that is subsequently directed to fry wheels 410, 412, 414 and 404, respectively.

The components of lane 238 will now be described in detail and it is to be understood that the components of lanes 234 and 236 are similar. Lane 238 includes uncooked bulk food dispensing container 207 and a food handling system 242 which in this embodiment is identical for each lane 234, 236, 238 and 240 as well as for each lane of food dispensing device 201. It should be noted that food handling system 242, as for example, illustrated in FIGS. 3–6 is depicted with respect to lane 240 and that food handling system 242 is the same for each lane 234, 236, 238 and 240.

Food handling system 242 includes conveyor system 208, secondary container 210, weighing mechanism 216 and dumping mechanism 218. Conveyor system 208 includes vibratory mechanism 212 and conveyor body 214.

Uncooked bulk food dispensing container 204 can be of a shape and dimension generally as desired. Preferably, uncooked bulk food dispensing container 204 has an upper opening to permit a supply of food to be placed in uncooked bulk food dispensing container 204. Upper opening 244 as illustrated is located in an upper rear portion of uncooked bulk food dispensing container 204 and can be conveniently accessed via a rear door 246 of cabinet 202. Rear door 246 preferably is insulated with suitable insulation material 224.

Uncooked bulk food dispensing container 204 is composed of a pair of opposed upper sidewalls 248, a pair of generally opposed lower sidewalls 250 and front and rear walls 252 and 254, respectively, which connect together upper sidewalls 248 and 250 to provide uncooked bulk food dispensing container 204. Front sidewall 252 includes a lower portion 252' that extends inwardly from top to bottom to further facilitate discharge of food contained in uncooked bulk food dispensing container 204. Preferably, lower generally opposed sidewalls 250 are slightly indented from top to bottom to facilitate the discharge of food that may be contained therein.

Uncooked bulk food dispensing container 204 includes a bottom opening 256 that permits the discharge of food contained therein. Bottom opening 256 can be configured as desired and in the illustrated embodiment the entire bottom of uncooked bulk food dispensing container 204 is open. In the illustrated embodiment, uncooked bulk food dispensing container 204 is particularly suited for use with food such as French fries and chicken nuggets as well as other types of food of relatively small size.

Uncooked bulk food dispensing container 204 is suitably mounted within cabinet 202. While a suitable mounting structure can be utilized, it is preferred to utilize a structure that will minimize heat transfer from the exterior and through cabinet 202 to uncooked bulk food dispensing container 204, particularly where cabinet 202 is refrigerated, especially where temperatures below freezing are utilized. In that regard, front mounting bracket 258 and rear mounting bracket 260 each are configured to minimize heat transfer from cabinet 202 to uncooked bulk food dispensing container 204. In that regard, front mounting bracket 258 and rear mounting bracket 260 include openings, 258' and 260', respectively, to minimize such heat transfer and to maximize airflow around the containers 204, 205, 207 and dispensers 206, 209, 211 and 213. Similarly, materials of low thermal conductivity can also be utilized, if desired, for brackets 258 and 260. Generally, to minimize heat transfer and to maximize airflow, the surface area contact and cross-sectional area of mounting brackets 258 and 260 should be minimized to reduce heat transfer and "hot spots" on uncooked bulk food dispensing container 204.

Figure 4:
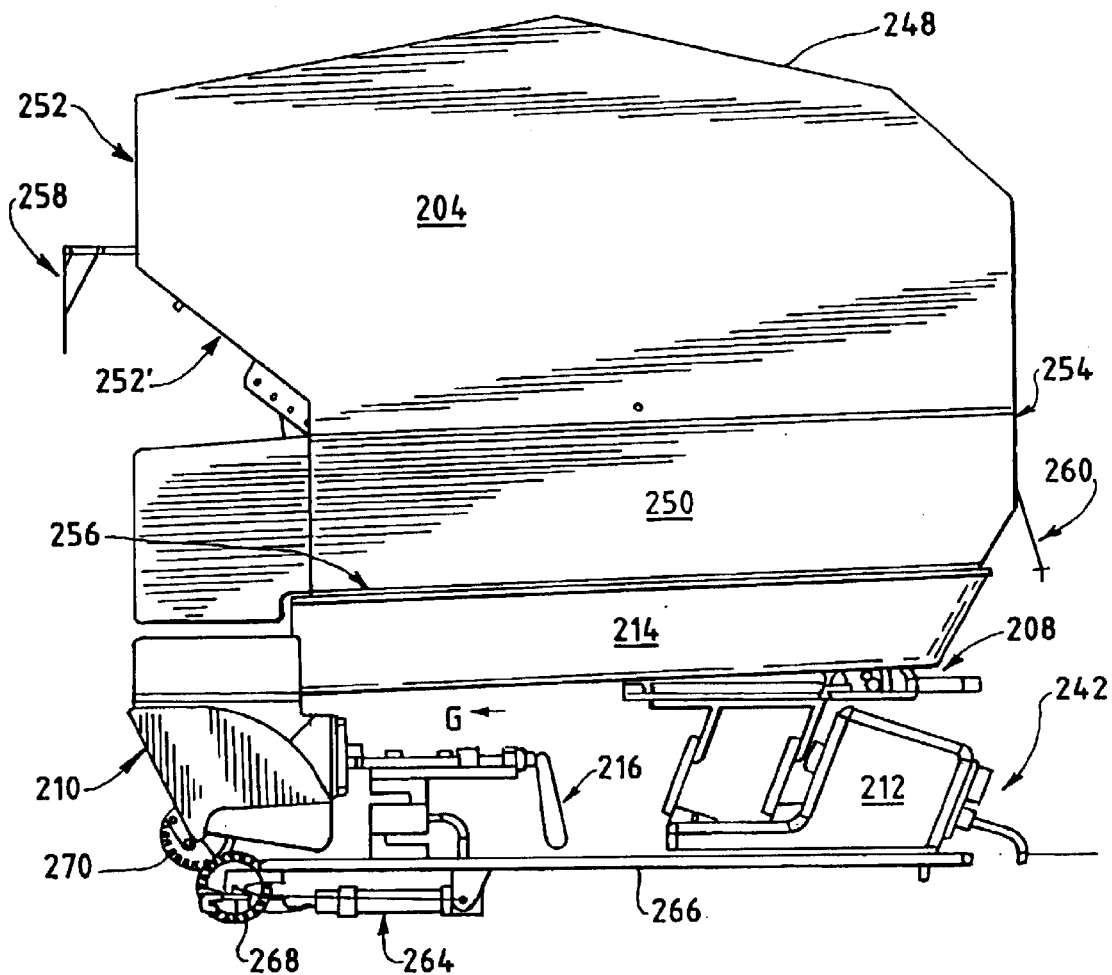
FIG. 4 is a side elevation view of a portion of a bulk food dispensing device in accordance with the present invention.

As illustrated in FIGS. 3 and 4, for example, food contained in uncooked bulk food dispensing container 204 passes through bottom opening 256 and onto conveyor body 214 which in the illustrated embodiment is a suitably dimensioned pan. Conveyor body 214 is suitably mounted to vibratory mechanism 212 to effect vibration of conveyor body 214 as well as food contained therein and food contained in uncooked bulk food dispensing container 204, and in particular the lower portion of container 204. This vibration facilitates the discharge of food from uncooked bulk food dispensing container 204 and causes food contained in conveyor body 214 to travel in the direction of arrow G. Any suitable conveyor system can be used in accordance with one aspect of the invention.

A preferred type of vibratory mechanism is available from FMC Technologies, Inc. of Chicago, Ill. marketed under the model F-010-B and DF-010-B. Vibratory mechanism 212 is preferably an electromagnetic vibrating mechanism. Vibratory mechanism 212 in one embodiment produces a vibrating stroke at the surface of conveyor body 214. The stroke results from the action of an electromagnet that pulls conveyor body 214 sharply down and backward and then allows it to spring up and forward. Typical vibratory mechanisms of this type run at about 3,600 vibrations/minute at 60 Hz power. The power of the vibrating stroke can be controlled by a suitable drive module as is known in the art. In one embodiment, vibratory mechanism 212 can be operated at about 85% of full power during filling of secondary container 210 with food. For the first part of a fill cycle of secondary container 210, vibratory mechanism 212 can be run continuously, then pulsed by turning its power on and off periodically so that vibratory mechanism 212 operates about 50% of the time to finish filling secondary container 210 with a desired quantity of food, thereby providing better control on the last part of the food charged to secondary container 210.

Food dispensing device 200 preferably includes a suitable mechanism to determine the weight or volume of a charge of food delivered by conveyor system 208 to secondary container 210. The amount may be determined either by weight or volume, for example. In the illustrated embodiment, weighing mechanism 216 is operatively interfaced with secondary container 210 to provide an indication of the weight of food contained in secondary container 210. The weight sensed in secondary container 210 by weighing mechanism 216 is communicated with control system 114 of food dispensing device 200. Control system 114 monitors and controls the operative functions of food dispensing device 200 as hereinafter described in greater detail.

Optionally, a level sensor can be employed in uncooked bulk food dispensing container 204 to provide an indication of the amount of food stored therein that is available for dispensing. Any suitable level indicator known in the art can be utilized in accordance with the invention such as photoelectric, weight, turning fork and others, for example.

Secondary container 210 can be considered as a dump container and as associated therewith, dumping mechanism 218 for rotating secondary container 210 through an arc as indicated by arrow B sufficiently to dump the contents of secondary container 210. Any suitable dumping mechanism can be utilized. Illustrated dumping mechanism 218 includes a dump cylinder 264 that is secured to a base 266. Dump cylinder 264 can selectively rotate a drive gear or wheel 268 that, in turn, is operatively associated with a follower gear or wheel 270 to cause rotation of follower gear or wheel 270. Secondary container 210 is rigidly secured to follower gear or wheel 270 so that when follower gear or wheel 270 is rotated by drive gear or wheel 268 secondary container 210 is rotated through an arc that causes secondary container 210 to rotate forward to a dumping position as illustrated in phantom lines in FIG. 3 indicated by reference numeral 210'. Such movement is caused by extension of dump cylinder 264. Similarly, retraction of dump cylinder 264 moves secondary container 210 from the dump position indicated by reference numeral 210' to the upright position indicated by reference numeral 210 in FIG. 3 where secondary container 210 is ready to receive a charge of food from conveyor system 208, which in the illustrated embodiment the food is French fries FF.

Figure 4A:
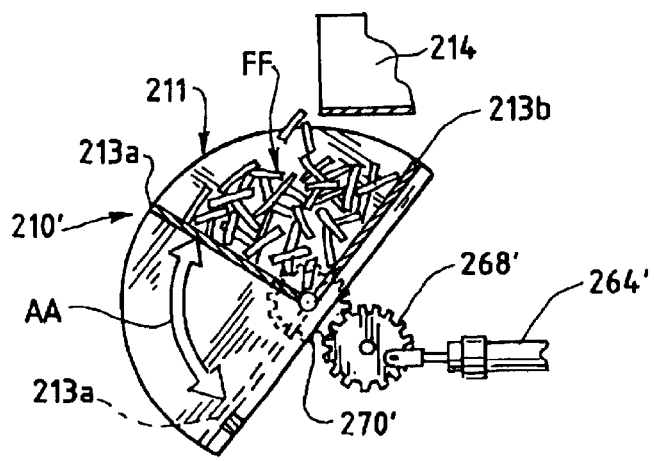
FIG. 4A is a side elevation view, partly in section, of an alternative embodiment for a portion of the dispensing device illustrated in FIG. 4.

An alternative embodiment for secondary container 210 is illustrated in FIG. 4A. Secondary container 210' is composed of a pair of opposed spaced apart sidewalls 211 (only one sidewall 211 is illustrated and is depicted in a half-moon configuration) and a pair of sidewalls 213a and 213b, oriented in a V-shaped relationship when container 210' is configured to receive food from conveyor body 214. Sidewall 213a is mounted for pivotal movement about an apex identified by sidewalls 213a and 213b. Such movement is accomplished by a drive mechanism similar to cylinder 264, drive gear 268 and driven gear 270, which in this embodiment are cylinder 264', drive gear 268' and driven gear 270', which gear 270' is attached to sidewall 213a. When cylinder 264' is extended, sidewall 213a is caused to pivot downwardly as indicated by arrow AA to the position of sidewall 213a shown in phantom, thereby causing the contents (French fries FF) of container 210' to be dumped. Sidewalls 211 act as sidewall guides for sidewalls 213a and 213b when sidewall 213a is in a lowered position, in which case sidewalls 213a and 213b act as a chute or slide.

Control system 262 coordinates the operation of the various functions of food dispensing device 200. For example, when food dispensing device 200 is ready to dump a charge of food from secondary container 210 out of food dispensing device 200, control system 262 activates cylinder 222 to open discharge door 220 thereby permitting the food charge in secondary container 210 to be dumped by dumping mechanism 218 through open discharge door 220. After dumping of the food charge is completed, control system 114 causes dump cylinder 264 to be retracted thereby returning secondary container 210 to a position ready to accept a further charge of food from conveyor system 208. Cylinder 222 has one end rigidly secured to cabinet 202 or some other suitable location and the other end of cylinder 222 is attached to discharge door 220. Typically, discharge door 220 will have a suitable guide mechanism, which may be tracks, slots or other suitable apparatus to guide discharge door 220 to its open and closed positions. Cylinder 222 is operable to move door 220 up and down as indicated by arrow B in FIG. 6 to thereby open and close discharge door 220 as desired. In the illustrated embodiment, discharge door 220 extends across all four dispensing lanes 226, 228, 230 and 232. If desired, a separate discharge door could be provided for each of dispensing lanes 226, 228, 230 and 232. In addition, control system 262 causes activation of cylinder 222 to close discharge door 220 to prevent heat from entering into cavity 272 of food dispensing device 200 in which the food and various dispensing mechanisms are contained as illustrated in FIGS. 3 and 6, for example.

Food dispensing device 200 can contain suitable refrigeration components 274 such as within a lower portion of cabinet 202 as shown schematically in FIG. 1. In accordance with the preferred embodiment of food dispensing device 200, refrigeration components 274 provide sufficient cooling to provide a below freezing temperature environment in cavity 272. Alternatively, suitable refrigeration components can be provided exteriorly of cabinet 202 and even at a remote location as desired. In addition, a storage compartment 276 and a storage compartment door 278 may also be provided in cabinet 202. An upper side access door may also be provided to permit operator access to the interior of cavity 272 where uncooked bulk food dispensing containers 204 and/or magazine food dispensers 206 and/or 209, 211 and 213 are located.

Referring to FIGS. 2 and 7–10, there is illustrated another embodiment of food dispensing device 201 in accordance with the present invention.

Figure 9:
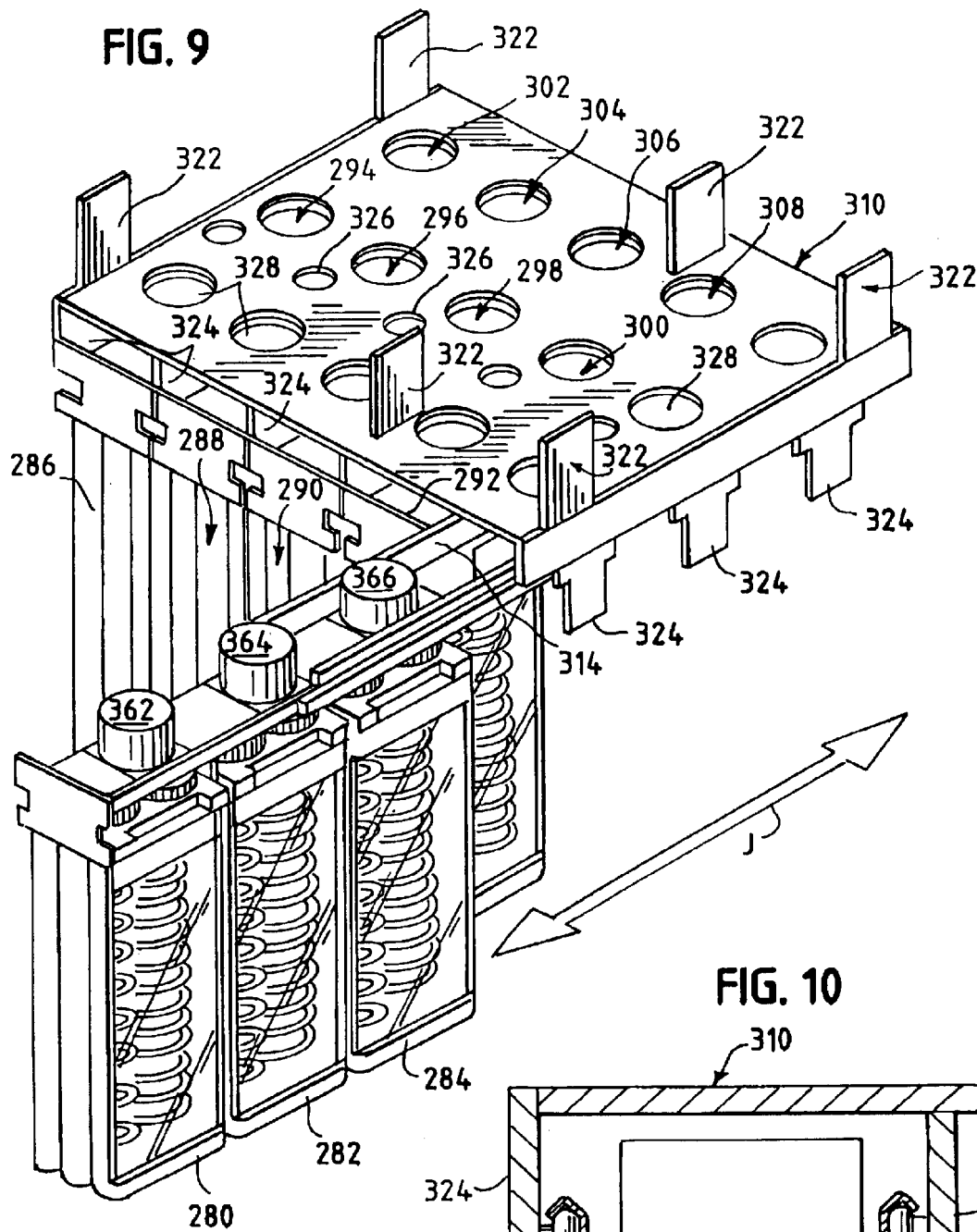
FIG. 9 is a perspective view of a magazine-type dispenser array that can be utilized in the dispenser of the present invention.
Figure 10:
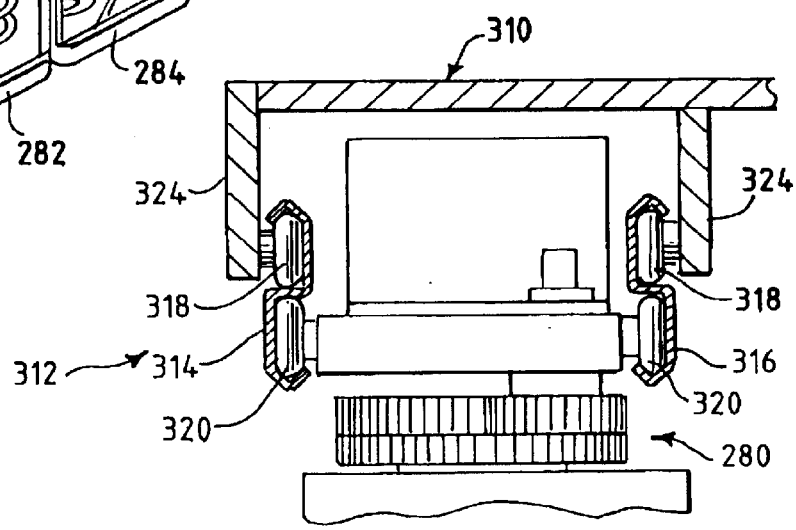
FIG. 10 is a fragmentary view of the device of FIG. 9.
Figure 11:
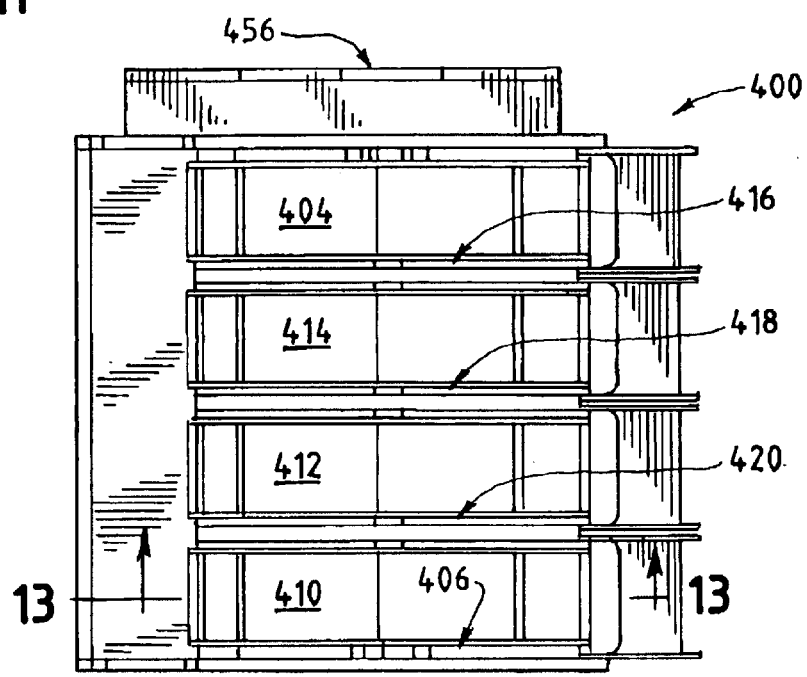
FIG. 11 is a top plan view of a food frying device in accordance with the present invention.
Figure 12:
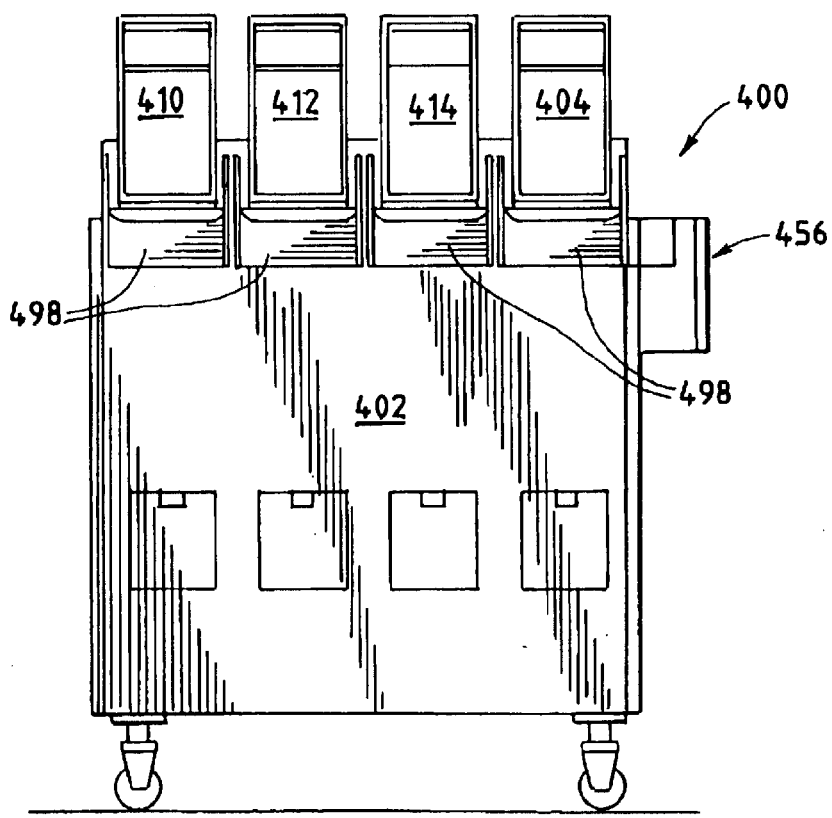
FIG. 12 is a front elevation view of the food frying device of FIG. 11.

Food dispensing device 201 has many similarities to food dispensing device 200 previously described where like reference numerals represent like elements. Thus, food dispensing device 201 includes cabinet 202, four product dispensing lanes 226, 228, 230 and 232 with each such lane incorporating conveyor system 208, secondary container 210, vibratory mechanism 212, conveyor body 214, weighing mechanism 216, dumping mechanism 218, discharge door 220, cylinder 222, insulating material 224, food handling system 242, upper opening 244, rear door 246, uncooked bulk food dispensing container 204 which is associated with product dispensing lane 234, a dump cylinder 264 for each product dispensing lane, cavity 272, refrigeration components 274, storage compartment 276 and a storage compartment door 278. Product dispensing lanes 228, 230 and 232 each have associated therewith a plurality of magazine food dispensers 280–308 arrayed to provide in the embodiment illustrated in FIG. 9 five magazine food dispensers per product dispensing lane in which there are three product dispensing lanes serviced by the foregoing magazine food dispensers. Consequently, magazine food dispensers are configured in a three-by-five array and are suspended from a magazine food dispenser support 310 as shown in FIG. 9. Each row of three magazine food dispensers depends from magazine food dispenser support 310 via a slide assembly 312. Slide assembly 312 is similar to a drawer slide including a pair of first and second elongated telescoping left and right slides 314 and 316, respectively. Suitable upper rollers 318 are mounted to magazine food dispenser support 310 and lower rollers 320 depend from magazine food dispensers 280–308 for traversing left and right elongated telescoping slides 314 and 316.

Suitable mounting brackets 322 are provided which depend upwardly from magazine food dispenser support 310 for mounting to cabinet 202.

In addition, suitable mounting brackets 324 are provided which depend downwardly from magazine food dispenser support 310 for mounting slide assembly 312 thereto allowing magazine food dispensers 280–308 to depend therefrom.

Magazine food dispenser support 310 has a series of holes 326 and 328 therein. Holes 326 can be provided to allow increased airflow and cooling. Holes 328 can also be provided to provide increased airflow and cooling for magazine food dispensers 280–308.

Each of magazine food dispensers 280–308 and 206, 209, 211 and 213 briefly discussed with respect to food dispensing device 200 are similar in construction. Magazine food dispenser 206 will be discussed with respect to FIGS. 7 and 8 and it is to be understood that the other magazine food dispensers are of similar construction.

Magazine food dispenser 206 includes a body or housing 330 that includes sidewalls 332 and 334, front walls 336 and 338 and corresponding rear walls (not shown) and can be attached in a removable manner if desired, including in a snap-on arrangement to facilitate cleaning. Magazine food dispenser 206 also includes a top member or cover 340 having mounted thereover a drive mechanism 342. Drive mechanism 342 includes a drive gear or wheel 344 and a driven wheel or gear 346. Depending from each of drive wheel or gear 344 and driven wheel or gear 346 is a spiral flight that is vertically or generally vertically oriented relative to the longitudinal axis of spiral flights 348 and 350. If desired, a single spiral flight dispenser (not shown) could also be utilized.

Body 330 of magazine food dispenser 206 can include substantial open portions such as front open portion 352 and a corresponding rear open portion (not shown). Such open portions may have a cover or access door thereover (not shown). Such open portions can be desirable to permit airflow through magazine food dispenser 206 since generally such dispenser will be contained in a refrigerated environment and such openings help ensure that food contained therein remains frozen or chilled as desired. A vertical divider (not shown) can be provided between spiral flights 348 and 350 if desired.

A plurality of generally vertically disposed and spaced apart rods 354, 356 and 358 may be provided at the front of magazine food dispenser 206 adjacent spiral flights 348 and 350 and similar rods can be provided at the back of magazine food dispenser 206. Rods 354, 356 and 358 prevent food pieces from falling out of spiral flights 348 and 350 and to maintain spiral flights 348 and 350 in a vertical orientation.

Magazine food dispenser 206 has an open bottom 360 through which food pieces can be dispensed during operation.

During operation, drive wheel 344 can be driven by a suitable electric motor, such as an electric motor 362, 364 and 366 shown with respect to magazine food dispensers 280, 282 and 284 in FIG. 9. Alternatively, other drive devices could be used, including, for example, a rotary air or hydraulic cylinder. Rotation of drive wheel 344 in a clockwise direction causes driven wheel 346 to rotate in a counterclockwise direction by virtue of the intermeshing or contact between drive wheel or gear 344 and driven wheel or gear 346. Such rotation causes corresponding rotation of spiral flights 348 and 350, respectively. Food contained by spiral flights 348 and/or 350 is moved downwardly by virtue of such rotation. When such food reaches the bottom of spiral flights 348 and/or 350, respectively, such food is discharged from magazine food dispenser 206 through open bottom 360 and onto conveyor system 208 for handling as previously described. A single motor could be used to drive a plurality of dispensers 280, 282 and 284, etc. through a suitable drive mechanism (not shown).

Figure 7:
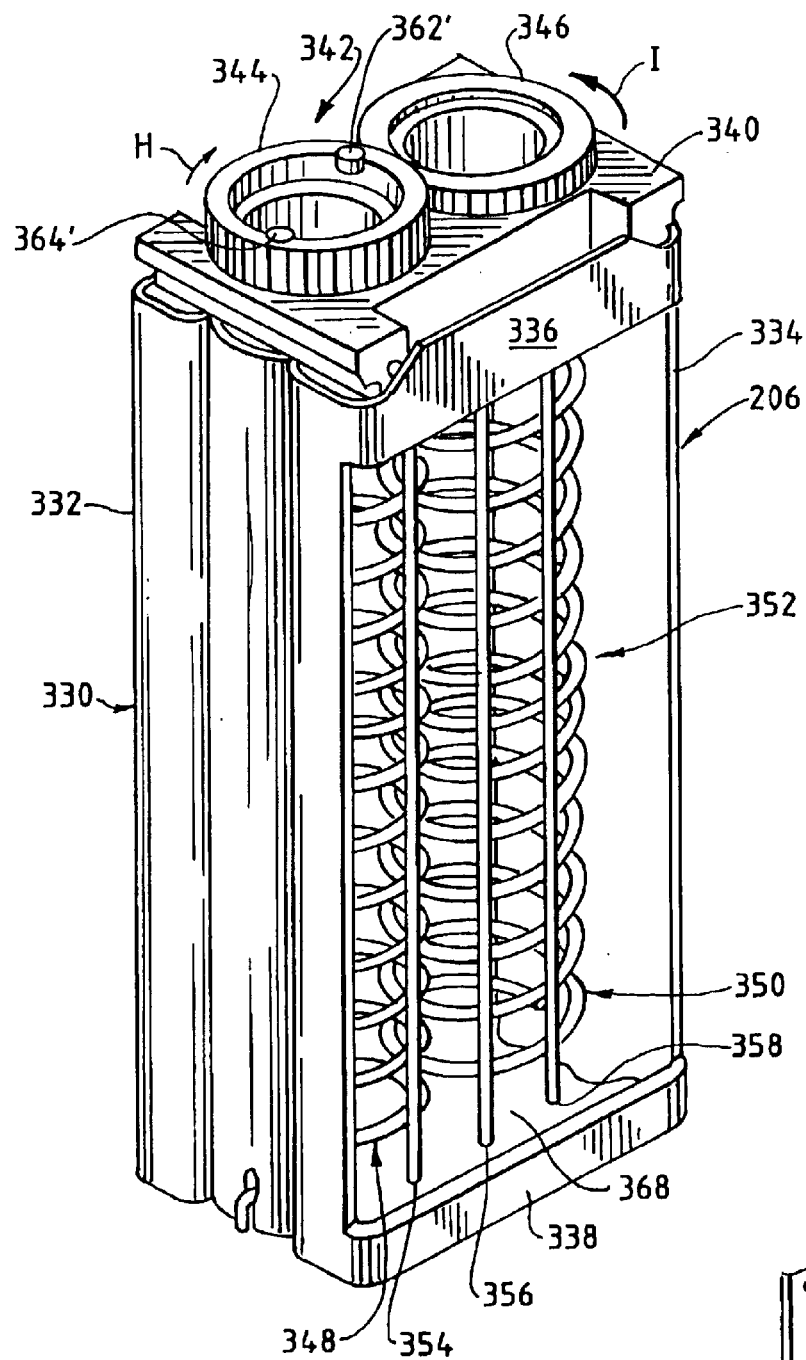
FIG. 7 is a perspective view of a magazine-type dispenser that can form part of the food dispensing device of the present invention.
Figure 8:
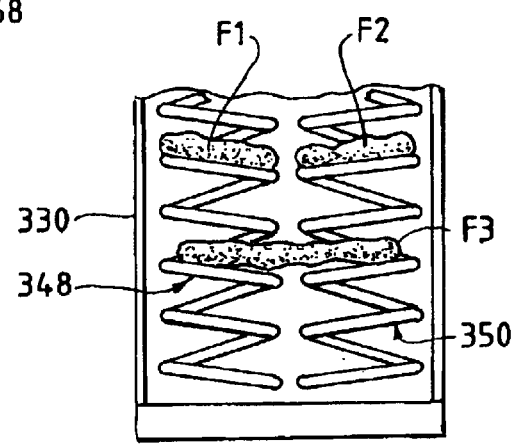
FIG. 8 is a partial side elevation view of the magazine dispenser of FIG. 7.

As shown in FIG. 8, pieces of food can be contained by magazine food dispenser 206 in two different ways. For example, individual pieces of food may each be contained by a single elongated spiral flight 348 or 350 as shown with respect to food pieces F1 and F2, respectively. Food pieces F1 and F2 can be any type of desired food and may be a food item such as a hash brown, an individual portion pie, rectangular food patty, or other type of food as desired. Chicken nuggets and other food can also be dispensed with the bulk dispenser previously described. Larger items of food can span across portions of both elongated spiral flights 348 and 350 as illustrated with respect to food item F3, which may be a larger food item, such as a chicken patty, or other type of food article as desired. Spiral flights 348 and 350 can be of a desired radial diameter so that the food piece or pieces that are to be contained and dispensed in magazine food dispenser 206 can be accommodated as illustrated in FIG. 8. Each spiral can contain a food piece so that as illustrated in FIG. 7, the illustrated spirals of spiral flights 348 and 350 could each accommodate twelve food pieces such as food pieces F1 or F2 for a total of twenty-four food pieces or twelve food pieces such as food piece F3 of FIG. 8. As will be appreciated, spiral flights having a greater or lesser number of flights can be used if desired to hold a greater or lesser number of food pieces, respectively.

A suitable home position sensor 362' can be utilized to indicate a home or start position of each of spiral flights 348 and 350. As illustrated in FIG. 7, a pair of position indicating sensors 362' and 364' are utilized and mounted on drive wheel 344 180° apart for more precise locating of the position of spiral flights 348 and 350. Sensors 362' and 364' can be proximity sensors that align with corresponding sensor pickups on the respective drive gear or motor for magazine food dispenser 206 (not shown).

Preferably, spiral flights 348 and 350 are offset by one rotation so that a single food item such as food item F1 or F2 in FIG. 8 will be dispensed from one of either spiral flight 348 or 350 for each one-half rotation of spiral flights 348 and 350.

Preferably, food dispensing device 200 and food dispensing device 201 are constructed in modular form, an example of which is illustrated in FIGS. 1 and 2, respectively. Wheels 368 are provided to permit cabinets 202, 402 and 602 to be suitably transported across a relatively flat surface, such as a restaurant work area floor.

Food Frying Device

Referring to the Figures generally, and in particular to FIGS. 1–2 and 11–24, there is illustrated fry device 400 and various components and alternative components thereof in accordance with the invention.

In one embodiment, fry device 400 includes cabinet 402, four fry wheels 404, 410, 412 and 414, four fry vats 406, 416, 418 and 420, four drive mechanisms 408, one for each of fry wheels 404, 410, 412 and 414. Each fry vat 406, 416, 418 and 420 is dimensioned to contain a desired volume of a suitable cooking oil. Each fry vat 406, 416, 418 and 420 is dedicated to one of fry wheels 404, 410, 412 and 414, respectively.

In operation in the preferred embodiment, fry device 400 is positioned to receive the food dispensed from a food dispensing device, such as food dispensing device 200 and food dispensing device 201. Consequently, it is advantageous to position fry device 400 adjacent food dispensing device 200 or 201 as illustrated in FIGS. 1 and 2, respectively. A suitable control panel 456 can be provided and located in a suitable location, such as on the side of cabinet 402. In the illustrated embodiment, control panel 456 contains a separate display for each of fry wheels 404, 410, 412 and 414 referred to by reference numerals 456a–d, respectively. Control panels and displays 456a–d can include information such as set cycle time, oil temperature, oil level as well as controls to adjust cycle time and oil temperature, for example.

Referring to FIG. 13, there is illustrated fry wheel 410. Fry wheel 410 includes two opposed circular spaced apart circular disks 458a and 458b. Disks 458a and 458b can include a plurality of apertures 460 as desired to reduce wheel weight and to provide circulation of cooking oil and to permit passage of water vapor therethrough, such as during frying food products, for example. A fry wheel axle 462 is provided to which disks 458a and 458b are mounted. Axle 462 is suitably mounted, typically and preferably for rotation with respect to fry vat 406 at a location above the normal level of cooking oil or range of levels of cooking oil that will be encountered in fry vat 406 during operation.

In one embodiment, outer peripheral edge 464 of each of disks 458a and 458b include a plurality of teeth 466.

Figure 14:
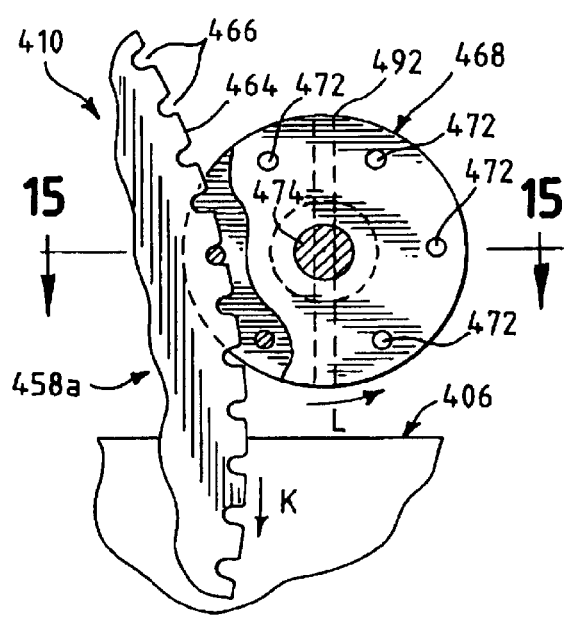
FIG. 14 is a fragmentary sectional view of a portion of the food frying device of FIG. 11.
Figure 15:
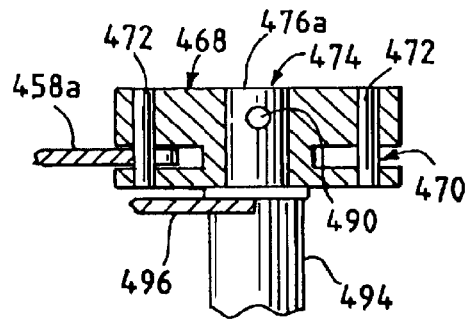
FIG. 15 is a sectional view along line 15—15 of FIG. 14.
Figure 16:
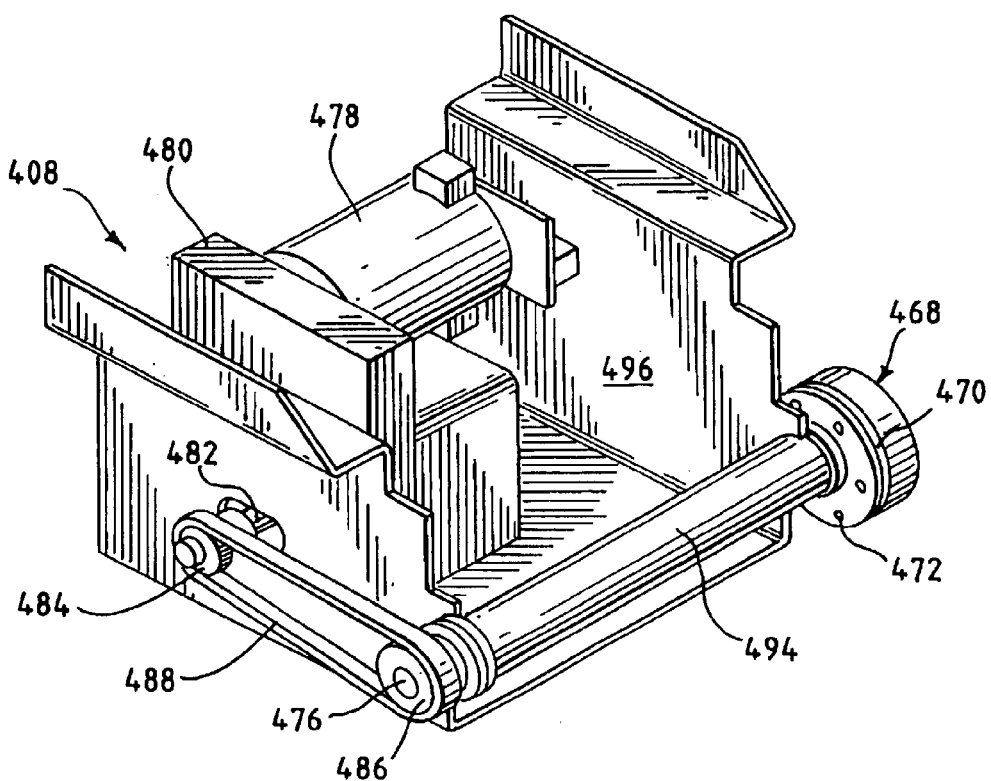
FIG. 16 is a perspective view of a drive mechanism for the food frying device of FIG. 11.

Teeth 466 can be utilized to drive fry wheel 410 in a manner as hereinafter described. Referring to FIGS. 14–16, there is illustrated in sectional view of disk 458a of fry wheel 410, a portion of which is located within fry vat 406. A drive wheel 468 is associated in operative position relative to teeth 466 located on outer peripheral edge 464 of disk 458a. Drive wheel 468 can be formed from a disk of material of a suitable thickness having a circumferential groove 470 therein. Circumferential groove 470 is typically at least or slightly greater than the thickness of disk 458a in the area where drive wheel 468 and disk 458a are juxtaposed as illustrated in FIGS. 14 and 15. A series of spaced apart pins 472 extend across circumferential groove 470 and are radially arrayed and spaced from the center of drive wheel 468. Drive wheel 468 includes a central aperture 474 through which a drive axle 476 can be mounted. In operation, drive wheel 468 is rotated by drive axle 476 with drive wheel 468 being positioned a fixed distance from disk 458a so that pins 472 mesh with teeth 466 when rotated as illustrated in FIG. 14 thereby causing rotation of disk 458a and consequently fry wheel 410 in a direction of rotation opposite to the rotation of drive wheel 468, as indicated by arrows K and L of FIG. 14.

It is to be understood that any suitable drive wheel and drive arrangement can be utilized. For example, in place of drive wheel 468 with pins 472, a drive arrangement could be utilized in which a drive gear is utilized to mesh with a corresponding gear located around the periphery of disk 458a and/or 458b, for example. Alternatively, a friction drive system could be utilized in which a friction drive wheel would contact the edge of one or both of circular disks 458 which could be of a design having no teeth therealong, such as illustrated in alternative embodiment wheels 479 and 481 described hereafter. Since the wheel will have cooking oil thereon, the coefficient of friction between the drive wheel and fry wheel will be decreased. Care should be taken to assure that when using a friction drive, sufficient pressure is maintained between the driving wheel and the fry wheel.

Referring to FIG. 16, there is illustrated a drive mechanism for driving drive wheel 468. The drive mechanism includes an electric motor 478, a gear reduction drive 480, an output shaft 482, a drive pulley wheel 484, a driven pulley wheel 486 and a drive belt 488 extending around drive pulley wheel 484 and driven pulley wheel 486 to drive axle 476 which thereby drives drive wheel 468 since the end 476a of axle 476 is fixed in aperture 474 with respect to drive wheel 468. A shear pin 490 can be located in a shear pin aperture 492 of drive wheel 468 to retain axle 476 in a fixed position relative to drive wheel 468. Axle 476 is suitably contained within an axle journal 494 which, in turn, is mounted to frame 496 to permit movement of axle 476 relative to axle journal 494 and frame 496. Similarly, motor 478 and gear reduction drive 480 are suitably mounted to frame 496. If desired, motor 478 may be a stepper motor.

Typically, it is important that the fry wheel is rotated in periodic increments for a compartment to be aligned with a respective discharge slide 498 of fry device 400 or other slide, ramp or discharge location after a periodic rotation. Typically, the leading edge 500 of a compartment bottom, such as compartment bottom 432' of compartment 432 as shown in FIG. 13 is aligned with the upper edge of fry vat 406 or the top edge of discharge chute 498 associated therewith to allow the contents of compartment 432 to be discharged therefrom. As illustrated in FIG. 13, the contents of compartment 432 have already been discharged from fry wheel 410. This is particularly important where incremental rotation of fry wheel 410 is utilized as opposed to a continuously moving fry wheel. Thus, for incremental rotation it is desirable for bottom edge 500 of compartment 432 to be aligned with discharge 498 or the upper edge 406' of fry vat 406. In order to accomplish this, a stepper motor can be utilized to drive fry wheel 410. Alternatively, or in addition, the position of the baskets can be sensed and their position adjusted accordingly to assure that all baskets are in the correct position for loading and discharge during operation. Also, utilizing location sensors allows use of a simple DC or AC motor, as opposed to a stepper or servo motor. Any suitable sensor can be utilized in conjunction with a control system to control operation of the fry wheel drive motor. Suitable sensors include proximity, magnetic reed, Hall Effect, photoelectric and capacitive sensors. Such sensors are well known in the art and consequently a detailed description of those sensors is not included herein.

Figure 20:
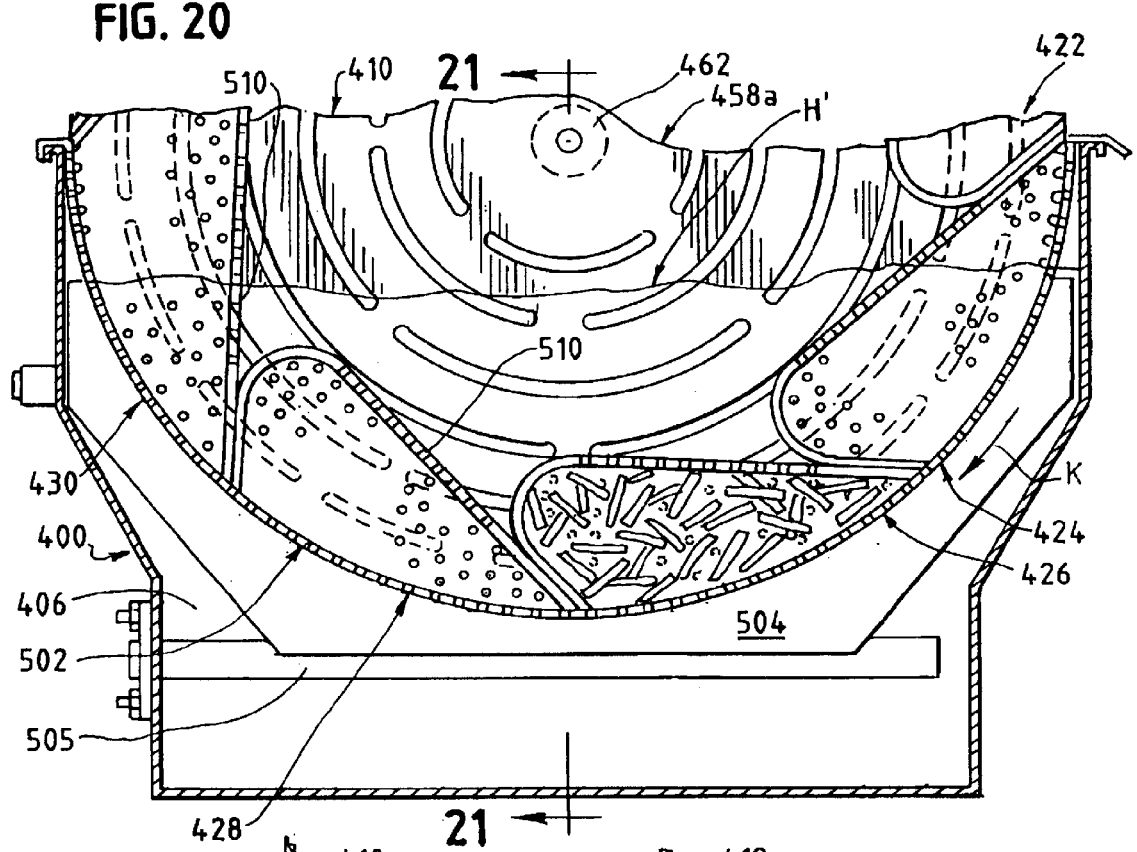
FIG. 20 is an alternate view along line 13—13 of FIG. 11.

In accordance with another aspect of the invention, it should be understood that the height of cooking oil in one of fry vats 406, 416, 418 and 420, such as the level of cooking oil indicated by reference letter H in FIG. 13 in fry vat 406 will increase or decrease depending upon the amount of food that is submerged underneath the surface of cooking oil contained in fry vat 406. Thus, as illustrated in FIG. 13, compartments 424, 426, 428 and 430 each have a charge of food, in this case French fries 455 contained therein. Each compartment contains approximately one pound of French fries 455. Consequently, there are about four pounds of French fries that are beneath the surface level H of cooking oil contained in fry vat 406. This quantity of submerged food raises the level H of cooking oil in fry vat 406. This increase in the level of cooking oil can cause the food to be submerged and therefore cooked for a longer of period of time in the cooking oil. For example, contrast the level of cooking oil depicted in FIG. 13 with the level of cooking oil depicted in FIG. 20 in which a charge of French fries 455 is contained only within compartment 426. This results in a substantially reduced level of cooking oil H' as indicated in FIG. 20. Thus, the control system for fry device 400 can be adjusted to take into account for different levels of cooking oil which can be sensed by a suitable sensor as is known by those skilled in the art (not shown). Where rotation of fry wheel 410 is done incrementally after a period of time elapses, the period between incremental rotations can be increased or decreased as desired based on the level of cooking oil present in fry vat 406. For example, in the situation illustrated in FIG. 13, the duration between incremental rotation of fry wheel 410 could be decreased compared to the situation depicted in FIG. 20 where the level H' of cooking oil is significantly lower than the level H of cooking oil in FIG. 13. This assumes that the temperature of cooking oil in each of the situations depicted in FIGS. 13 and 20 is substantially the same. Similarly, if a constant rotation fry wheel operation is utilized, such as where fry wheel 410 would rotate constantly, the rotational speed could be increased to handle the situation depicted in FIG. 13 compared to the speed of the wheel that would be utilized for the situation in FIG. 20, where the level H' of cooking oil in FIG. 20 is significantly less than the level H of cooking oil in FIG. 13.

Referring to FIGS. 13 and 20, frying device 400 can also include a fry wheel follower "or fry wheel liner" 502 which is supported by a fry wheel follower support 504. Fry wheel follower 502 is a curved perforated circular segment having a width approximately equal to the width of fry wheel 410. Fry wheel follower 502 is supported by a pair of fry wheel follower supports 504 that are spaced apart and connected by lateral supports 506. Fry wheel follower 502 prevents food pieces that are larger than the perforations in fry wheel follower 502 from falling from fry wheel compartments 422–436 during operation. Preferably, the perforations in fry wheel follower 502 are composed of circular holes having a diameter of about 0.187 inches that are in staggered rows having a center-to-center hole distance of about 0.312 inches. Fry vat 406 includes a suitable heating element 505, illustrated in FIGS. 13, 20 and 21.

Figure 17:
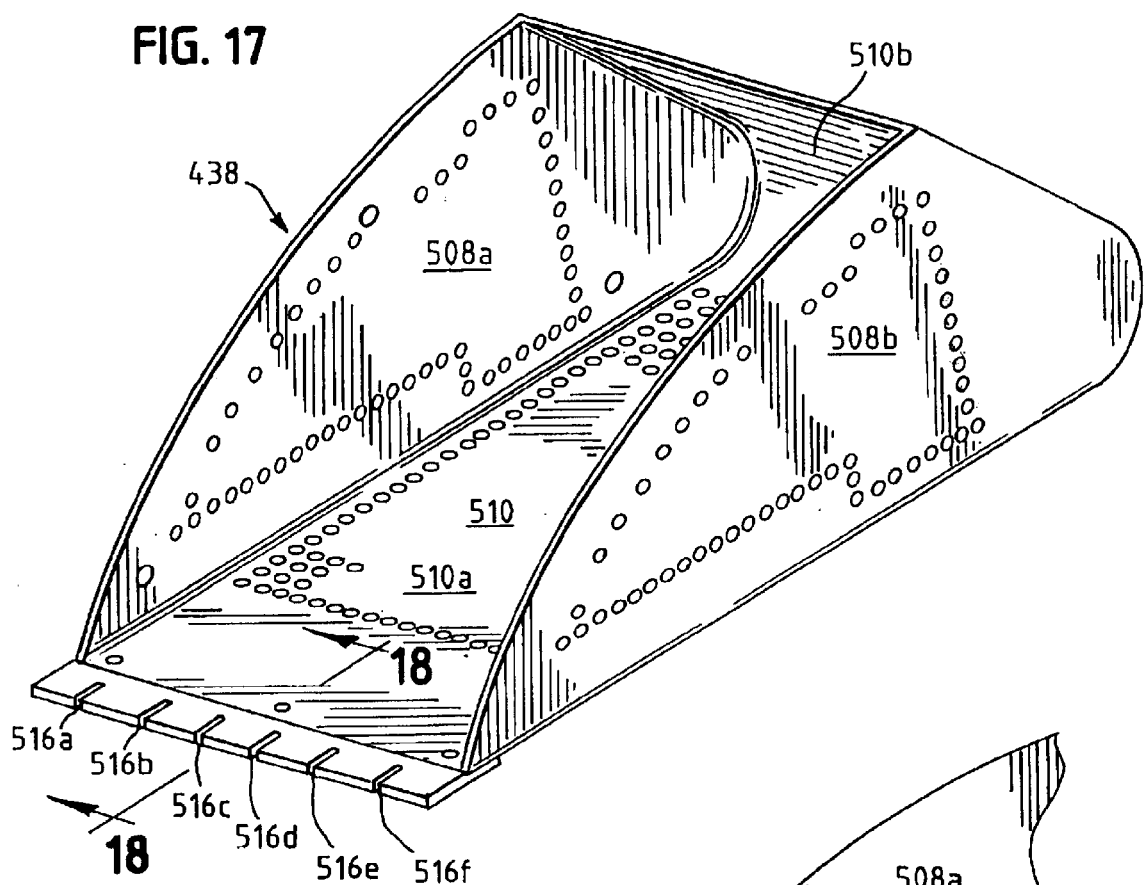
FIG. 17 is a fry basket for use in the frying device of FIG. 11.
Figure 18:
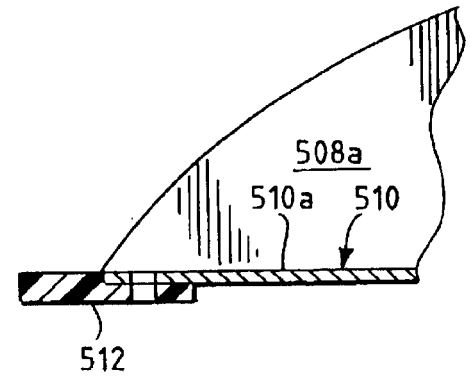
FIG. 18 is a fragmentary sectional view along line 18—18 of FIG. 17.
Figure 19:
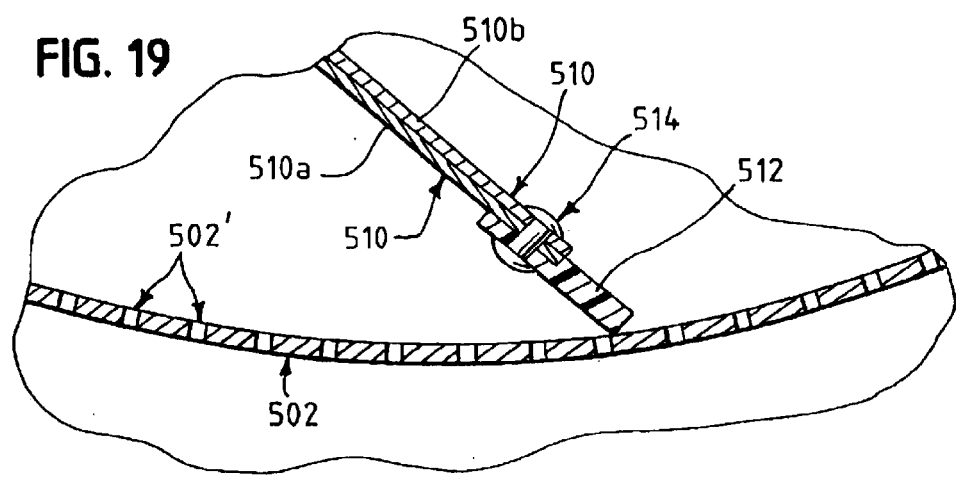
FIG. 19 is an enlarged, fragmentary elevation sectional view of a portion of FIG. 13.

Referring to FIGS. 17–19 there is illustrated a curved compartment forming member 438 which is composed of two opposed sidewalls 508a and 508b that are interconnected by a curved J-shaped member 510 that forms compartment bottom 510a and compartment top 510b. Preferably, a wiper 512 is suitably mounted to compartment member 510.

A plurality of compartment forming members 438 are mounted together in fry wheel 410 to provide a plurality of adjacent peripheral food compartments 422–436 as illustrated in FIG. 13. As illustrated in FIG. 13, the top of one J-shaped member 510 abuts the bottom of adjacent J-shaped member 510. Thus, advantageously, a fastening member 514, which can be a rivet, for example, that secures wiper 512 to compartment bottom 510a of one curved J-shaped member 510 will also pass through the compartment top 510b of the adjacent curved J-shaped member 510. Preferably, wiper 512 has a plurality of transversely extending grooves 516a–f that permit drainage of cooking oil therethrough as wiper 512 exits the cooking oil in fry vat 406, for example.

Referring to FIG. 17, opposed sidewalls 508a,b and curved J-shaped member 510 are perforated to permit the flow of cooking oil therethrough thereby promoting good heat transfer between the cooking oil contained in fry vat 406 and food contained in one of compartments 422–436 when immersed in cooking oil. A suitable hole size is about 0.156 inches spaced center-to-center about 0.250 inches. Wiper 512 also ensures that close contact is maintained between the interface of fry wheel follower 502 and the top and bottom ends of each food compartment 422–436 which in each case will be bounded by one of wipers 512. Any suitable material can be used for wiper 512 such as rubber or Teflon, for example.

As an alternative construction, compartments 422–436 could be constructed from curved J-shaped members 510 without opposed sidewalls 508a and 508b, in which case the compartment sidewalls could be formed from opposed circular disks 458a and 458b. In addition, it should be appreciated by one skilled in the art that any desired compartment shape can be utilized in accordance with the invention as long as the food can be loaded into the compartment, kept within the compartment during immersion in the cooking oil and which compartment shape discharges the food from the fry wheel.

Figure 21:
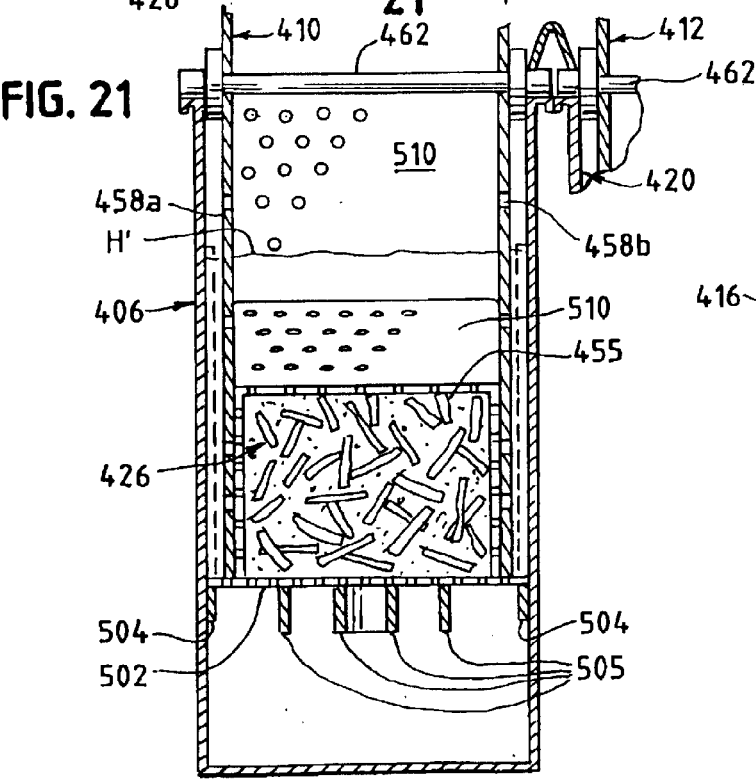
FIG. 21 is a sectional view along line 21—21 of FIG. 20.
Figure 22:
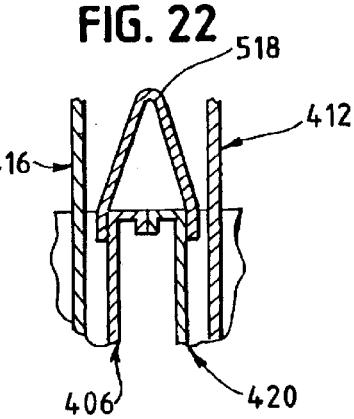
FIG. 22 is an enlarged fragmentary view of a portion of FIG. 21.

Referring to FIGS. 21 and 22, there are illustrated further aspects of fry device 400. FIG. 21 is a sectional view along line 21—21 of FIG. 20. FIG. 21 illustrates the elements previously described and in addition shows the interface of adjacent fry vats 406 and 420 and in enlarged form in FIG. 22. Disposed between fry vats 406 and 420 is a banking strip 518 that bridges the gap between fry vats 406 and 420. Banking strip 518 can be in a shape as desired and in the illustrated embodiment is a generally inverted V-shaped strip that spans the gap between fry vats 406 and 420. Banking strip 518 prevents any material that is discharged between fry wheels 410 and 412 from falling between fry vats 406 and 420 and causing such material to fall into one of fry vats 406 and 420.

Figure 23:
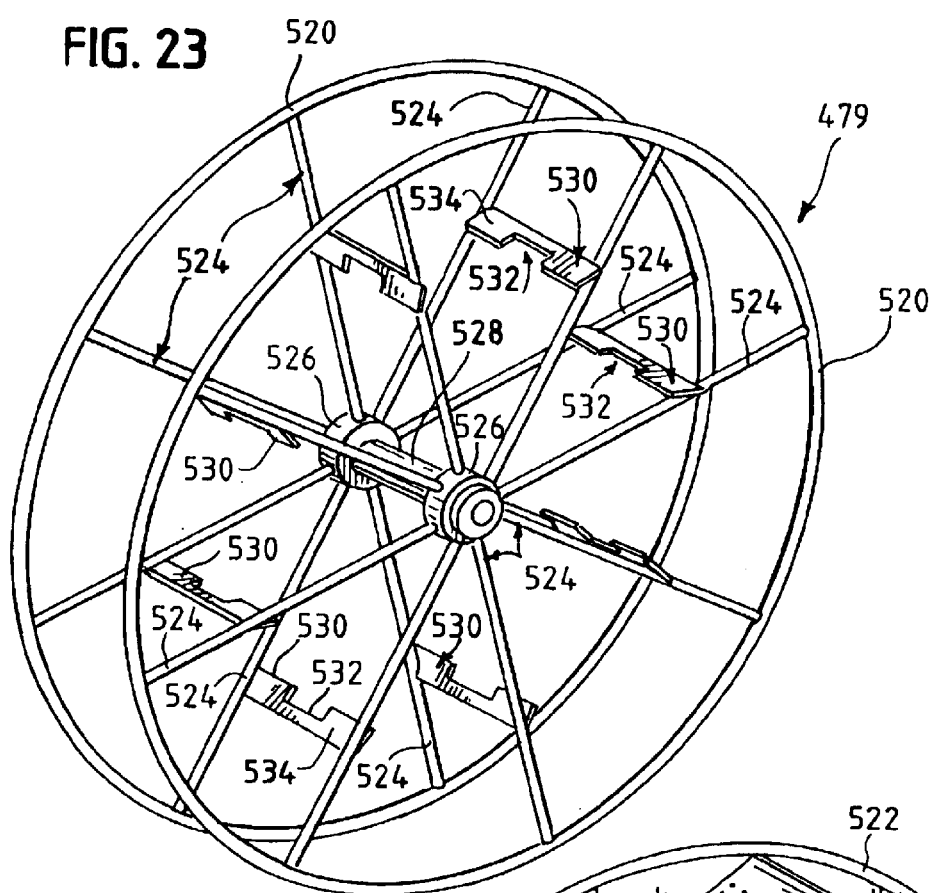
FIG. 23 is an alternate embodiment of a fry wheel in accordance with the present invention.
Figure 24:
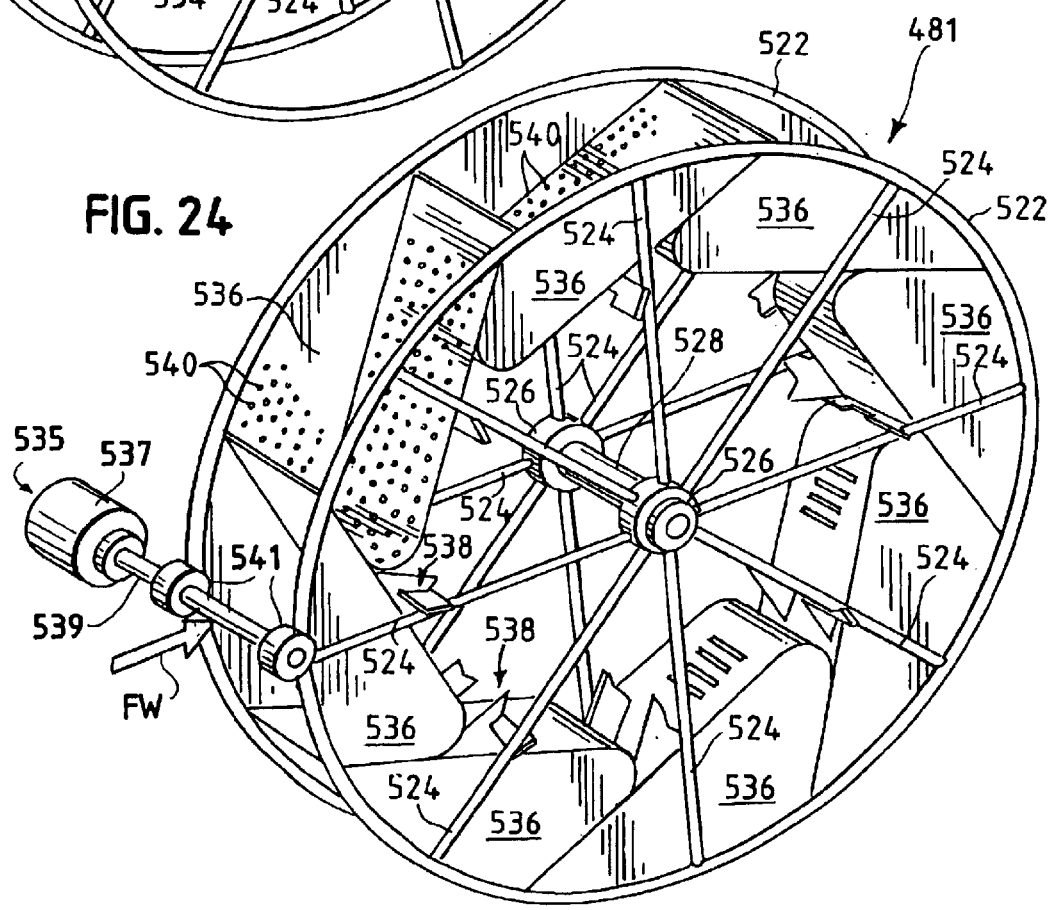
FIG. 24 is another alternate embodiment fry wheel in accordance with the present invention.

Referring to FIGS. 23 and 24, there are illustrated alternate embodiments of a fry wheel for use in accordance with the invention. It is to be understood that the fry wheel is capable of numerous changes and rearrangements, and the fry wheel, as well as other components and embodiments of the present invention, is not intended to be limited to the specific embodiments described herein.

Referring to FIGS. 23 and 24, there are illustrated wire form wheels 479 and 481. Each of wheels 479 and 481 has a rim 520 and 522, respectively, constructed of tubing, which can be smooth tubing. Such a wheel could be driven by a friction wheel, if desired. In each of wheels 479 and 481 a plurality of individual tubular spokes 524 extend from each rim to a corresponding hub assembly 526. An axle 528 connects hubs 526 together in each of wheels 479 and 481. Wheel 479 includes a slotted member 530 that bridges each pair of spokes 524. Each slotted member 530 includes a centrally disposed slot 532 and a pair of tabs 534 on either side of slot 532. A plurality of fry baskets 536, one for each slotted member 530 or pair of spokes 524 is mounted in a snap-lock relationship to each slotted member 530. Fry baskets 536 have perforated sides and a perforated bottom and top and can be of a similar configuration as previously described with respect to fry wheel 410. Each basket 536 can have a spring tab member 538 that interlocks with slotted member 530 to secure fry basket 536 to fry wheel 479 resulting in a finished fry wheel 481 as shown in FIG. 24. It is to be understood that the embodiment illustrated in FIGS. 23 and 24 is not limited to snap-in baskets and that other baskets can be used with the wheel arrangement depicted in FIG. 23 with or without slotted members 530. For example, baskets could be welded or otherwise affixed to rim 520 and spokes 524. Each of fry baskets 536 includes perforations 540 on the sides, top and bottom thereof, such as previously described with respect to compartment forming member 438.

Referring to FIG. 24, there is illustrated an alternative drive mechanism 535 to rotate fry wheel 481. Drive mechanism 535 includes a motor 537, a shaft 539 and drive rollers 541 and structure for supplying a force in the direction of arrow FW. Drive rollers 541 are mounted on shaft 539 which can be rotated by motor 537 to cause rollers 541, each aligned with one of rims 522, to rotate, thereby rotating fry wheel 481. A force FW is supplied in the direction of arrow FW to ensure that rollers 541 impart a sufficient tractive force to cause rotation of fry wheel 481. Force FW can be supplied by any suitable structure, including a spring, a weight or an electromagnet, for example. For example, motor 537, shaft 539 and rollers 541 could be mounted on a platform (not shown) that is moveable in the direction of arrow FW and a force could be applied to urge platform in the direction of arrow FW to ensure proper traction of rollers 541. Rollers 541 may be constructed of any suitable material, including rubber, for example. Motor 537 can be controlled by fry control 116, for example.

Fry wheel 410 can be rotated as desired so that food deposited in one of compartments 422–436 travels through and out of the cooking oil 454 until that compartment reaches a discharge location. Thus, in the embodiment illustrated in FIGS. 13 and 20, the rotation is in a clockwise direction as indicated by arrow K in FIG. 13 and arrow K in FIG. 20. The rotation of fry wheel 410 can be either continuous or periodic. In a periodic rotation, the rotation will typically be incremental, that is, the wheel is rotated to some degree and then stops. Thereafter, after a set period of time, the wheel undergoes another periodic rotation. This process continues as each fry basket is rotated through and out of the cooking oil vat and to the discharge location. Preferably, each periodic rotation consists of a rotation of 360° divided by the number of compartments present in the fry wheel or some fraction of that periodic rotation increment so that the position of the wheel can be known without the use of sensors. However, the use of a sensor or sensors to be able to monitor wheel position can also be used either as the primary way of controlling wheel position or as a backup. Also, use of a sensor to determine wheel position allows use of a standard AC or DC motor. Suitable control of wheel 410 can be accomplished by fry control 116, for example.

In accordance with the present invention, a basket shaking simulation can be achieved. Basket shaking simulation can be performed by a relatively slight back and forth rotation of the fry wheel, such as fry wheel 410. Thus, the drive mechanism is activated to rotate the fry wheel clockwise and counterclockwise through a relatively small degree of angular rotation to simulate shaking of a fry basket during frying. The back and forth rotation can occur relatively rapidly and typically the degree of angular rotation will be in the range of from about 2 to about 20 degrees. In addition, the periodic rotation in one direction may be of a larger angle of rotation than the rotation in the other direction.

Preferably, the degree of rotation during simulated basket shaking will be monitored, particularly where the rotation in one direction is greater than the rotation in the other direction so that the position of each basket relative to the discharge location can be monitored by the control system to ensure proper discharge of food from food compartments.

Figure 64:
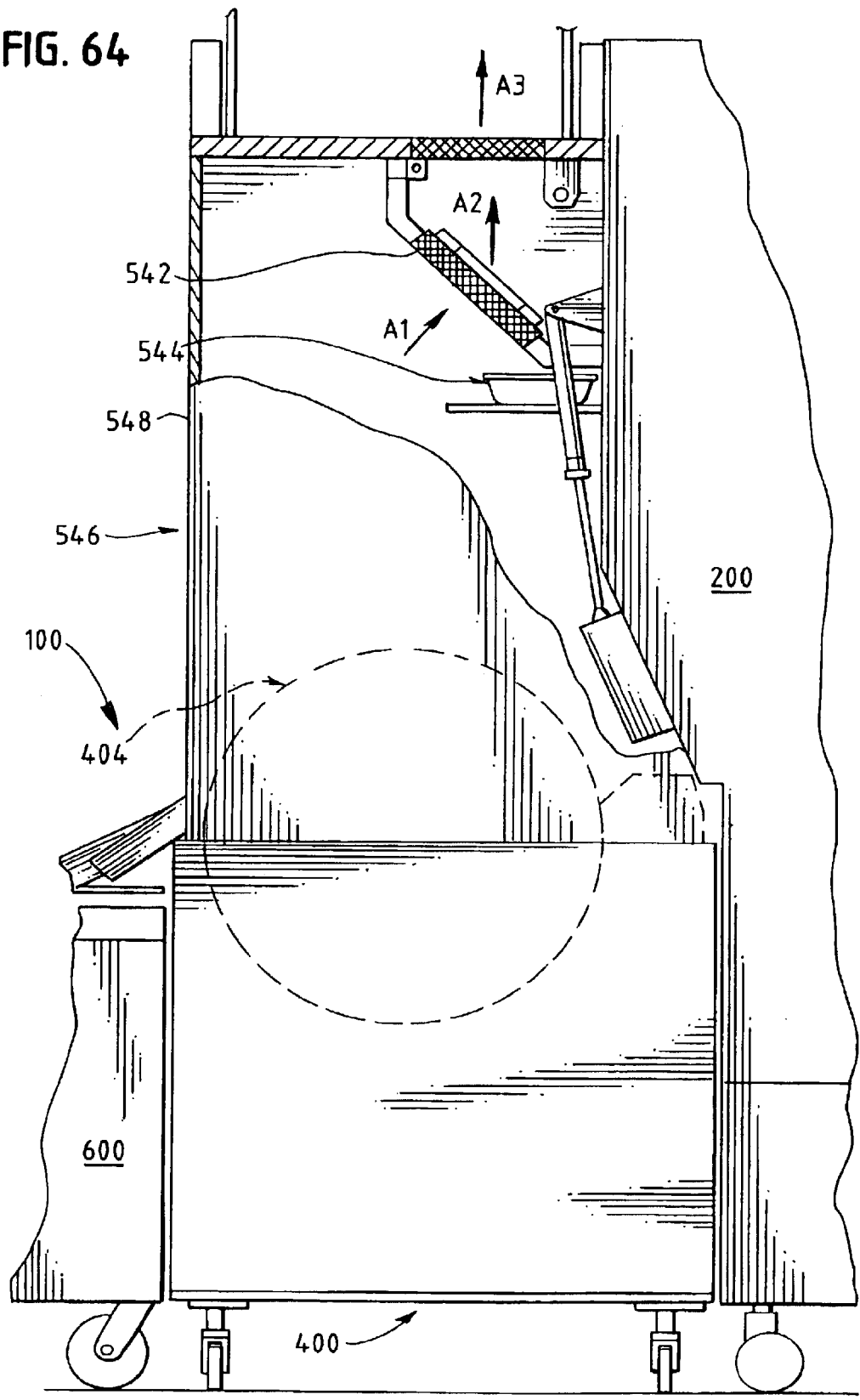
FIG. 64 is a side elevation view, partly in section, a hood system in accordance with the present invention.
Figure 65:
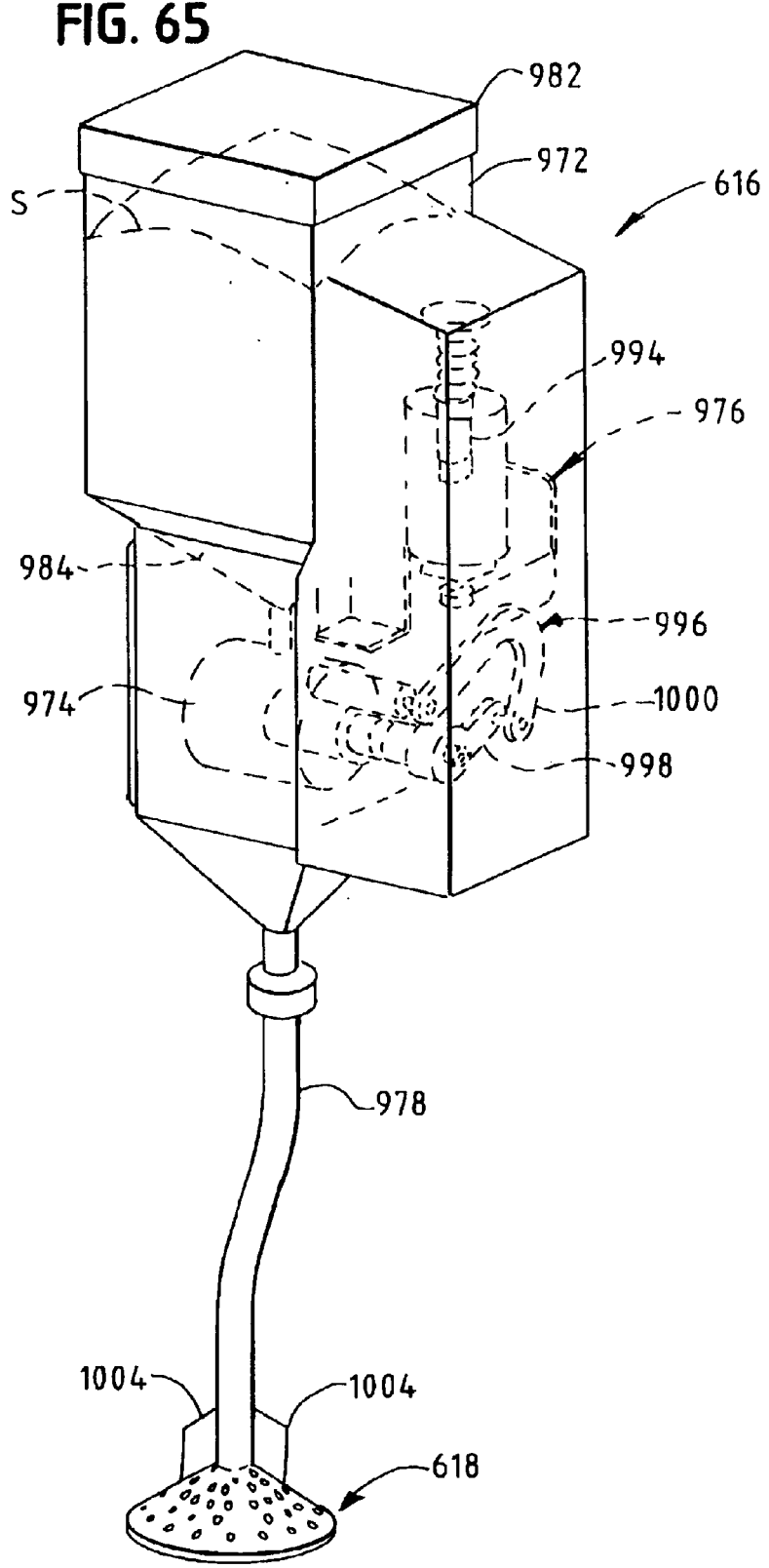
FIG. 65 is a perspective view of an automated seasoning device in accordance with one aspect of the invention.
Figure 66:
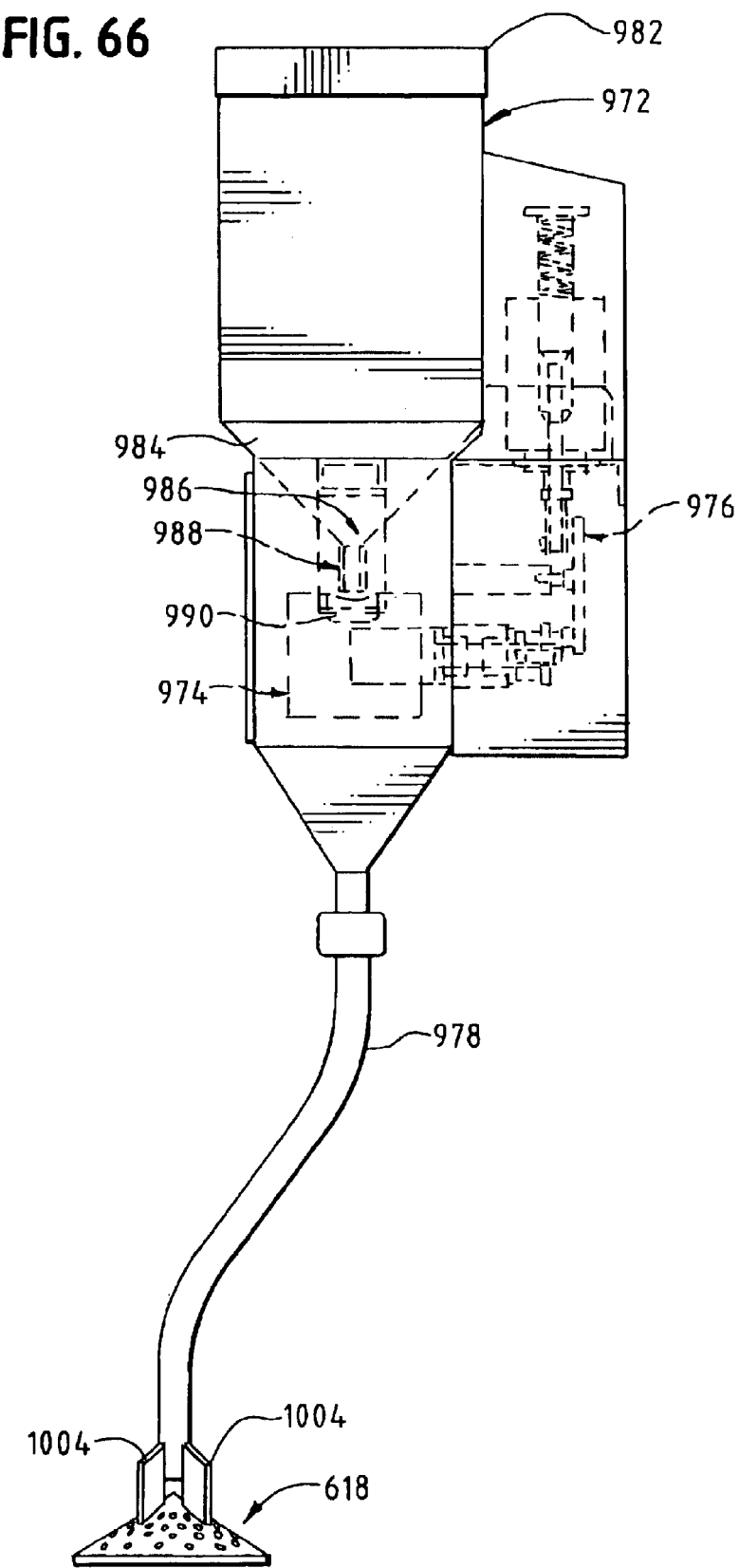
FIG. 66 is a side elevation view of the seasoning device of FIG. 65.
Figure 67:
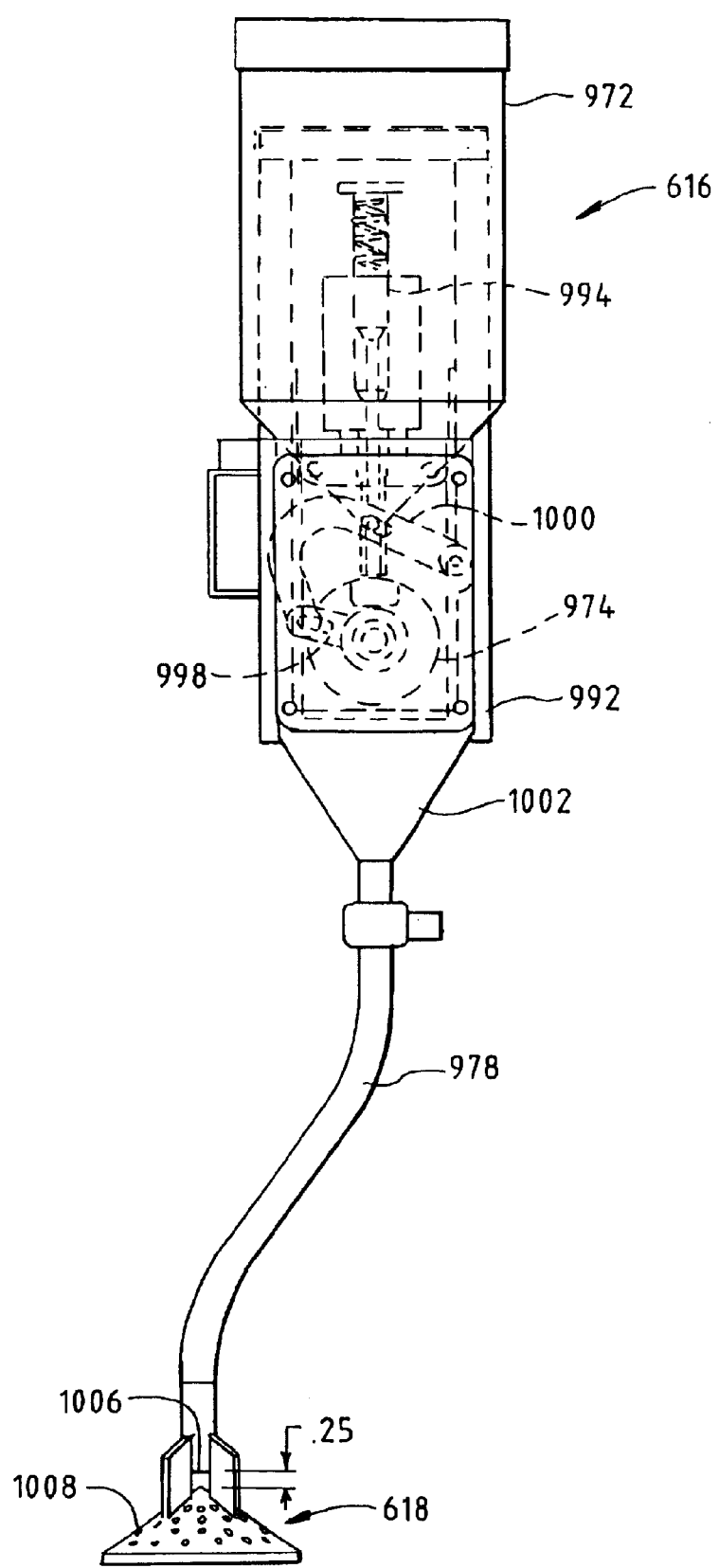
FIG. 67 is a front elevation view of the seasoning device of FIG. 65.
Figure 68:
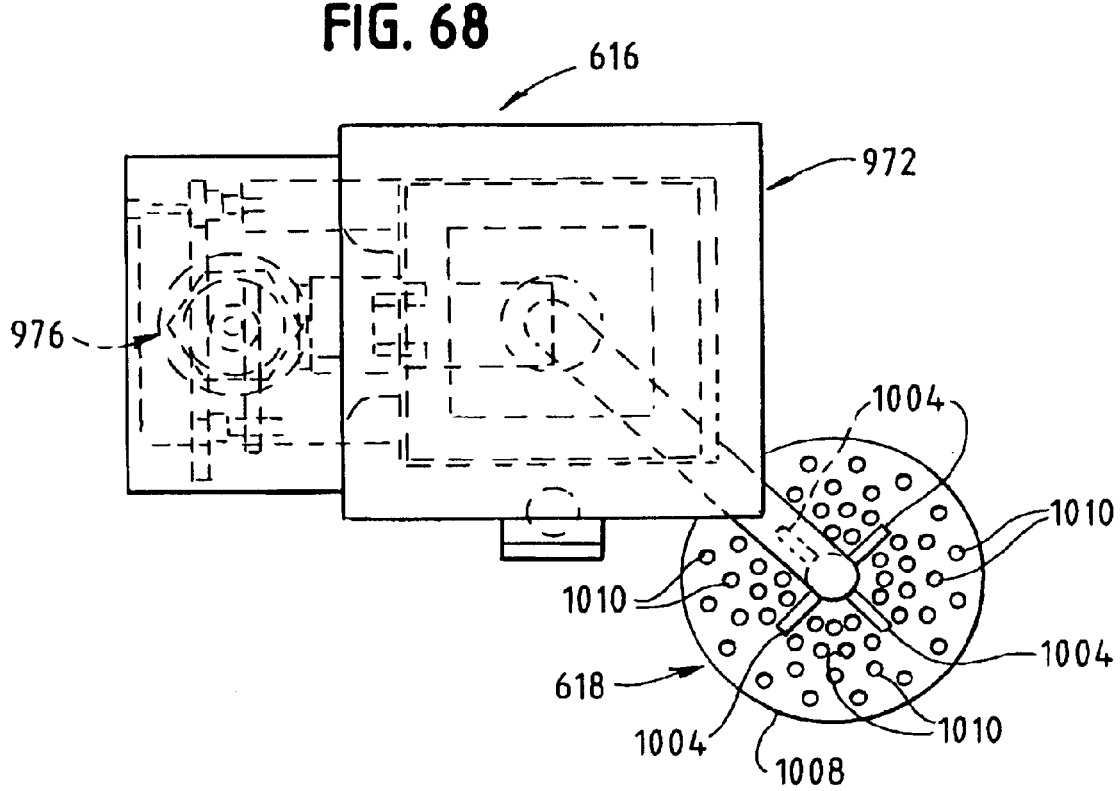
FIG. 68 is a top plan view of the seasoning device of FIG. 65.
Figure 69:
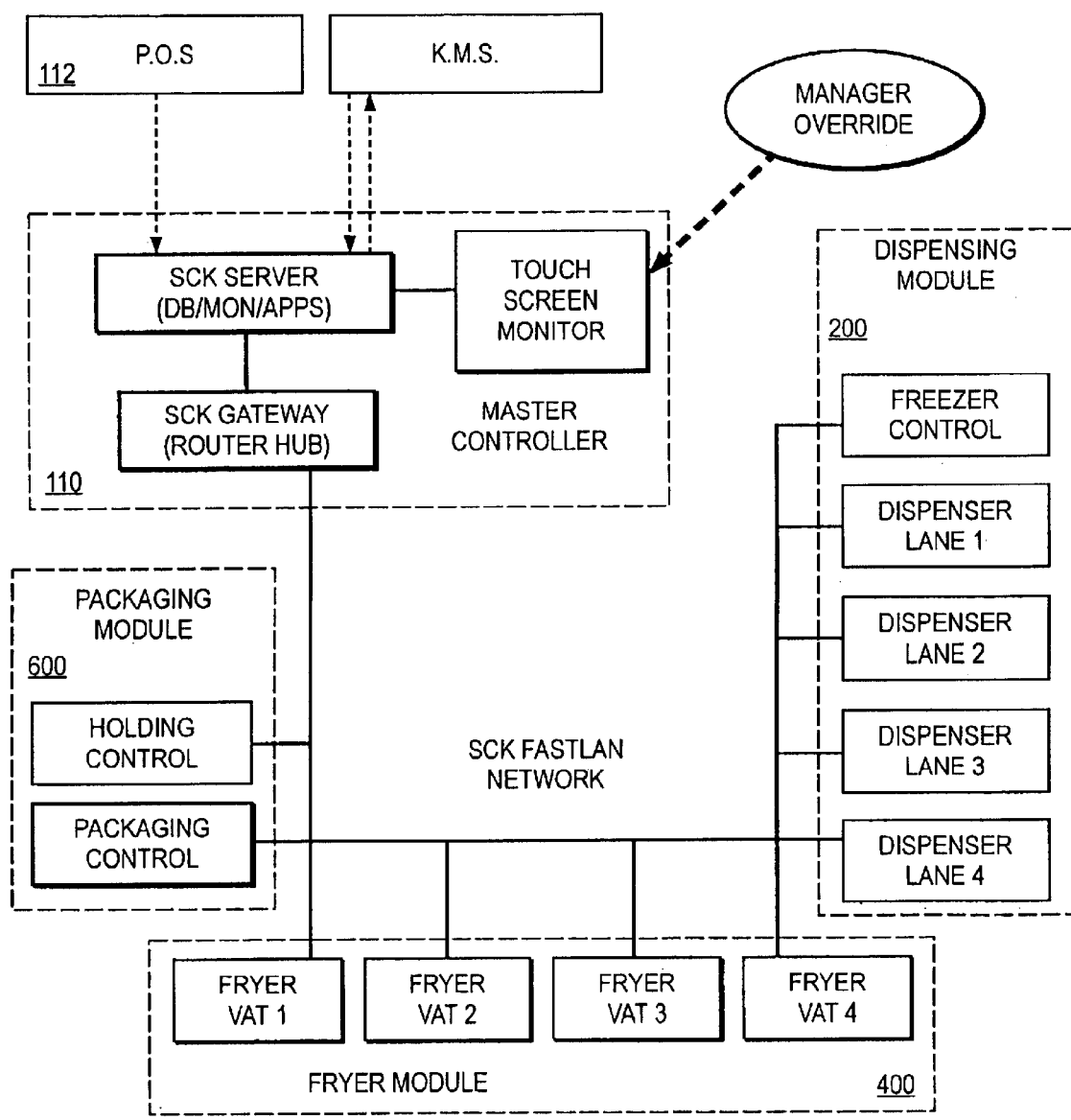
FIG. 69 is a diagrammatic view of a control system in accordance with the present invention.

Referring to FIG. 64, there is illustrated in partially schematic view fry device 400 along with portions of food dispensing device 200 and food packaging device 600. As illustrated in FIG. 64 a hood system 546 is provided. Hood system 546 includes a hood structure 548, a filter 542 and a drip pan 544.

A suitable air blower (not shown) can be provided to cause air flow to move within hood system 538 generally in the direction of arrows A1, A2 and A3. Filter 542 thus filters particulate matter in air flow A1 that passes through filter 542. Drip pan 544 catches any matter that drips from filter 542 that is located above drip pan 544. Preferably, hood system 546 substantially completely encloses the area above fry device 400 to reduce waste discharge into the operating environment of automated food processing system 100.

Food Packaging Device

Referring to the Figures generally, and in particular to FIGS. 1 and 25–50, there is illustrated various embodiments of food packaging devices and elements thereof in accordance with the invention.

In one embodiment, food packaging device 600 is illustrated or partially illustrated and elements useful in connection with food packaging device 600 are illustrated in FIGS. 1 and 25–50. Food packaging device 600 includes a cabinet 602 having a countertop surface 636. Food packaging device 600 can be advantageously constructed in modular form so that it can be operated together with previously described food dispensing device 200 and fry device 400 and alternatively operated separately from both or either of those devices.

Food packaging device 600 in the illustrated embodiment includes a food inlet chute 604, rotatable food dispensing member 606, food dispensing chute mechanism 608, automated container handling system 610, container-receiving receptacle 612, overflow food collection member 613, conveyor system 614, waste chute 615, food seasoning system 616 and raceway 620.

In the illustrated embodiment, food packaging device 600 includes a container storage device for containing cartons or containers of various sizes. During operation of packaging device 600, the device selects a container of a desired size from container storage magazine 638, erects the container into an erected form that is unerected while contained in storage magazine 638 and then positions the erected container to receive food dispensed from food dispensing chute mechanism 608. After receiving food from food dispensing chute mechanism 608, automated container handling device 610 is capable of moving the filled or partially filled container to container receiving receptacle 612 which is transported via conveyor system 614 to a desired location for subsequent pickup of the container by a human operator, for example.

In the embodiment illustrated in FIGS. 25–29, food packaging device 600 includes food overflow collection member 613 to collect food dispensed by food dispensing chute mechanism 608 that is not deposited into a container. In the illustrated embodiment, overflow food collection device 613 is a rotatable wheel as hereinafter described in detail. Overflow food collection member 613 functions to collect food dispensed by food dispensing chute mechanism 608 that is not received in a container and to recycle that food into food dispensing chute mechanism 608 for subsequent dispensing to a container. This permits food dispensed by food dispensing chute mechanism 608 but not deposited in a container to be promptly recycled to the dispensing chute in a first-in, first-out manner, so that overflow food is promptly recycled and dispensed to a container.

Figure 25:
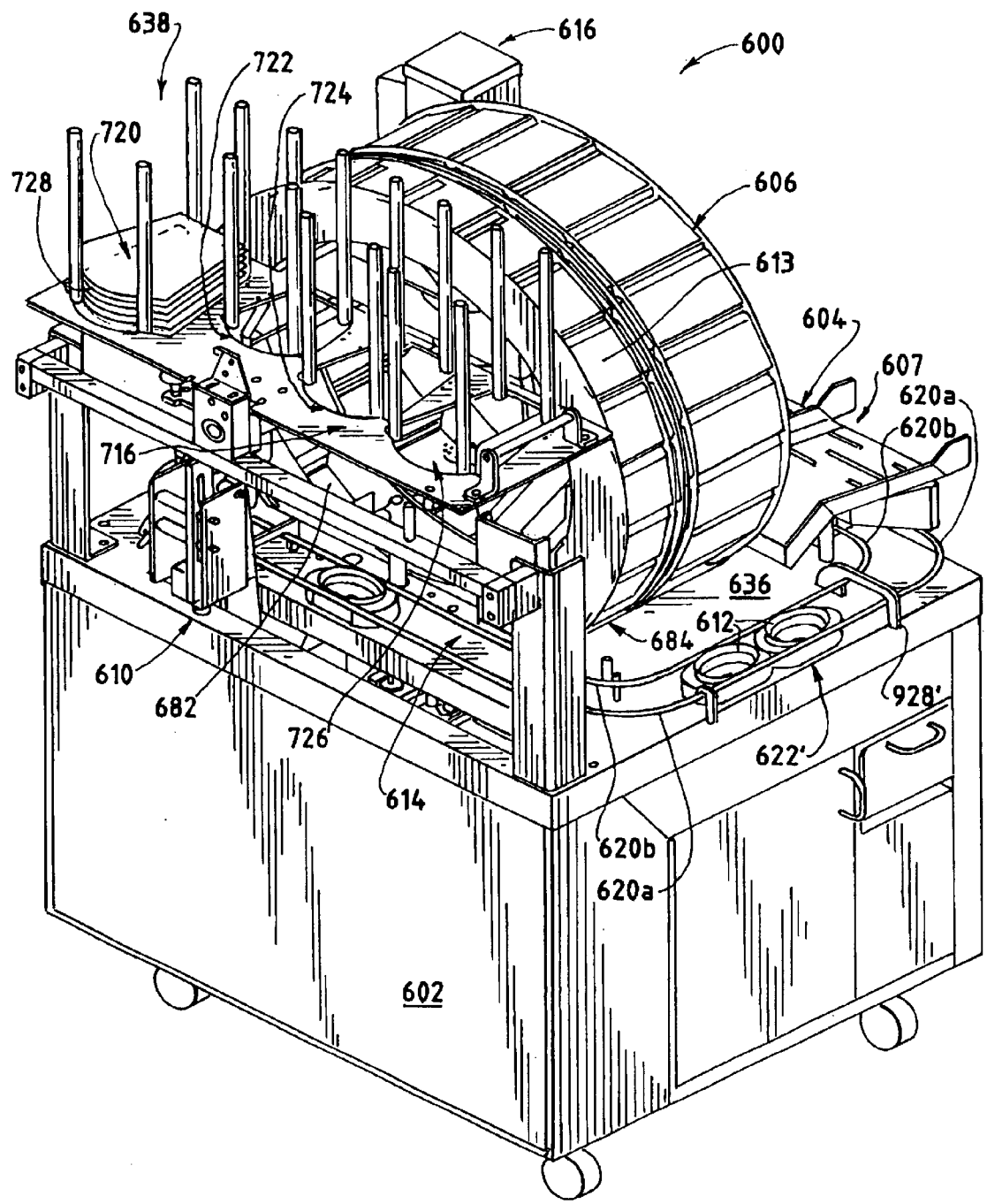
FIG. 25 is a front perspective view of a packaging device in accordance with the invention.
Figure 26:
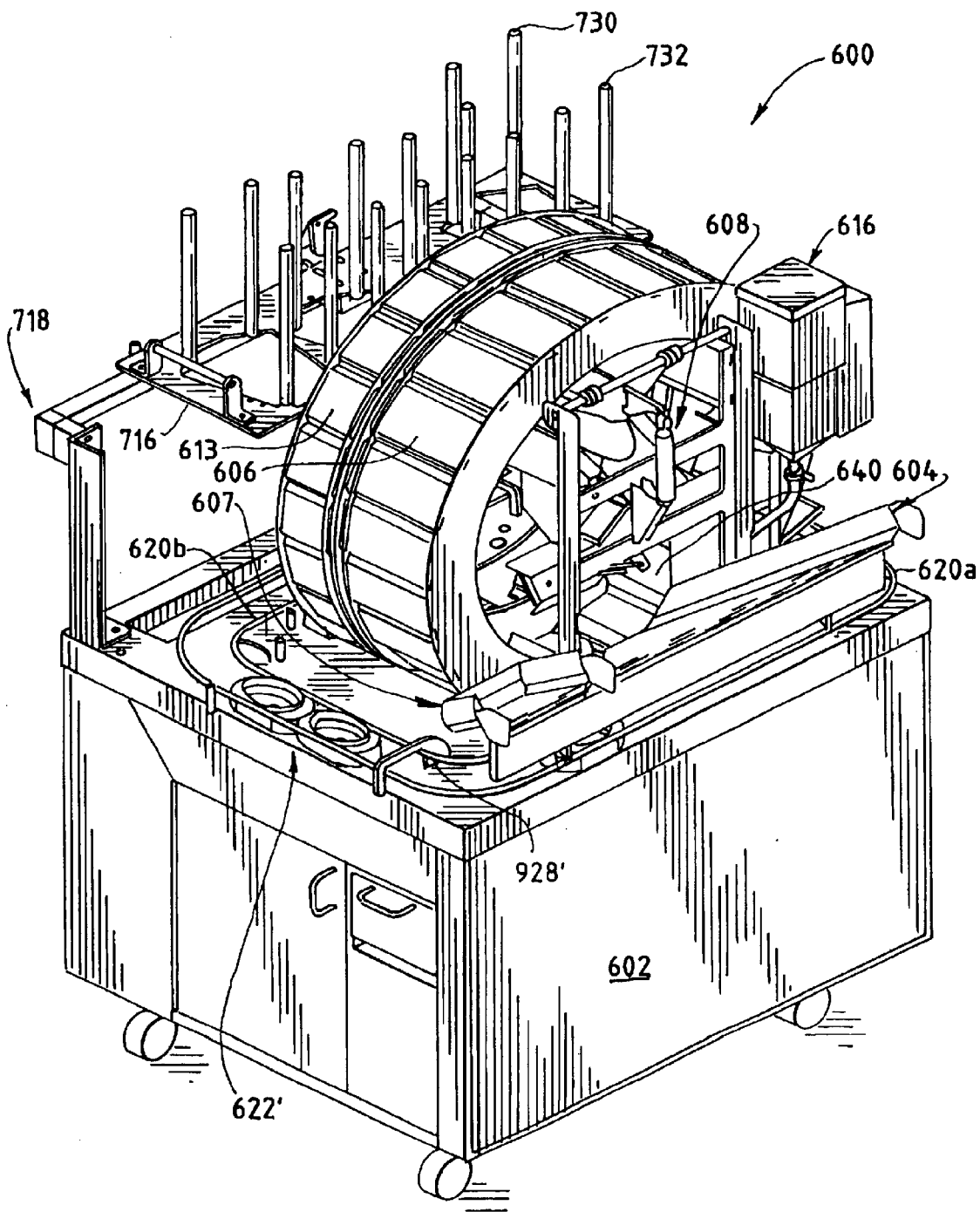
FIG. 26 is a rear perspective view of the device of FIG. 25.
Figure 27:
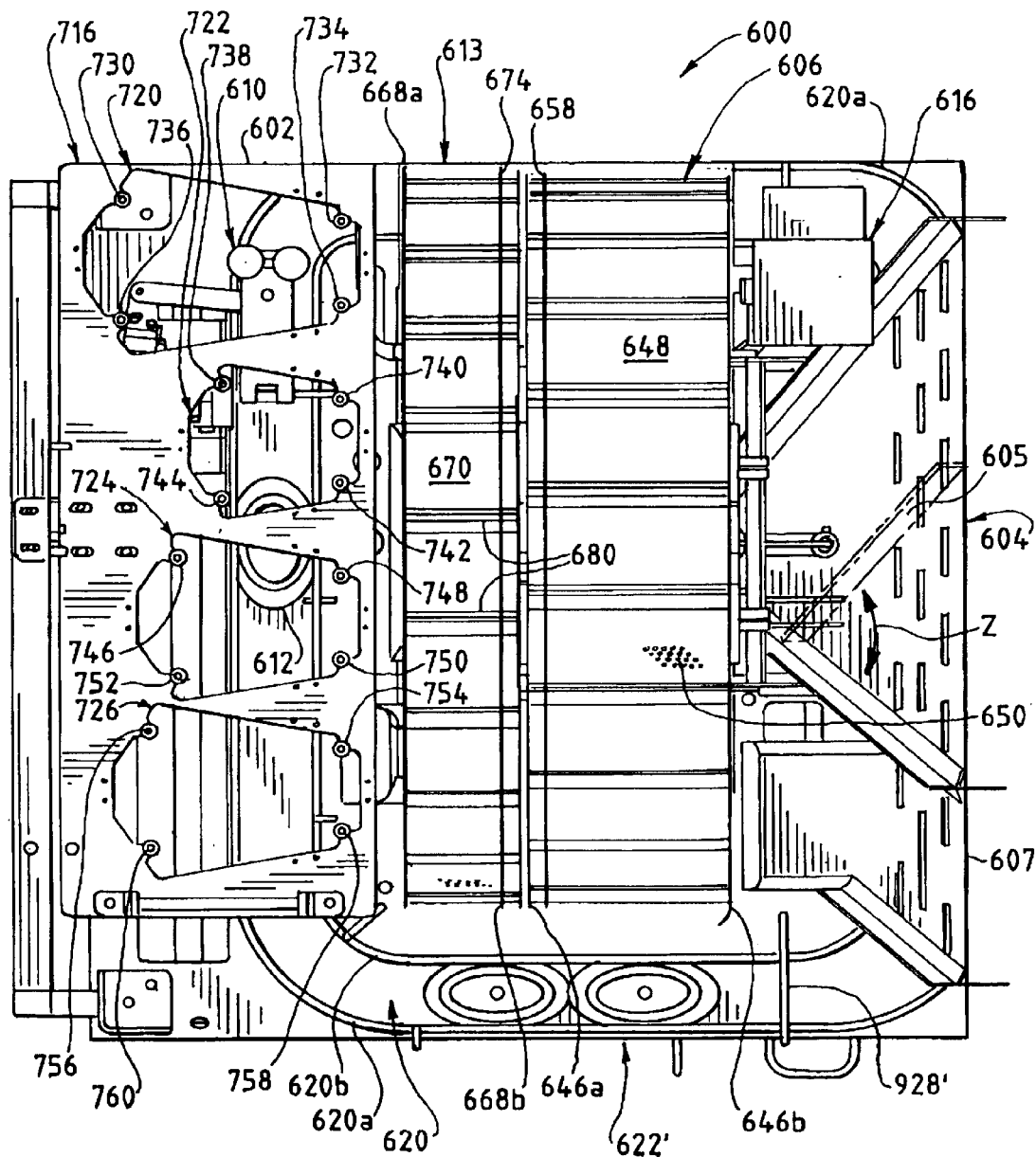
FIG. 27 is a top plan view of the device of FIG. 25.
Figure 28:
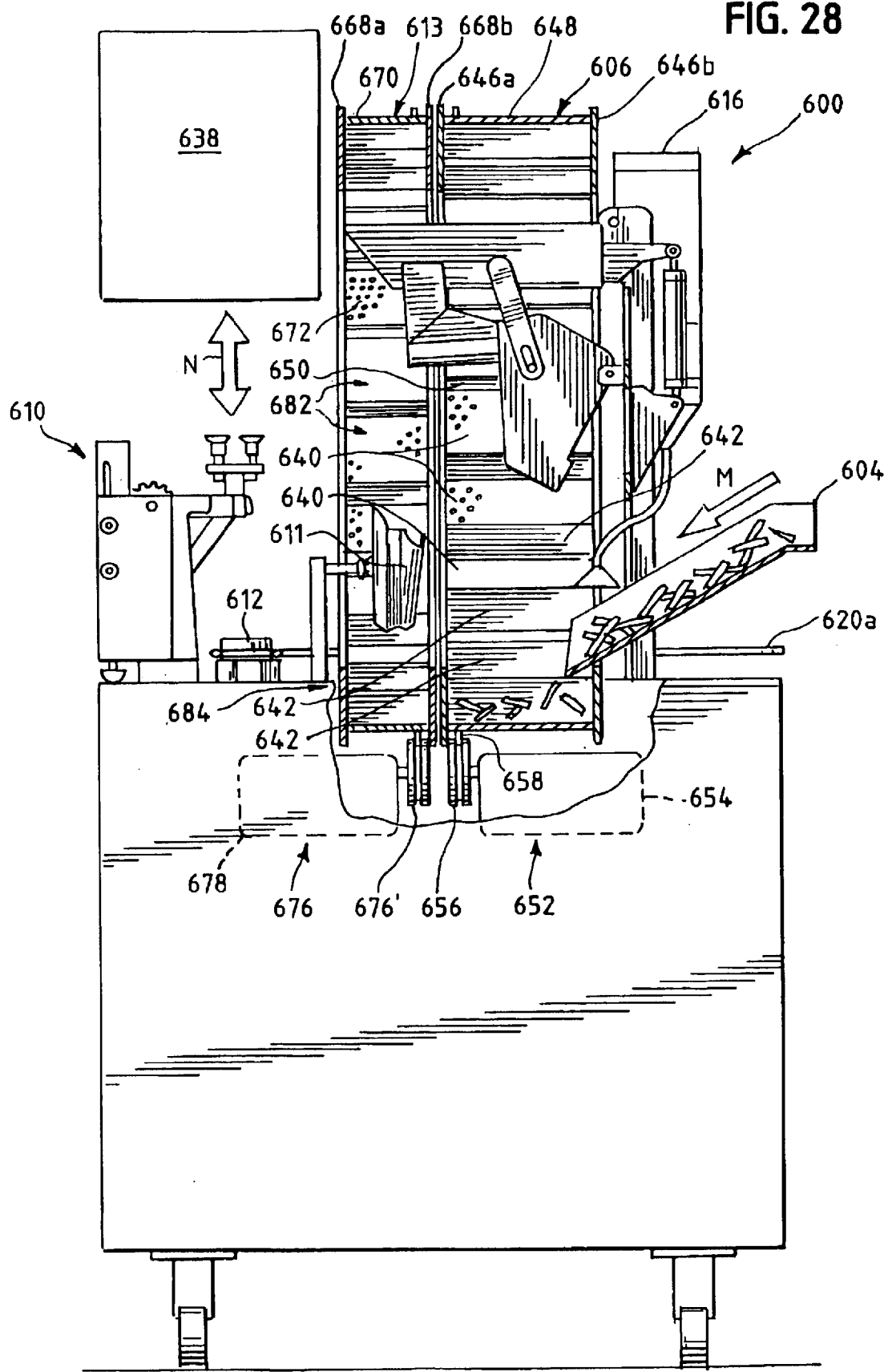
FIG. 28 is a side elevation view, partially in section and partially broken away of the packaging device of FIG. 25.

Referring to FIGS. 26–28, there is illustrated food packaging device 600 in which inlet chute 604 is positioned to receive food, in this case French fries, from food dispensing lanes 234, 236 and 238 of dispensing device 200, which food has been subsequently fried after dispensing in fry wheels 410, 412 and 414 of fry device 400. After frying in any of wheels 410, 412 and 414 of fry device 400, food dispensed therefrom enters inlet chute 604, as illustrated in FIGS. 3 and 28, for example. In inlet chute 604 the food travels downwardly along chute 604 and into rotatable food dispensing member 606 in the direction of arrow M of FIG. 28 and arrow E of FIG. 3. Inlet chute 604 can be configured as desired and may be configured to accept the product from any one or all of fry wheels 404, 410, 412 and 414. In FIGS. 25–27, a holding area 607 receives product from fry wheel 404 for manual packaging. A manual or automated diverter bar 605 can optionally be provided as shown in FIG. 27 to divert French fries from device 600 to permit filling unsalted fry orders. Bar 605 can be moved between open and closed positions as indicated by arrow Z, such as by a cylinder (not shown).

Figure 29:
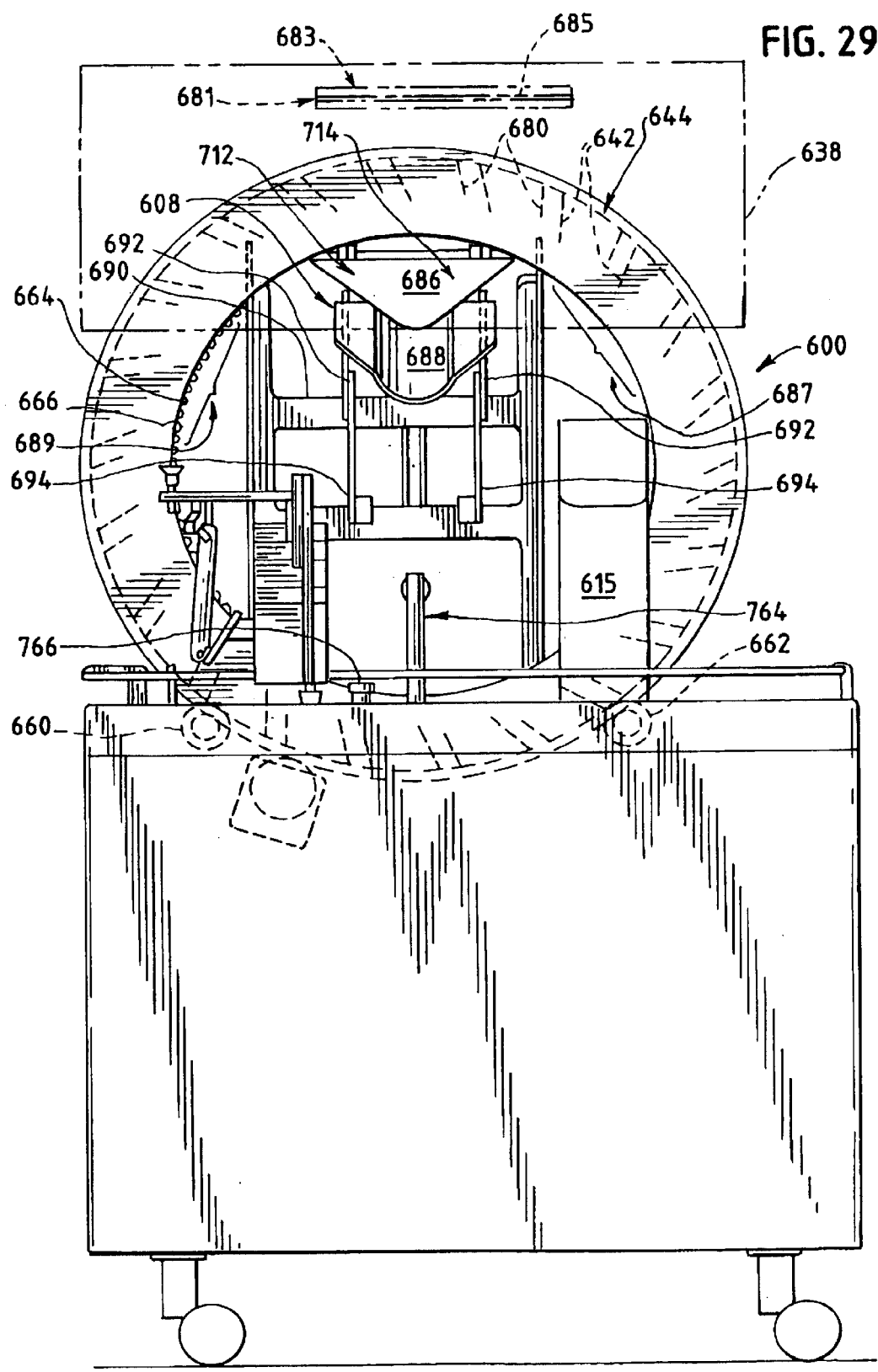
FIG. 29 is a front elevation view of the device of FIG. 25.
Figure 61:
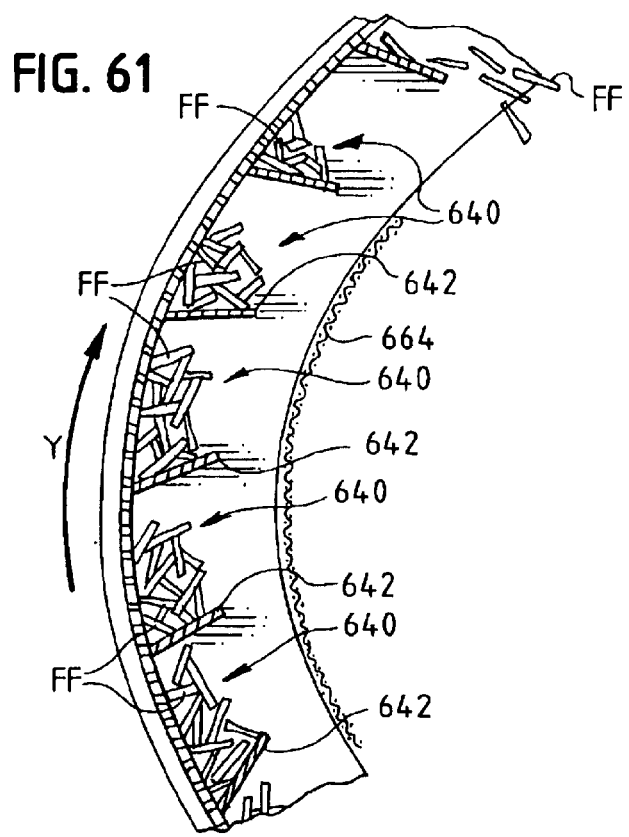
FIG. 61 is a sectional view of a portion of the food packaging device of FIG. 25.

Rotatable food dispensing member 606 in the illustrated embodiment is a dispensing wheel that is mounted for rotation in dispensing device 600. Dispensing member 606 has a plurality of food containing compartments 640 that are arrayed around the periphery of rotatable food dispensing member 606. Each of compartments 640 is divided from another compartment by a compartment wall 642. Preferably, each compartment wall 642 is not normal to peripheral edge 644 of rotatable food dispensing member 606 but at a slight angle such as, for example, as illustrated in FIG. 29 and FIG. 61.

Wheel 606 includes a pair of opposed rim portions 646a and 646b and a circular ring portion 648 that interconnects opposed rims 646a and 646b. Circular ring 648 is disposed close to the peripheral edges of rims 646a and 646b and defines peripheral edge 644. Preferably, circular ring 648 is constructed of a perforated metal material so that circular rims 646a and 646b have perforations 650 therethrough as illustrated in FIG. 28, for example.

In accordance with the illustrated embodiment, rotatable dispensing member 606 is configured as a rotatable wheel although other embodiments are within the scope of the invention. For example, a rotatable dispensing member in accordance with the invention could be a portion of a wheel, such as a semicircular or other configuration.

In the illustrated embodiment, rotatable food dispensing member 606 is rotated by a drive mechanism 652. Drive mechanism 652 consists of a motor 654 that drives a drive wheel 656. Drive mechanism 652 is controlled by a suitable control mechanism to cause rotation of drive wheel 656 and hence rotatable food dispensing member 606 in a desired direction and at a desired rate of speed. Drive wheel 656 can be a pressure roller or alternatively can be a drive wheel like or similar to drive wheel 468 previously described with respect to FIG. 14. Rotatable food dispensing member 606 can be driven via one or both of opposed rims 646a and 646b. Alternatively, and as illustrated in FIG. 28, rotatable food dispensing member 606 is driven through a drive rim 658. Each of rotatable food dispensing members 606 and overflow food collection member 613 rest on spaced apart rollers 660 and 662. Each of rollers 660 and 662 are constructed to bear the weight of rotatable food dispensing member 606 and overflow food collection member 613 and have a length that spans both. Alternatively, separate rollers or some other supporting structure could be used to support rotatable food dispensing member 606 and overflow food collection member 613. An inner curved fender or baffle member 664 as illustrated in FIG. 29 is provided to ensure that food contained in compartment 640 of rotatable food dispensing member 606 does not prematurely discharge. Preferably, fender 664 follows the inner curvature of rotatable food dispensing member 606 and has perforations 666, which can be similar to perforations 650 of circular ring 648. Fender 664 is suitably mounted so that it is stationary relative to rotatable food dispensing member 606. A similar fender could also be provided for overflow food collection member 613, if desired (not shown).

Referring to FIG. 61, there is illustrated an elevation view of a portion of rotatable food dispensing member 606 which is typically rotated in the direction of arrow Y when viewed from the front of food packaging device 600. Fender 664 prevents food, in this case French fries FF, from falling from compartments 640 prematurely.

Overflow food collection member 613 is configured to collect food deposited from food dispensing chute mechanism 608 that is intended to be received into container 611 when held in position to receive food from food dispensing chute mechanism 608 which food does not stay in container 611. This can occur since oftentimes it is desirable to overfill container 611 so that food is mounded up above the top surface of container 611. Also, for food such as French fries, such food material fills container 611 somewhat randomly and it is typical for French fries to dangle over the sides of container 611. In the illustrated embodiment, overflow food collection member 613 is configured in a manner similar to rotatable food dispensing member 606 previously described. Thus, food collection member 613 includes opposed rims 668a and 668b and circular ring 670 having perforations 672. Circular ring 670 connects opposed rims 668a and 668b in a manner as previously described with respect to member 606. In addition, food collection member 613 has a plurality of inner compartments that are similar in construction to compartment 640 previously described with respect to member 606. Member 613 also has a drive rim 674 and is driven by a drive mechanism 676 that is similar to drive mechanism 652 previously described including a drive wheel 676' and a motor 678. Drive mechanism 676 is configured to rotate food collection member 613 in either a clockwise or counterclockwise direction as hereinafter described in more detail.

Food collection member 613 also includes a plurality of compartment walls 680 that are similar to compartment walls 642 previously described with respect to rotatable food dispensing member 606, providing a plurality of food containing compartments 682.

Each of food dispensing member 606 and food collection member 613 has bottom portions that are disposed through an opening 684 in countertop surface 636 of cabinet 602. The construction of the illustrated embodiment permits food dispensing member 606 and overflow food collection member 613 to be readily removed from food packaging device 600 such as for cleaning and/or repair.

A heating system as described can be incorporated into food packaging device 600 to supply heat to food contained therein. For example, a heating system 681 can be provided, which is illustrated in FIG. 29. Heating system 681 includes a heating device 683 having a heating element 685, located above dispenser 606 as desired. Heating devices 687 and 689 may also be included within dispenser 606 and/or 613 as desired. The heating devices may comprise radiant heaters and can be ceramic heaters, for example. Any suitable type of heating device or system can be used in accordance with the invention. Heating system 681 can be controlled by packaging control 118, for example. In addition, a heating device can be provided to direct heat to food container pick up location 622, if desired to keep food contained thereat warm.

Referring to FIGS. 1, 3, 25–26, 28–29 and 43–44, various aspects of the configuration and operation of food dispensing chute mechanism 608 are illustrated and will be described. Food dispensing chute mechanism 608 includes an upper chute 686, a lower chute 688, a chute support member 690, a connecting link 692, a stop member 694, a rotatable link 696 connecting stop member 694 to chute support member 690, a rotatable link 698 connecting upper chute 686 to support member 690, a cylinder 700 for operating food dispensing chute mechanism 608, a load cell 702 for weighing the contents of food contained in food dispensing chute mechanism 608 and a rotatable link 704 connecting cylinder rod 706 to upper chute 686.

Upper chute 686 preferably and as illustrated in the referenced figures, forms part of food dispensing chute mechanism 608, and has an inlet location 708 for receiving food dispensed from rotatable food dispensing member 606 and a discharge location 710 for dispensing food contained in food dispensing chute mechanism 608 and into a container, such as container 611 as illustrated in FIG. 43, for example.

Upper chute 686 of food dispensing chute mechanism 608 is positioned to receive pieces of food from a discharge location 712 of rotatable food dispensing member 606. Upper chute 686 has a food holding area 714 for holding food received from rotatable food dispensing member 606. A weighing device is associated with food dispensing chute mechanism 608 so that the amount of food contained therein, such as in food holding area 714, can be determined. Any suitable device can be utilized to determine the amount of food contained in food dispensing chute mechanism 608. In the illustrated embodiment, a load cell 702 is provided to determine the weight of food contained in food dispensing chute mechanism 608 and is illustrated schematically in FIGS. 43 and 44, for example.

FIG. 44 illustrates food dispensing chute mechanism 608 in the upper position ready to receive food from rotatable food dispensing member 606. In that configuration, cylinder 700 is retracted and upper chute 686 is generally horizontal. This configuration allows a quantity of food to be dispensed into upper chute 686 and into food holding area 714 without being dispensed therefrom. When a sufficient quantity of food is deposited in upper chute 686, such as French fries FF, as determined by load cell 702 which communicates with the control system of food packaging device 600, the food contained therein is ready to be dispensed. Typically, the amount of food contained in chute 686 will be sufficient to adequately fill container 611. Since container 611 is of a known size, rotatable food dispensing member 606 can be operated to supply food to chute 686 until a desired quantity is contained therein for dispensing to container 611.

To dispense food from food dispensing chute mechanism 608, cylinder 700 is activated to extend cylinder rod 706 upwardly thereby causing upper chute 686 to drop. Since lower chute 688 is connected to upper chute 686 via connecting link 692, lower chute 688 also drops to the discharge position as illustrated in FIG. 43 which movement is indicated by arrow S. Stop 694 which is connected to lower chute 688 and pivotally mounted via rotatable link 696 to chute support member 690, engages chute support member 690 as illustrated in FIG. 43 and prevents further downward movement of upper chute 686 and lower chute 688. In addition, stop member 694 engaging chute support member 690 defines the lowermost position of upper chute 686 and lower chute 688 which is also the dispensing position of food dispensing chute mechanism 608, as illustrated in FIG. 43. This position also provides discharge location 710 of dispensing chute mechanism 608.

Referring to FIGS. 25–28, there is illustrated container storage magazine 638, which can form part of food packaging device 600. Container storage magazine 638 is configured to store a plurality of different sized food containers in an unerected form. Typically, container storage magazine 638 will be configured to hold a variety of different sized containers. In the illustrated embodiment, container storage magazine 638 can contain four different sizes of French fry containers or cartons. Container storage magazine 638 includes a base 716 that is suitably mounted with mounting structure 718 to cabinet 602. Preferably, mounting structure 718 permits container storage magazine 638 to be readily removed to permit access to rotatable food dispensing member 606 and overflow food collection member 613.

Base 716 typically can be in the form of a base plate and includes four apertures 720, 722, 724 and 726, each of said apertures corresponding to the profile of a different size collapsed carton. Apertures 720, 722, 724 and 726 are dimensioned to be able to retain a stack of cartons in a collapsed or unerected condition as illustrated in FIG. 25 in which a plurality of unerected cartons 728 are stacked therein.

Each aperture 720, 722, 724 and 726 and base 716 has associated therewith a plurality of guide members 730-760. In the illustrated embodiment, guides 730–760 are in the form of post or tubular-type members. Each set of four guide members is associated with a specific one of apertures 720, 722, 724 and 726 to define and permit stacking of a plurality of unerected French fry cartons or containers that generally correspond in size to the size of apertures 720, 722, 724 and 726, respectively. It is to be understood that other arrangements to define a container stack can be utilized in accordance with the invention. For example, in place of guides 730–760 other structure could be utilized, such as upstanding walls or partial walls or other types of guides.

Container storage magazine 638 may also include a suitable removable cover (not shown) to enclose base 716 and the volume defined over apertures 720–726 by guides 730–760.

Container storage magazine 638 is preferably positioned to permit ready access to the bottom of each container stack through the bottom of each of apertures 720–726 by automated container handling system 610, which is hereinafter described in detail.

Food packaging device 600 includes automated container handling system 610. Automated container handling system 610 is capable of retrieving an unerected container through any of apertures 720, 722, 724 and 726 of unerected container storage magazine 638, erecting the unerected carton, holding the erected carton in position at discharge location 710 of food dispensing chute mechanism 608 and depositing the filled container onto conveyor system 614, which conveyor system 614 subsequently transports the filled container to a desired location.

Referring to FIGS. 1, 25, 27–28 and 30–44, there is illustrated automated container handling system 610 and elements and features thereof. Automated container handling system 610 includes a container retrieving and grasping device 762, a container grasping device 764 and a container bottom urging device 766.

Automated container handling system 610 is controlled by a suitable control system for food packaging device 600.

Container retrieving and grasping device 762 and portions thereof are best illustrated in FIGS. 30–39. Container retrieving and grasping device 762 includes a mast 768, which is mounted to a carriage system 770, a moveable rack member 772, a pinion 774, a frame 776, a container grasping member 778 and a linkage assembly 780.

Mast 768 is carried by carriage system 770 which carriage system 770 allows for lateral translation of mast 768 and the components associated therewith, including moveable rack member 772, pinion 774, frame 776, container grasping member 778 and linkage assembly 780. Carriage system 770 includes a guide member 782, a worm gear 784, a drive mechanism 786 and a carriage follower 788. Carriage follower 788 supports a vertical translation mechanism 790 that, in turn, carries mast 768.

Carriage guide 782 is an elongated guide that defines the lateral translation movement direction of carriage follower 788 and is secured within cabinet 602. Worm gear 784 is disposed parallel to carriage guide 782 and when rotated moves carriage follower 788 along carriage guide 782.

Worm gear 784 is driven by drive mechanism 786 which can include a drive motor 792, a drive gear or pulley 794 and a driven gear or pulley 796. Where drive and driven pulleys are used, typically a belt 798 will impart rotation from one pulley to another.

Drive motor 792 causes worm gear 784 which is mounted for rotation and which is rotated by rotation of driven pulley or gear 796 in either direction. Drive motor 792 can be an AC or DC motor or a stepper or servo motor as desired. Suitable sensors can be employed (not shown) to determine the position of carriage follower 788 which determines the lateral position of container grasping member 778.

Figure 39:
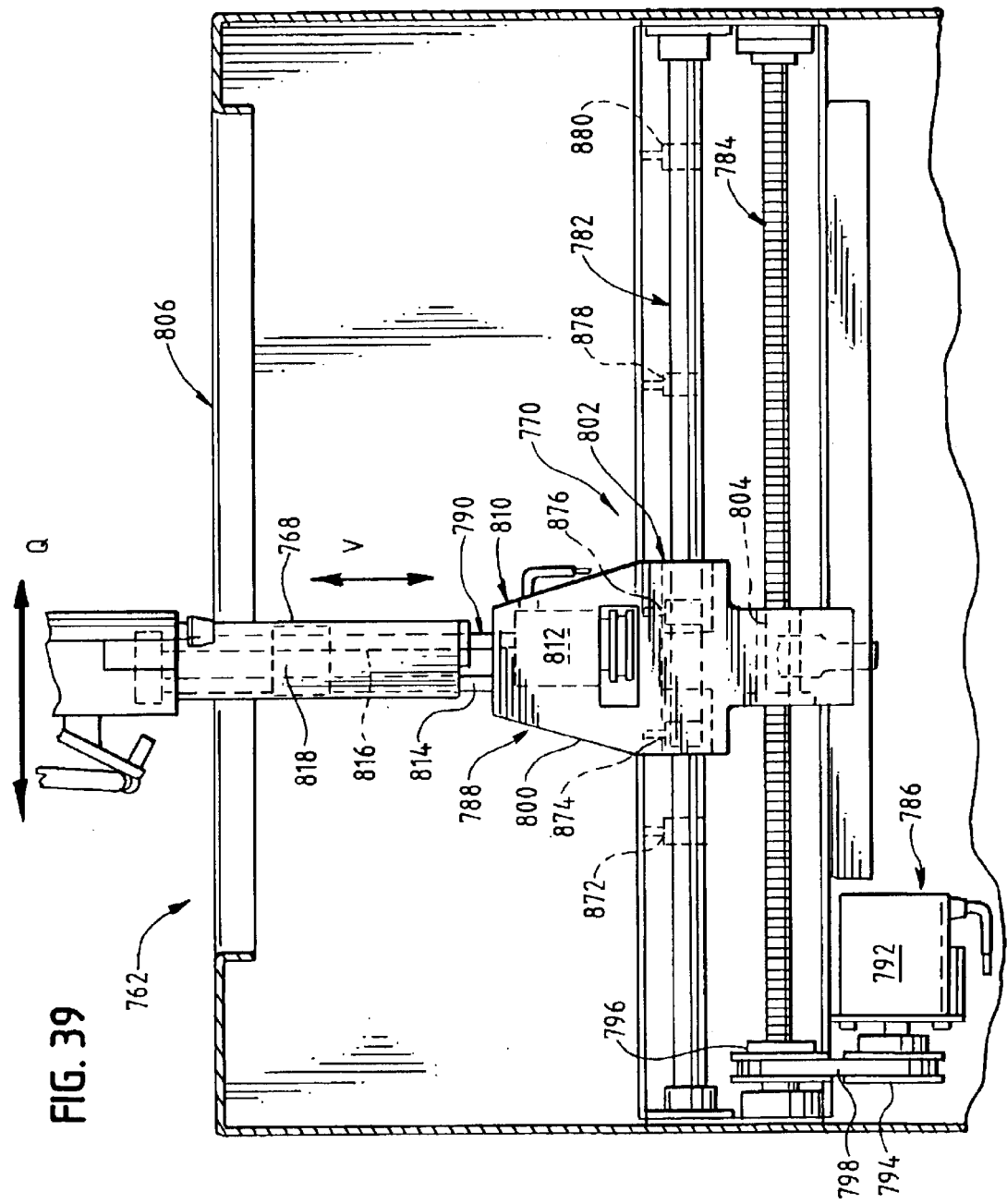
FIG. 39 is a front elevation view of another portion of the container handling apparatus of FIG. 34.

Carriage follower 788 is composed of a frame 800 having a guide aperture or slot 802 in which carriage guide 782 is disposed and a threaded aperture or slot 804 in which elongated worm gear 784 is disposed to impart lateral motion to carriage follower 788 by rotation of worm gear 784. Thus, carriage system 770 provides lateral movement in the direction of arrows Q as shown in FIG. 39. In this manner, carriage follower and thus mast 768 can be laterally translated as desired.

A suitable opening 806 is located in countertop surface 636 of cabinet 602 to permit mast 768 to extend therethrough.

Mast 768 can be raised and lowered in a vertical direction as indicated by arrow V in FIG. 39.

Mast 768 can be vertically raised and lowered in the directions indicated by arrow V in FIG. 39 by operation of a drive mechanism 810 that forms part of vertical translation mechanism 790. Vertical translation mechanism 790 is a vertically extending carriage system similar to that described with respect to carriage system 770 and includes a drive mechanism 810 which is composed of a motor 812 which is carried by carriage follower 788, a vertically disposed carriage guide 814, a vertically disposed worm gear 816 which is driven in a suitable manner by motor 812 such as previously described with respect to drive mechanism 786 of carriage system 770, which can be controlled in a similar manner. Vertical translation mechanism 790 also includes a vertical carriage follower 818 having a threaded aperture or slot and a guide aperture or slot (not shown) which vertical carriage follower 818 is secured to mast 768.

Mast 768 has mounted thereto frame 776, typically at an upper end thereof. Linkage assembly 780 is secured to frame 776 as well as pinion 774 and moveable rack member 772.

Moveable rack member 772 includes a frame 820 having a guide slot 822 vertically disposed therein and a rack 824 which meshes with pinion 774. Moveable rack member 772 may also include extra mass in the form of a weight block 826 to help urge moveable rack member downwardly when not restrained.

Figure 30:
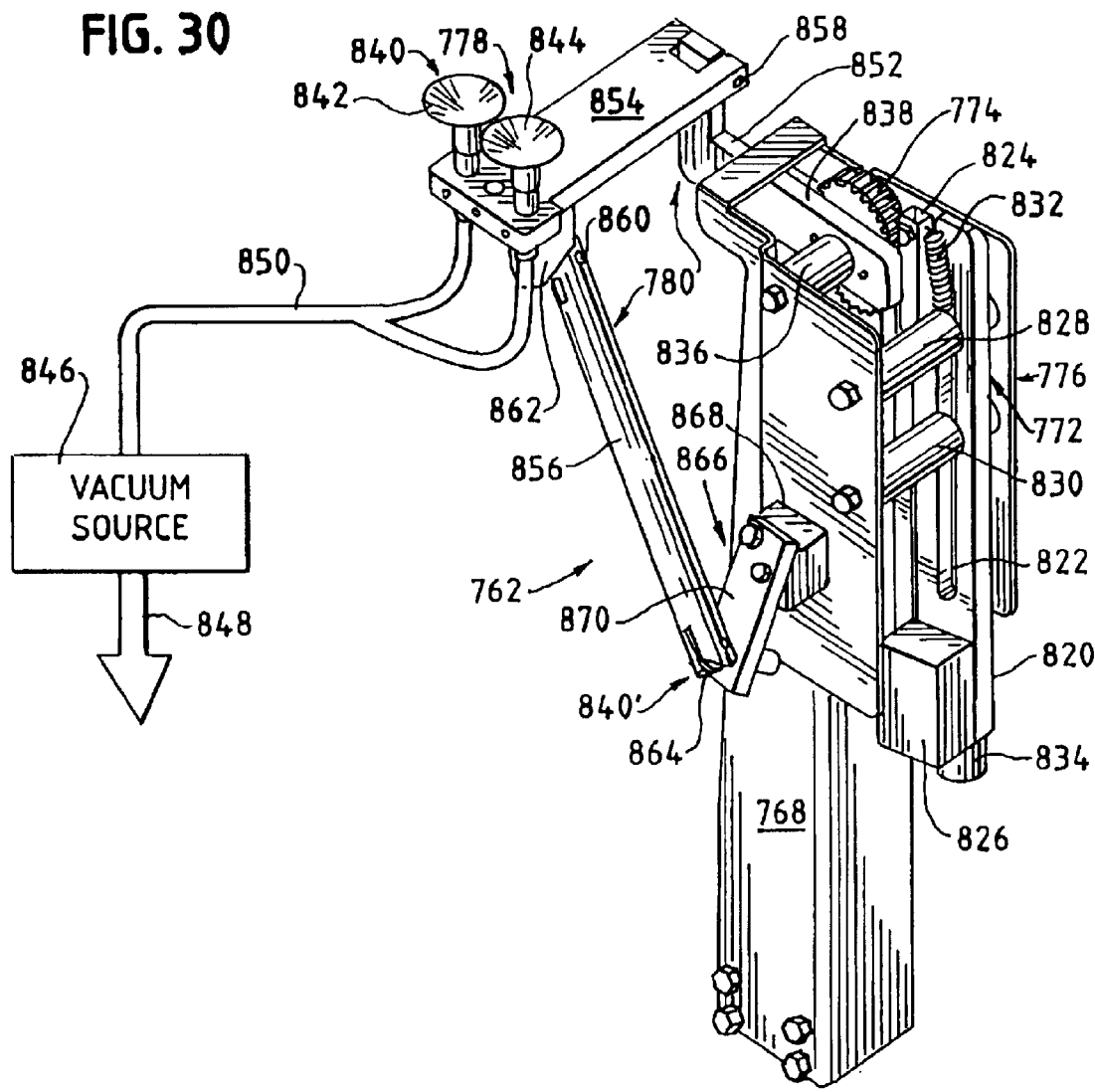
FIG. 30 is a front perspective view of a portion of an automated container handling system in accordance with the invention.

A pair of guides 828 and 830 are rigidly secured to frame 776 and are disposed within slot 822 of moveable rack 772. A spring 832 can be connected between an upper end of moveable rack member 772 and guide 828 or 830 to urge moveable rack member 772 to a lower position as illustrated in FIG. 30 compared with the upper position as illustrated in FIGS. 34–37.

In a preferred embodiment, moveable rack member 772 includes a stop 834 which stop can be vertically adjustable. While stop 834 is located at the bottom of moveable rack member 772 it is to be understood that a stop could be provided at another location provided that a suitable engaging surface at a proper location is provided.

Mounted to frame 776 is an axle 836 that is mounted for rotation relative to frame 776. Axle 836 has pinion gear 774 rigidly secured thereto as well as one end 838 of linkage 780.

The other end 840' of linkage 780 is securely mounted to frame 776 as illustrated in FIGS. 30–37, for example.

Figure 31:
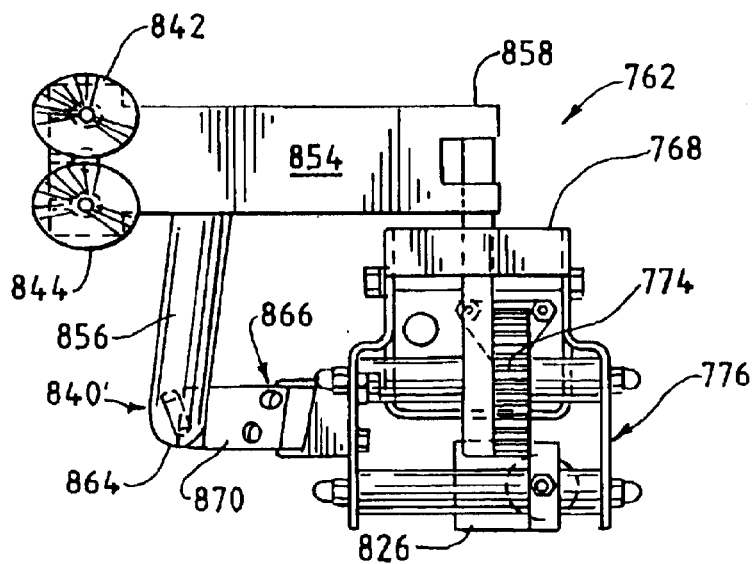
FIG. 31 is a top plan view of the container handling system of FIG. 30.
Figure 32:
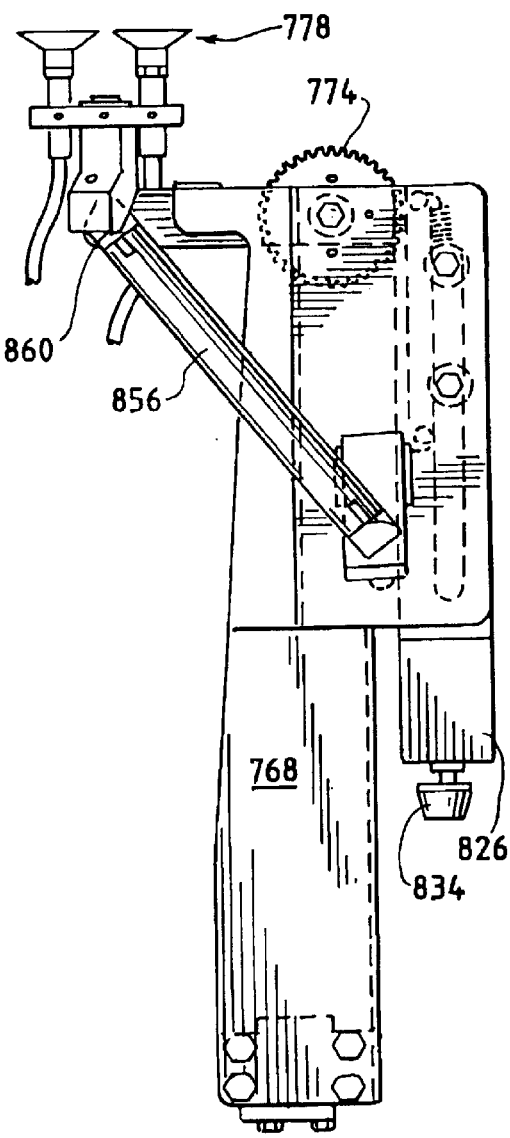
FIG. 32 is a side elevation view, partially broken away of the automated container handling system of FIG. 30.
Figure 33:
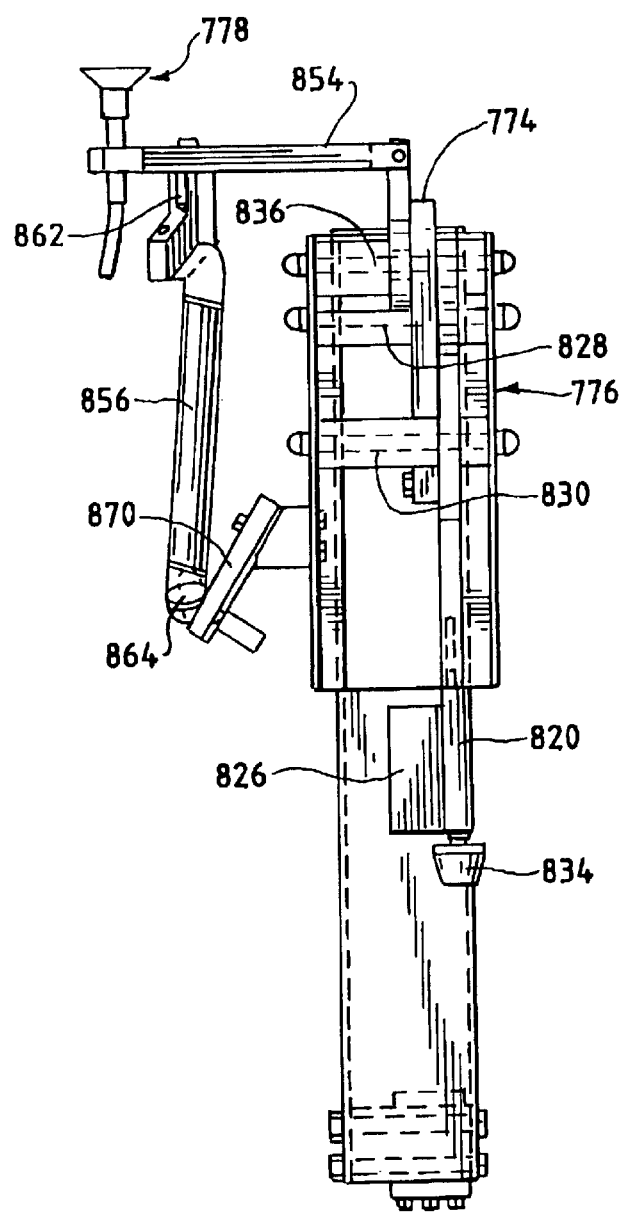
FIG. 33 is a rear elevation view of the container handling system of FIG. 30.
Figure 34:
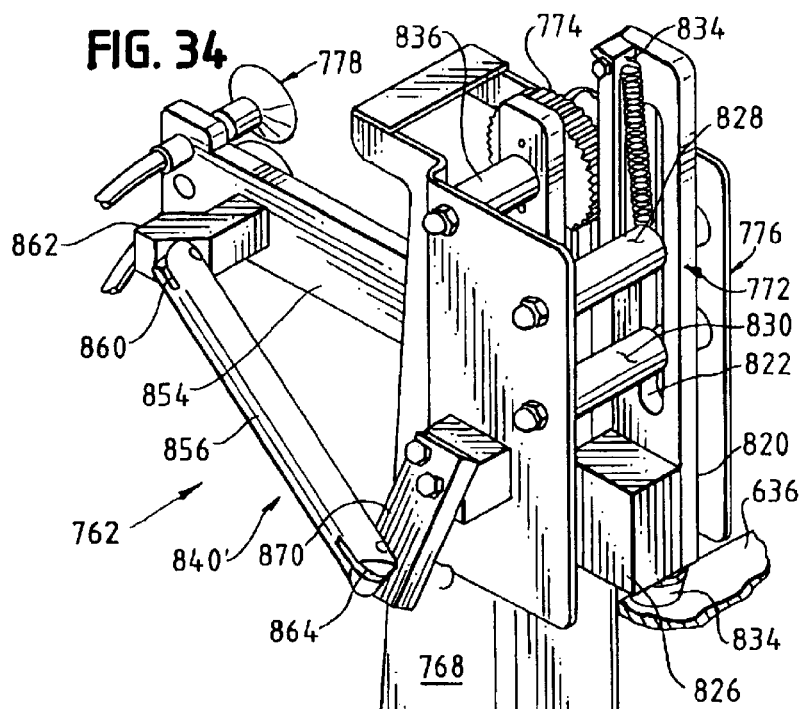
FIG. 34 is a front perspective view of the container handling system of FIG. 30 shown in another operative position.
Figure 35:
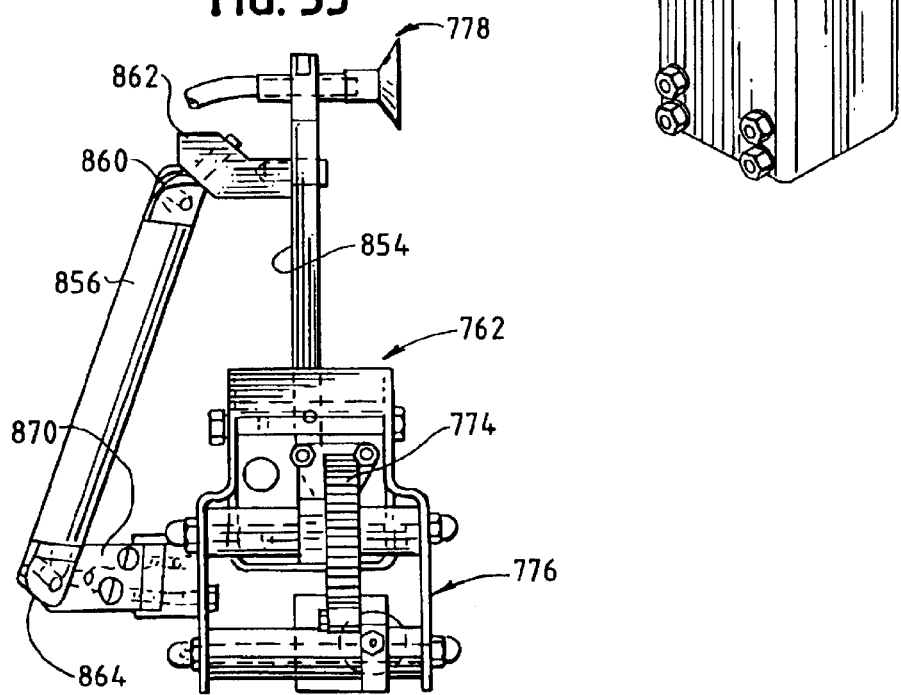
FIG. 35 is a top plan view of the container handling system of FIG. 34.
Figure 38:
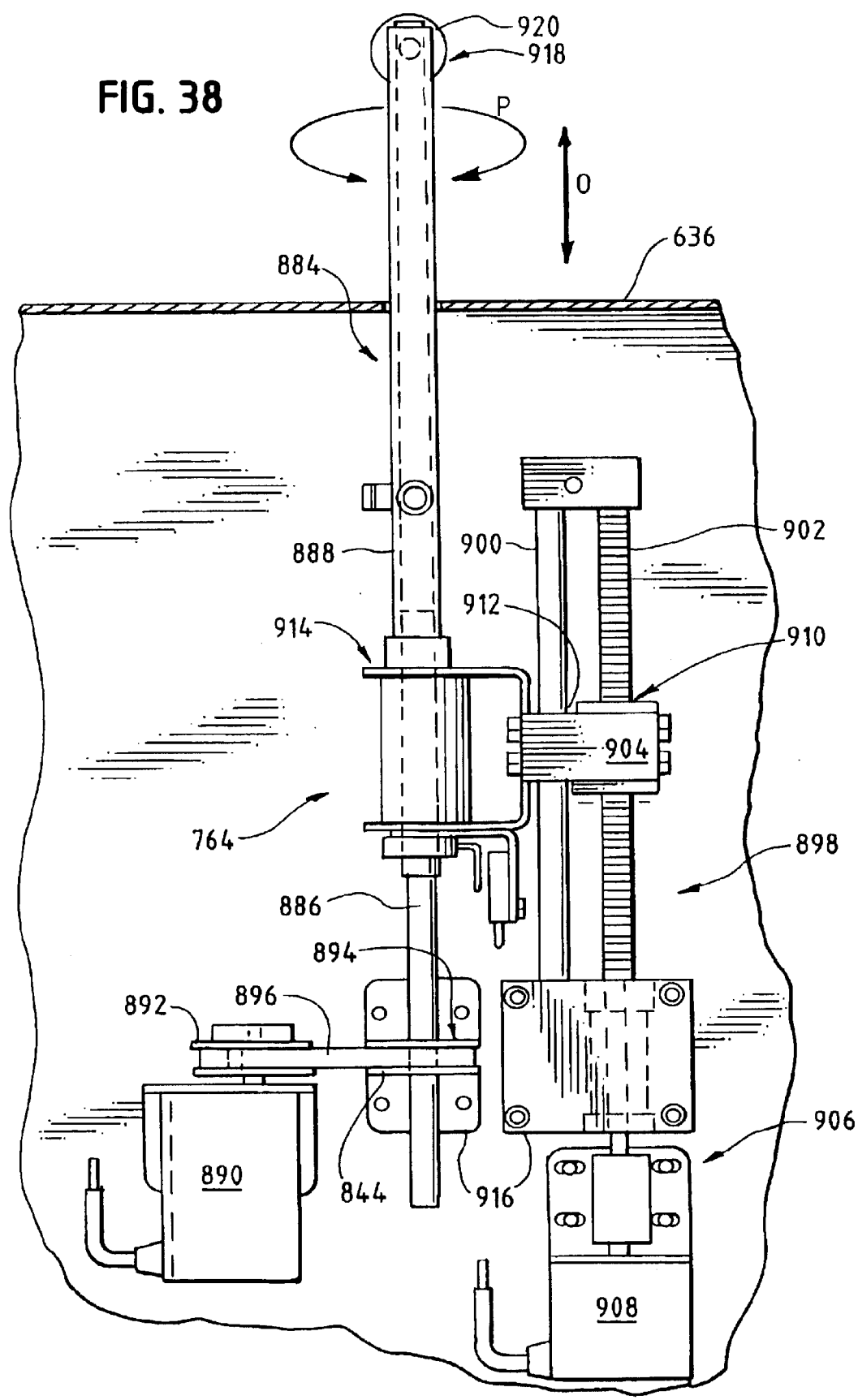
FIG. 38 is a front elevation view of a portion of a container handling apparatus in accordance with the invention.

Linkage 780 which carries container grasping member 778 is composed of a plurality of links so that container grasping member 778 is moveable from a horizontal position as illustrated in FIGS. 30–32 to a vertical position as illustrated in FIGS. 34–37. When container grasping member 778 is in the horizontal position it is utilized to grasp and retrieve a desired size of container from one of the apertures 720, 722, 724 and 726 from container storage magazine 638. For this purpose, container grasping member 778 includes a suction cup device 842 which includes at least one suction cup 842 and in the illustrated embodiment two suction cups 842 and 844 arrayed in substantially the same plane for grasping a container having a surface to be grasped by both suction cups 842 and 844 in the same plane. Suction cup device 842 also includes a vacuum source 846, a release valve 848 and a suitable vacuum line 850 which connects suction cups 842 and 844 to vacuum source 846, as illustrated in FIG. 30, for example. In operation, when suction cups 842 and/or 844 engage a container or other member to be grasped, vacuum source 846 is activated to supply vacuum to suction cups 842 and 844, such as to grasp and retain a container from one of apertures 720, 722, 724 and 726 of container storage magazine 638.

Linkage assembly 780 includes, in the illustrated embodiment, a first link 852, a second link 854 and third link 856.

First line 852 is rigidly secured to axle 836 and pinion 774. First link 852 is configured in an L-shape with the end of first link 852 opposite the portion connected to axle 836 pivotally connected to second link 854 having one end being pivotally connected to first link 852 via pivot connection 858.

Second link 854 is connected to third link 856 via a universal joint connection 860 a location spaced apart from pivot connection 858 as illustrated in, for example, FIGS. 30–37. Section cups 842 and 844 are mounted to second link 854. An offset member 862 which depends from second link 854 provides a desired offset for universal joint connection 860 which connects second link 854 to third link 856.

Third link 856 is, in turn, connected to frame 776 via a universal joint connection 864 which is at a distance removed from universal joint connection 860 which connects third link 856 to second link 854. An offset member assembly 866 is rigidly secured to frame 776 and includes an angled block 868 and an offset extension 870 to provide the desired angled and clearance for universal joint 864 and third link 856.

Figure 40:
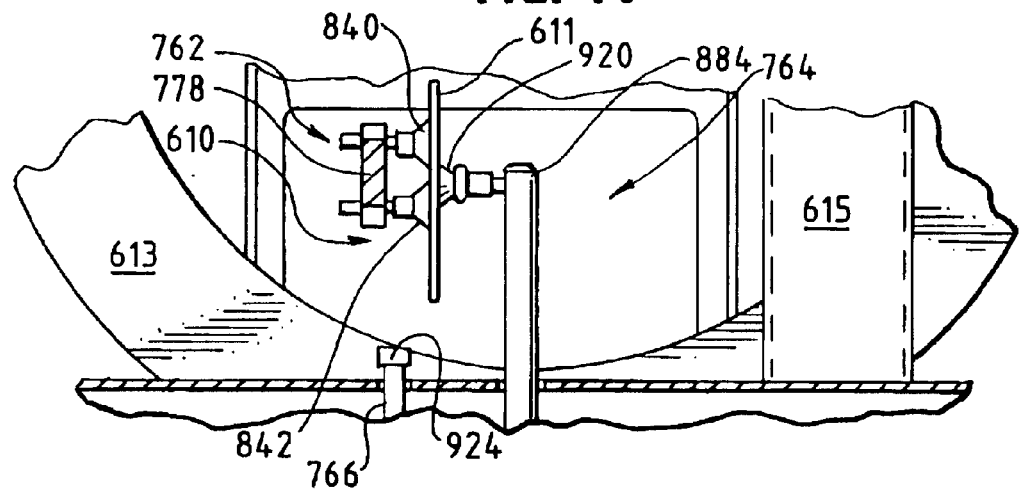
FIGS. 40–42 illustrate a front diagrammatic elevation view illustrating a portion of the container handling apparatus in accordance with the invention.

In operation, when moveable rack member 772 is moved relative to mast 768, such as when stop 834 contacts a surface, such as in the illustrated embodiment, countertop surface 636 as illustrated in FIG. 36, continued downward vertical movement of mast 768 causes rack member 772 to move upwardly relative to mast 768. This causes rotation of pinion 774 which meshes with rack 824 mounted to rack member 772. Rotation of pinion 774 in a counterclockwise direction in FIG. 30 causes rotation of first link 852. Such rotation causes downward movement of that portion of first link 852 that is pivotally connected to second link 854 via pivot connection 858. Such movement, in turn, causes second link 854 to pivot upwardly about pivot connection 858 in a clockwise direction as viewed in FIG. 30 to cause suction cups 842 and 844 to move to a vertically oriented position as depicted in FIGS. 34–37 from the horizontally oriented position depicted in FIGS. 30–33. In addition, such movement of first link 852 causes movement in rotation of third link 856 and universal joint connection 860 and 864 to the position indicated in FIGS. 34–37. When container grasping member 778 is in the position indicated in FIGS. 34–37, an unerected container held by suction cups 842 and/or 844 will be vertically oriented when suction cups 842 and/or 844 are attached to the container sidewall, as illustrated in FIG. 40, for example.

In a typical operation, container retrieving and grasping device 762 will be operated to position suction cups 842 and 844 below a container to be selected from container storage magazine 638. Mast 768 will be raised by operation of vertical translation mechanism 790 to a desired height so that suction cups 842 and 844 engage a container contained at the bottom of container storage magazine 638. Vacuum source 846 is activated and mast 768 can be lowered to remove a container from a desired one of apertures 720, 722, 724 and 726 of container storage magazine 638. Carriage system 770 can be activated to move container retrieving and grasping device 762 laterally to a desired location. Such lateral movement can be controlled by properly positioned sensors 872, 874, 876, 878 and 880, for example. For example, sensor 872 can define the position to retrieve a container from aperture 720, sensor 876 to retrieve a container from aperture 722, sensor 878 to retrieve a container from aperture 724 and sensor 880 to retrieve from aperture 726. Sensor 874 can be positioned to define the proper location of container grasping member 778 to erect the container that has been retrieved from one of apertures 720, 722, 724 or 726 of container storage magazine 638, as hereafter described. After erecting the container, the vacuum applied to suction cups 842 and 844 is released by operation of release valve 848 which permits suction cups 842 and 844 to disengage and release the container that had been grasped. Mast 768 can then be raised causing stop 834 to be removed from countertop surface 636 and by action of weight 826 and operationally spring 832, causing rack member 772 to move downwardly relative to mast 768 thereby rotating pinion gear 774 clockwise relative to the position shown in FIG. 34, thereby moving linkage assembly 780 to cause movement of container grasping member 778 from the position illustrated in FIGS. 34–37 to the position indicated in FIGS. 30–33, where container grasping member 778 is in position to retrieve a desired carton from container storage magazine 638 in a manner previously described, which includes lateral translation of container grasping member 778 by carriage system 770.

It is to be understood that any suitable automated device or system for retrieving, grasping and moving a container to a desired location as desired herein can be utilized in accordance with various aspects of the present invention. Thus, various aspects of the present invention are not limited by the particular embodiment of container retrieving and grasping device 762 and components thereof described herein. For example, an automated or robotic arm could be utilized to select, grasp and retrieve erected or unerected containers from a source as desired and then erect the carton or container in a suitable manner, followed by holding the erected container at dispensing location 710 and after filling placing the filled container, such as container 611 on to a suitable conveyor to move the filled container to a desired location.

Container grasping device 764 of container retrieving and grasping device 762 will now be described, and in particular with reference to FIGS. 38 and 40–44.

Container grasping device 764 includes a rotatable and vertically translatable mast 884. Mast 884 can be rotated as illustrated by arrow P in FIG. 38 and vertically translated up and down as indicated by arrow O also in FIG. 38. Mast 884 is connected to a shaft 886 via a slot and key arrangement between mast 884 and shaft 886 permitting mast 884 to be rotated by shaft 886 which, in turn, can be rotated by a step or motor 890 or other suitable motor or device to rotate shaft 886 a desired degree. Motor 890 drives a drive pulley or gear 892 which, in turn, drives a driven pulley or gear 894. In the case where pulleys are utilized, a belt 896 is used to transmit rotation from pulley 892 to pulley or gear 894. Motor 890 can be a stepper router or a servo motor as desired. Alternatively, an AC or DC motor can be utilized provided that a suitable control is provided so that the orientation of mast 884 can be determined. A carriage system 898 is utilized to provide the desired vertical movement of mast 884 in up and down directions. Carriage system 898 is similar to carriage system 770 previously described and includes a carriage guide 900, a worm gear 902, a carriage follower 904, a drive mechanism 906 which includes a motor 908 (which can be a servo motor or an AC or DC motor) suitably controlled to drive or gear 902. Carriage follower 904 includes a threaded aperture or slot 910 which communicates with worm gear 902 and a threaded aperture or slot 912 in which guide 900 is disposed. A carriage follower interface 914 connects carriage follower 904 to mast 884 and permits shaft 886 to rotate with respect to carriage follower interface 914. Thus, in operation, rotation of motor 908 rotates worm gear 902 thereby translating carriage follower 904 up or down depending on the direction of rotation. A suitable sensor (not shown) can be employed to determine the height of mast 884 for control by control system 118 for packaging device 600.

Suitable mounting structure 916 is provided to mount container grasping device 764 to a desired location, such as within cabinet 602. A slot and key arrangement between shaft 886 and mast 884 permits 884 mast to be vertically translated either up or down while shaft 886 is rotated.

Mounted on the upper end of mast 884 is a suction device 918 which includes a suction cup 920, a source of vacuum (not shown) for suction cup 920 and a release valve (not shown) for releasing the vacuum to suction cup 920. Vacuum can be supplied from within mast 884 to suction cup 920 by a suitable connection as is known in the art.

Container bottom urging device 766 consists of a mast 922 that is vertically translatable up and down by suitable apparatus (not shown). Such apparatus can be similar to vertical translation mechanism 790 previously described with respect to container retrieving and grasping device 762. Preferably, mast 922 has a blunt end 924.

In operation, container retrieving and grasping device 762 selects an appropriately sized container from container storage magazine 638 as directed by the control system for food packaging device 600. After retrieving the container, which in this case is container 611, container retrieving and grasping device 762 moves container 611 to a position as indicated in FIG. 40 against suction cup 920 so that opposed sidewalls of container 611 are grasped by suction cups 840 and 842 of container grasping member 778.

Figure 41:
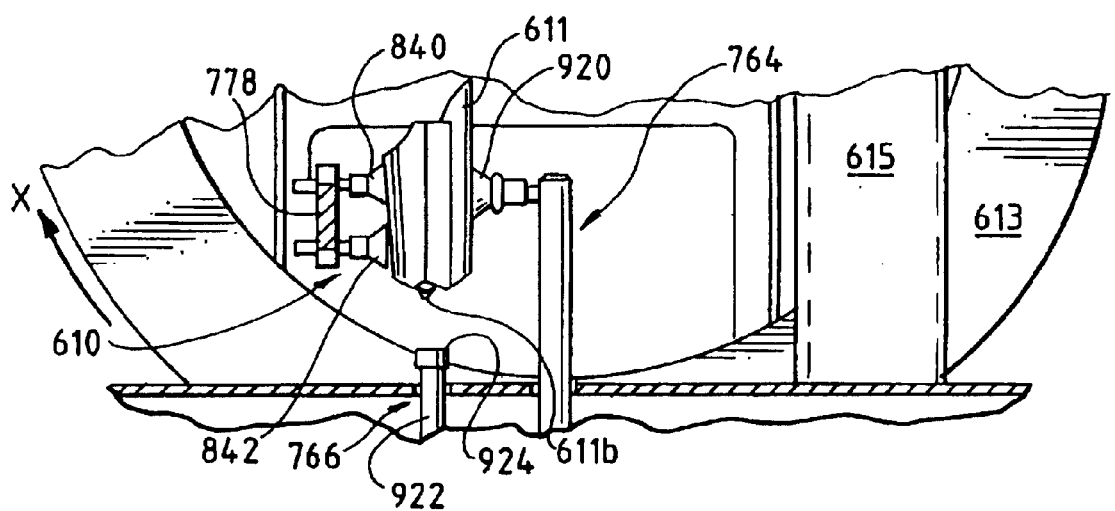
Figure 42:
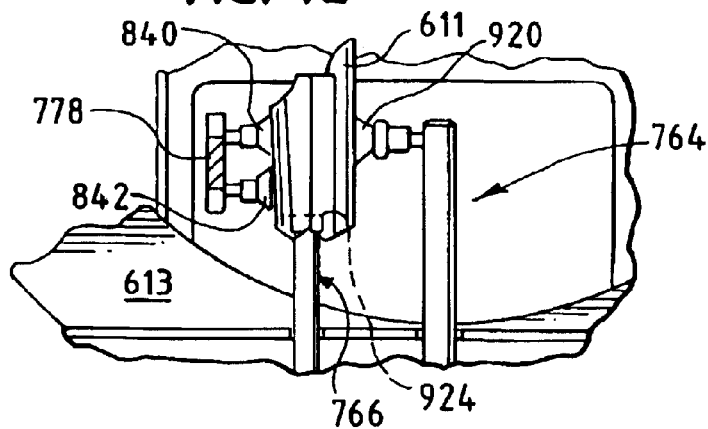

Next, as shown in FIG. 41, container grasping member 778 is moved laterally away from suction cup 920 while maintaining suction on suction cups 842 and 844. Container 611 is partially erected as shown in FIG. 41 with bottom 611b depending downwardly slightly. Container bottom urging device 766 is then activated as illustrated in FIG. 42 to urge bottom 611b of container 611 upwardly into the fully erected position. Container grasping member 778 is released and retracted from container 611 and returned to a horizontal up position to select another unerected container for erection.

Next, mast 884 is rotated approximately 90° by motor 890 to place container 611 in discharge position 710 of food dispensing chute mechanism 608. Food dispensing chute mechanism 608 is then lowered to discharge French fries FF therefrom and into container 611. Any French fries that are not received into container 611 are collected by overflow food collection member 613 which is then rotated clockwise in the direction of arrow X as shown in FIG. 41 to recycle such French fries to upper chute 686 for subsequent delivery to another container. After the French fries are dispensed from food dispensing chute mechanism 608, cylinder 700 is retracted placing food dispensing chute mechanism 608 in the upper position as shown in FIG. 44. Mast 884 can then be rotated back and forth slightly (e.g., such as 2° to 20°, for example) to simulate shaking to dislodge any loose French fries or dangling French fries in container 611 and any dislodged French fries will then fall into overflow food collection member 613 for subsequent recycling. Mast 884 can also be raised and lowered slightly and relatively quickly either before, during or after the angular rotation to further simulate shaking. Thereafter, mast 884 is rotated approximately 180° until container 611 is directly over container-receiving receptacle 612 as indicated by T in FIG. 44. Mast 884 is then lowered by operation of carriage system 898 until the bottom of container 611 rests in container-receiving receptacle 612. Then, the vacuum supplied to suction cup 920 is released and suction cup 920 releases from container 611. Mast 884 can then be rotated 90° so that it is in position to receive another container to be erected.

Container-receiving receptacle 612 is then transported via conveyor system 614 which will now be described in detail.

Conveyor system 614 and portions or elements thereof are illustrated in various figures including FIGS. 1, 25–29 and 45–50.

Conveyor 614 includes, in the illustrated embodiment, raceway 620 which can be formed along the surface of countertop 636 or on some other surface as desired. Raceway 620 is preferably in the form of a continuous loop raceway and is defined by spaced apart guides 620a and 620b mounted to countertop 636 to guide receptacles 612. Conveyor system 614 includes one or more and typically a plurality of container-receiving receptacles 612 which are illustrated in detail in FIGS. 46–50. Gate structure 634 of conveyor system 614 includes a first gate 926 and second gate 928. First gate 926 is moveable and typically second gate 928 can be stationary as hereinafter described.

Figure 45:
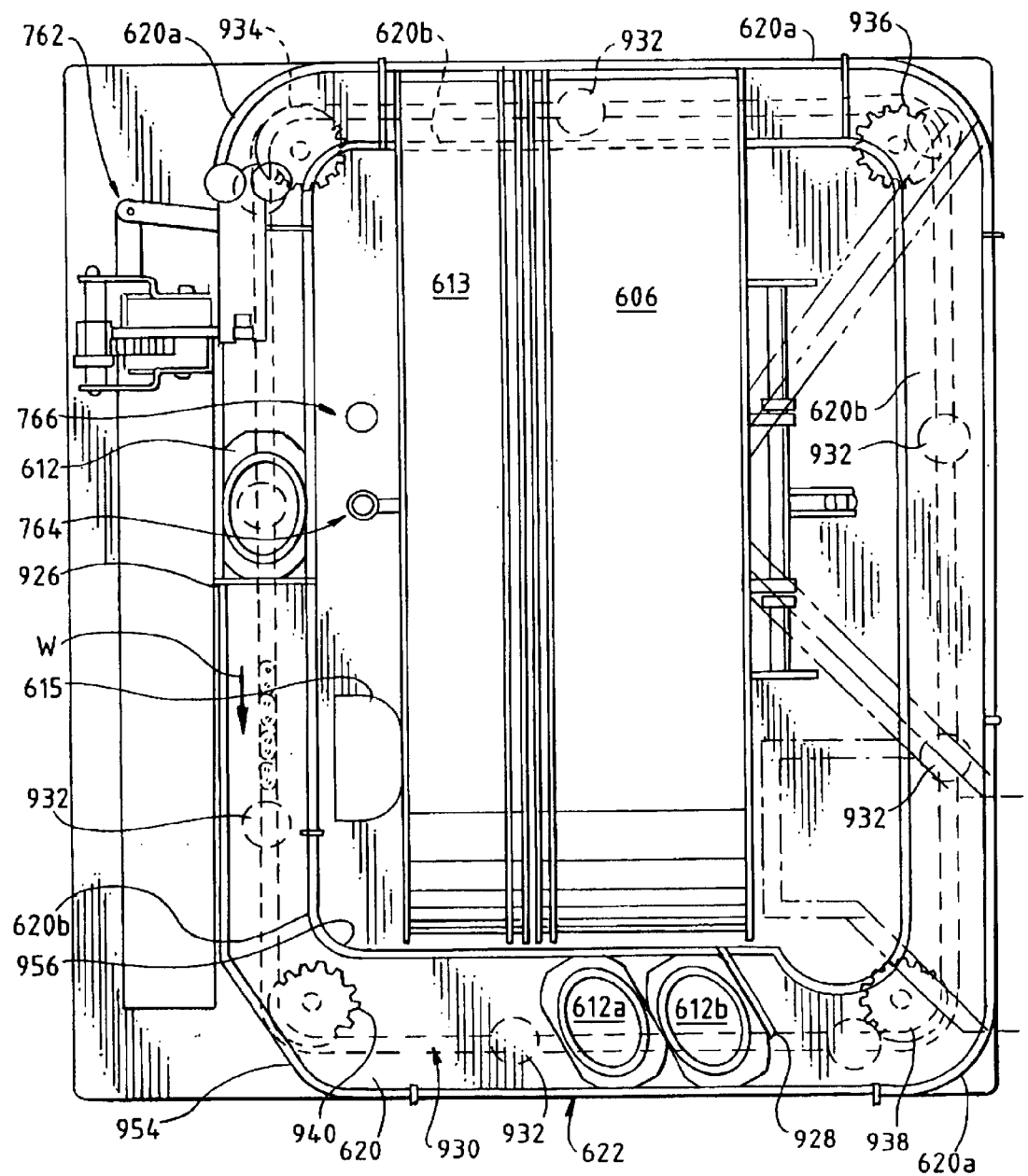
FIG. 45 is a top plan view of a food packaging device in accordance with the present invention.
Figure 57:
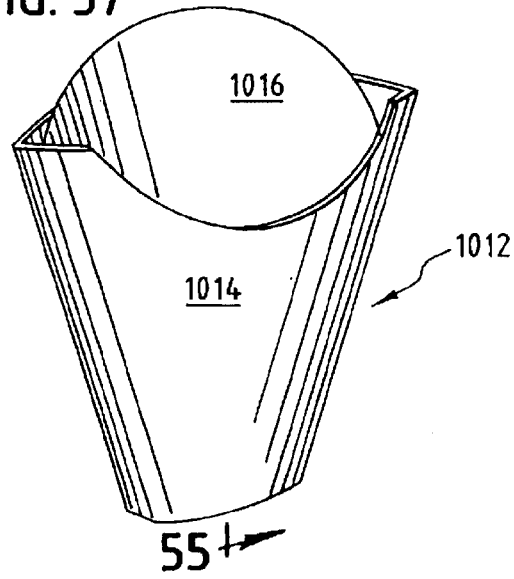
FIG. 57 is a perspective view of a food container useful in accordance with the present invention.

Conveyor system 614 also includes structure for causing movement of container-receiving receptacle 612. In the illustrated embodiment, container-receiving receptacles 612 are moved via an endless loop 930 that can be located beneath countertop 636. Endless loop 930 carries a plurality of magnets 932 as illustrated in FIGS. 45 and 49, for example. Magnets 932 are spaced along endless loop 930. Endless loop 930 may comprise a chain or other suitable structure that can be driven by a drive system that includes sprockets 934, 936, 938 and 940. One of sprockets 934, 936, 938 and 940 can be a driven sprocket.

Any suitable endless loop 930 can be utilized such as a belt or a chain. Pulleys could be used in place of sprockets 934–940. The route of endless loop 930 follows the route of raceway 620.

Container-receiving receptacle 612 typically includes a base 942 and a container-receiving well 944 located over base 942. Base 942 includes an enclosed compartment 946 which can be conveniently accessed by a base plate 948 located along the bottom of base 942 that is fastened to base 942 by suitable fasteners 950. Contained within enclosed compartment 946 is a magnet 952.

Container-receiving receptacle 612 follows the movement of magnet 932 due to magnetic attraction between magnets 932 and 952 thereby causing movement of container-receiving receptacle 612 along raceway 620.

Enclosed compartment 946 is dimensioned to permit magnet 952 to be free to rotate therein allowing container-receiving receptacle 612 to be readily guided by rails 954 and 956 that are raised above countertop 636.

Movable gate 926 prevents movement of container-receiving receptacle 612 located thereat as illustrated in FIG. 45. This ensures that container-receiving receptacle 612 is in position to receive a loaded container of French fries, such as container 611 from container grasping device 764. After a filled container is placed on container-receiving receptacle 612 adjacent moveable gate 926, gate 926 is automatically removed by a suitable mechanism (not shown) to permit container-receiving receptacle 612 thereat to be moved by conveyor system 614 until French fry container 611 contained therein contacts gate 928 or receptacle 612 contacts another receptacle that is located at pick up area 622 as shown in FIG. 45. Once container 611 is moved from receptacle 612*b*, receptacle 612*b* is then free to move along raceway 620 and passes underneath second gate 928, which can be a stationary gate. Alternatively, second gate 928 could be a moveable gate and could be located at a level that directly prevents movement of receptacle 612*b*. After receptacle 612*b* passes underneath second gate 928, receptacle 612*a* is moved into the position formerly occupied by receptacle 612*b* provided that receptacle 612*a* has a French fry container thereon which would then cause receptacle 612*a* to be stopped at gate 928. Similarly, when that container is removed from receptacle 612*a*, receptacle 612*a* would then be free to pass underneath gate 928 and around that portion of raceway 620 until encountering gate 926 or another receptacle that is stopped by gate 926.

Referring to FIGS. 51–60, there is illustrated various views of French fry cartons that are useful in accordance with the present invention. The French fry cartons depicted in FIGS. 51–60 are particularly suitable for use in conjunction with the present invention since the cartons readily stand upright without assistance and can be erected by automated container handling system 610, previously described.

FIG. 51 illustrates a front elevation view of a carton 1012 that is particularly suitable for containing French fries, for example. Carton 1012 is illustrated in FIG. 51 in an erected or opened position and includes a pair of opposed curved sidewalls 1014 and 1016 and a bottom panel 1018.

Carton 1012 can be stacked in a collapsed configuration and stored in a suitable magazine, such as container storage magazine 638 as previously described. When in a collapsed position, carton 1012 is particularly suited to being opened or erected by pulling sidewalls 1014 and 1016 apart and urging bottom panel 1018 upwardly, as described with respect to the erection or opening of container 611 by automated container handling system 610. Container or carton 611 is of a design that is similar to carton 1012.

Figure 59:
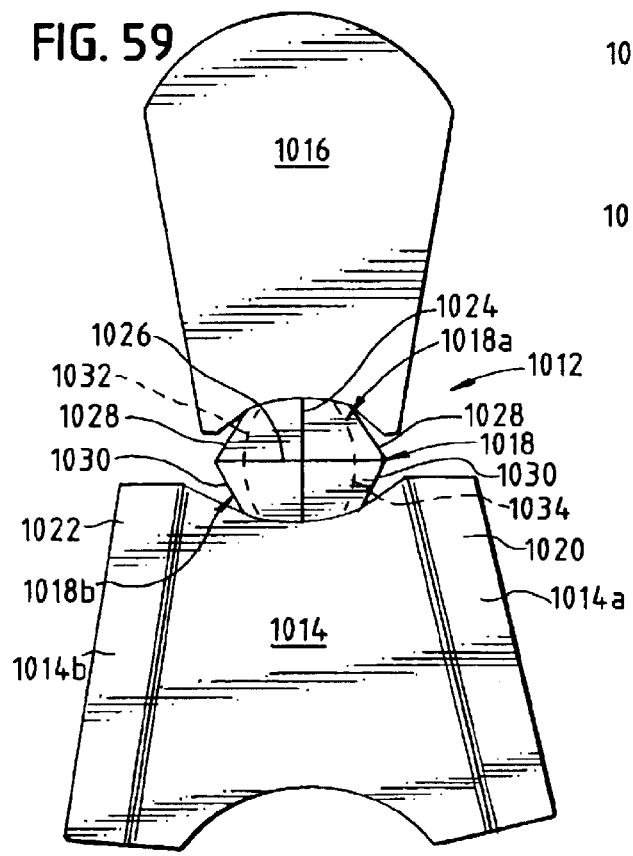
FIG. 59 is a development view of the carton of FIG. 51.
Figure 60:
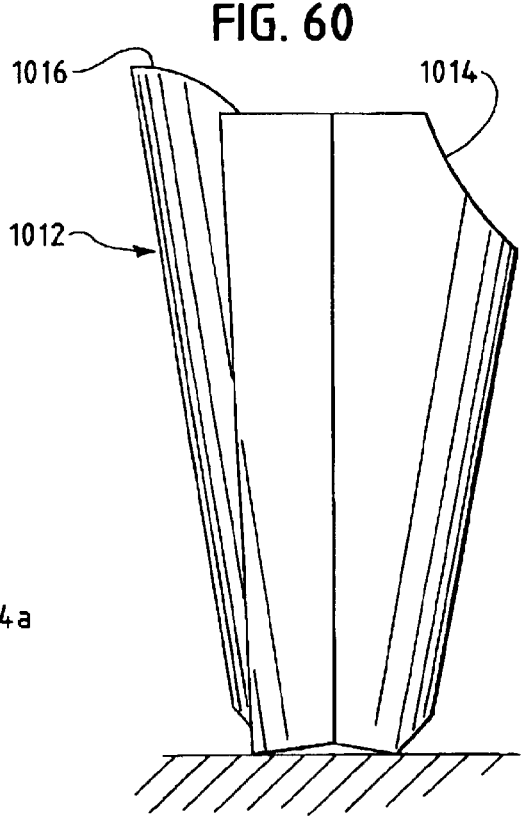
FIG. 60 is a side elevation view of the carton of FIG. 51.

Carton 1012 also includes two supporting legs 1020, 1022 that extend downwardly from the lower portions of the overlapping edge portions of sidewall 1014 indicated by reference numerals 1014*a* and 1014*b* in FIG. 59 and FIG. 53.

Carton 1012 is capable of standing on its own because of legs 1020 and 1022 that extend below bottom panel 1018 when carton 1012 is open or erected.

Carton 1012 can be constructed from a single blank of paperboard which is illustrated in FIG. 59. When constructed, sidewall edge portions 1014*a* and 1014*b* form flaps that are glued to the edges of sidewall 1016 as indicated in FIG. 54, for example.

Bottom panel 1018 is specially configured to facilitate opening or erection of carton 1012 by an automated carton handling device such as automated container handling system 610, previously described in detail. Bottom panel 1018 includes intersecting lines 1024 and 1026. Intersecting lines 1024 and 1026 intersect at a generally central location of bottom panel 1014, which panel is generally oval even though it may incorporate straight edges 1028 and 1030, for example. Intersecting lines 1024 and 1026 may be fold lines, lines of weakening, score lines or even perforations. All such structures are referred to herein with respect to intersecting lines 1024 and 1026 of bottom panel 1018 only as "fold lines." Typically, the intersection of fold lines 1024 and 1026 form an angle in the range of from about 60° and about 120°. In one embodiment, the intersecting bottom panel fold lines are oriented such that one of said lines (fold line 1024 in FIG. 59) is normal or at least generally normal to curved sidewalls 1014 and 1016. In such embodiment, the other of the intersecting fold lines (in this case fold line 1026) is at least generally parallel to curved sidewalls 1014 and 1016. Preferably, fold line 1024 extends from sidewall 1014 to sidewall 1016.

As previously mentioned, carton 1012 is foldable to a collapsed position with sidewalls 1014 and 1016 being planar and in contacting overlying relation to each other with bottom panel 1018 being divided into two overlying panels 1018*a* and 1018*b* by intersecting fold line 1026.

Preferably, bottom panel 1018 includes two additional fold lines 1032 and 1034 on either side of fold line 1024 that extends from one carton sidewall to the other, in this case from sidewall 1014 to sidewall 1016. Secondary fold lines 1032 and 1034 further facilitate the opening or erection of container 1012 with an automated device such as automated container handling system 610.

Figure 58:
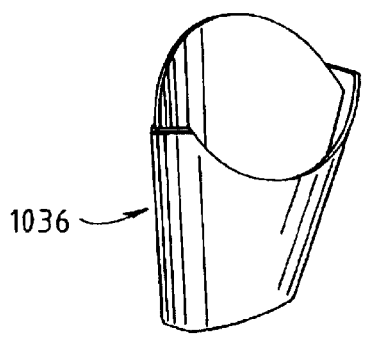
FIG. 58 is an alternate embodiment perspective view of a container useful in accordance with the invention.

FIG. 58 illustrates a carton 1036 that is similar in construction to carton 1012 previously described except that carton 1036 is of a different size. Preferably, carton 1012 is configured such that the width of the base is relatively narrow and the sidewalls 1014 and 1016 flare outwardly so that container 1012 is substantially wider at the top (from about 1.6 to 2 or more times the base width). This allows relatively large and tall containers to be placed in an automobile cup holder CH as depicted in FIG. 56.

Referring to FIG. 2, there is illustrated an alternate embodiment of an automated food processing system 101 in accordance with the invention. Automated food processing system 101 includes a food dispensing device 201 which is similar to food dispensing 200, previously briefly described, where like reference numerals represent like elements. Food dispensing device 201 includes fewer uncooked bulk food dispensing containers 204 and additional magazine food dispensers that are similar to magazine food dispenser 206, previously referred to. Otherwise, dispensing device 201 is similar to dispensing device 200 previously described.

Automated food processing system 101 also includes fry device 400 which has been described.

One primary distinction between automated food processing system 100 and automated food processing system 101 is that automated food processing system 101 does not include an automated packaging device such as automated packaging device 600. In place of food packaging device 600, a food storage device 635 is provided. Food storage device 635 allows food cooked by food frying device 400 to be stored in a heated environment for subsequent manual processing. As configured in FIG. 2, food storage device 635 includes separate product receiving receptacles 637, 639, 641 and 643. Each receptacle 637, 639, 641 and 643 is dedicated to receiving food from a respective one of fry wheels 410, 412, 414 and 404, respectively. In addition, each receptacle 637-643 can have placed therein a suitable container to receive food, such as handled trays 645, 647, 649 and 651.

As illustrated in FIG. 2, a food item F is being discharged from fry wheel 414 down a chute 653 and into handled tray 649 contained within heated receptacle 641. Food item F can be stored therein for a period of time until it is ready for subsequent processing.

Figure 62:
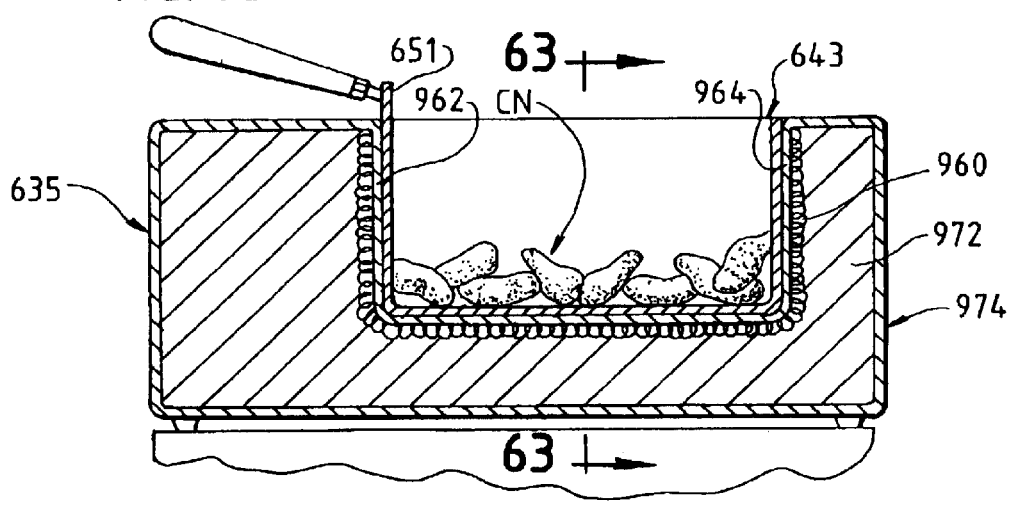
FIG. 62 is a sectional view of a portion of a food storage device in accordance with the present invention.
Figure 63:
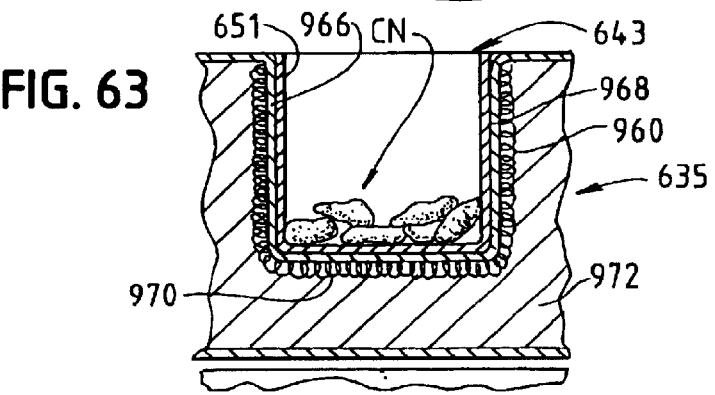
FIG. 63 is a sectional view of the food storage device of FIG. 62.

Referring to FIGS. 62 and 63, there is illustrated heated receptacle 643 in a cross-sectional view and FIG. 63 is a cross-sectional view taken along line 63—63 of FIG. 62 showing the entire width of receptacle 643.

As illustrated in FIGS. 62 and 63, heated receptacle 643 is a heated well having a heating element that heats sidewalls 962, 964, 966 and 968 as well as bottom 970 of heated receptacle 643. Heating element 960 is in close proximity to walls 962, 964, 966 and 968 as well as bottom 970. Heating element 960 may be composed of a single heating element or multiple heating elements as desired. Suitable controls may be provided to adjust the temperature of walls 962–968 as well as bottom 970 of heated receptacle 643. In addition, suitable insulation 972 can be contained within the cavity that is defined by cabinet 974 of food storage device 635, which is partially shown in FIGS. 62 and 63.

Preferably, handled trays 645–651, such as handled tray 651 depicted in FIGS. 62 and 63 are dimensioned such that they are in close proximity to walls 962–968 and bottom 970 when placed in heated receptacle 643.

Food packaging device 600 may optionally include food seasoning device 616, which is illustrated in detail in FIGS. 65–68. Food seasoning device 616 includes a hopper 972, a metering wheel 974, a wheel drive system 976, a dispensing tube 978 and a dispersion head 618.

Hopper 972 is configured to hold a desired bulk quantity of a seasoning material, such as salt S. Bulk hopper 972 includes a lid 982 that can be removed to replenish the supply of salt S contained therein. Hopper 972 can have a bottom with inwardly extending sidewalls 984 to facilitate the dispensing of material from bottom 986 of hopper 972 which may include a dispensing tube 988.

Metering wheel 974 is located beneath bottom 986 and dispensing tube 988 to receive a charge of salt or other seasoning therefrom. Metering wheel 974 includes a cavity 990 for receiving a charge of salt from dispensing tube 988. Metering wheel 974 is rotatably mounted in a housing 992 and can be rotated about the longitudinal axis of metering wheel 974 to cause cavity 990 to be directed downwardly which thereby causes the seasoning or salt contained in cavity 990 to fall by gravity therefrom.

Metering wheel 974 is suitably rotated by wheel drive system 976. Wheel drive system 976 can be controlled by a suitable electronic control system that can form part of the food packaging device 600. Typically, in operation, when French fries FF are dispensed from one or more of fry wheels 404, 410, 412 and 414 onto chute 604, a suitable sensing device (not shown) senses the presence of French fries and activates wheel drive system 976 of automated food seasoning device 616 to discharge a predetermined quantity of seasoning, such as salt, onto the French fries that traverse chute 604.

Dispensing head 618 can be located in a desired position to apply seasoning to the food traversing chute 604. As illustrated in FIG. 3, for example, dispensing head 618 can be located towards a bottom portion of inlet chute 604 and may extend over a portion of rotatable food dispensing member 606.

Wheel drive system 976 as illustrated in FIGS. 65–68 includes a solenoid plunger 994 for driving a linkage 996 that is connected to metering wheel 974 to impart rotation to metering wheel 974. Linkage 996 includes a crank arm 998, one end of which is connected to a central portion of metering wheel 974 and the other end is connected to a lever arm 1000 which, in turn, is connected to solenoid plunger 994. Lever arm 1000 can be driven by solenoid plunger 994 which, in turn, causes crank arm 998 to be driven, thereby rotating metering wheel 974 sufficiently to cause cavity 990 to be directed downwardly, thereby permitting any seasoning or salt contained therein to be dispensed therefrom.

A collection funnel 1002 is disposed at the discharge end of housing 992 and connects to dispensing tube 978. Dispensing tube 978 is, in turn, connected to dispensing head 618.

Dispensing head 618 can include a plurality of vanes 1004 for facilitating dispersion of seasoning dispensed therefrom. As illustrated, there are four vanes 1004 spaced 90° from each other.

Dispensing tube 978 has a lower end portion 1006 that terminates some distance above dispensing cone 1008 of dispensing head 618. In one embodiment, lower end portion 1006 of dispensing tube 978 may terminate approximately 0.25 inches from the tip of dispersion cone 1008.

Dispersion cone 1008 includes a plurality of holes 1010 that are arrayed through dispersion cone 1008 to facilitate the distribution of seasoning or salt. In operation, as salt or seasoning is dispensed through lower end portion 1006 of dispensing tube 978, the seasoning strikes the top portion of dispersion cone 1008 and is directed into four quadrants via vanes 1004. As the seasoning traverses the surface of dispersion cone 1008, some of the seasoning falls through holes 1010 in dispersion cone 1008. Note that not all of holes 1010 are labeled, for purposes of clarity in the Figures. Other salt or seasoning particles do not fall through holes 1010 but fall off the lower end of dispersion cone 1008. Still other seasoning particles bounce or are otherwise deflected off the top surface of dispersion cone 1008 and fall a lateral distance removed from dispersion cone 1008. In this manner, a good distribution of seasoning is achieved over a relatively large area.

The Control System and Method

In one embodiment, the System Master Controller of a Server (PC), a router/hub, and a touch-screen monitor (user interface). The Master can utilize existing technology to integrate, to manage, to control, and to coordinate information flow of and through the various subsystems for overall system operation. The network technology is fully compliant with the latest version of the industry's NAFEM Protocol.

Control System Features

Referring to FIGS. 69–73, the primary functions of the Control System are to receive order information from the POS and to connect and coordinate all operating subsystem controllers with the Master Controller so that operational commands and functional information can be communicated and displayed. The result is that all the dispensing, fry and packaging modules function as one integrated fried foods production system.

In one embodiment, the Control System is event and demand driven. That is, nothing happens unless a functional component or subsystem receives a command signal to initiate the action. In a normal operation mode, the POS will provide virtually all of the system order demands. These can take the form of a string of two-bit Order Events. Typically this will be a quantity and an item (for example, 2 each regular size fries). The product description can consist of both the food item and its portion size, treated as one bit of information.

The Control System information can be categorized into Order Events, Inbound Events, and Outbound Events. The Order Events come from primarily the POS system, the historical kitchen management system (KMS) data, or the touch-screen Monitor if a manager wants to override the automatic ordering. KMS is a database of information of, for example, the sales rate of various products versus day and time. The Order Events dictate and demand the operation and performance of the automation control system for production. The Inbound Events information includes messages generated by subsystem controllers other than the POS or KMS. The Outbound Events include typical command messages issued by the Master Controller specifying functions to be performed by individual subsystem controllers.

In one embodiment, the Master Controller is configured to monitor periodically or continuously the network for events to occur. Once an event takes place and a signal is sent on the network, the Master Controller identifies the source of the signal, then compares it to the programmed schedule of events within its memory, and reacts appropriately, either sending out a new command, showing a display, storing information in memory, or all of the above.

An important source of data for the Control System can be the Kitchen Management System (KMS). The KMS is a historical database of operational information. This information can be used to set the workstation configuration, process settings, inventory levels, and set a level of production in advance of actual customer demand orders. This interface can be a two-way connection, so that all operational data from the Fried Foods Workstation can be received and stored in the KMS and/or the Control System, or evaluated, adjusted, and re-entered to "fine-tune" the process on a continuing basis.

Figure 70:
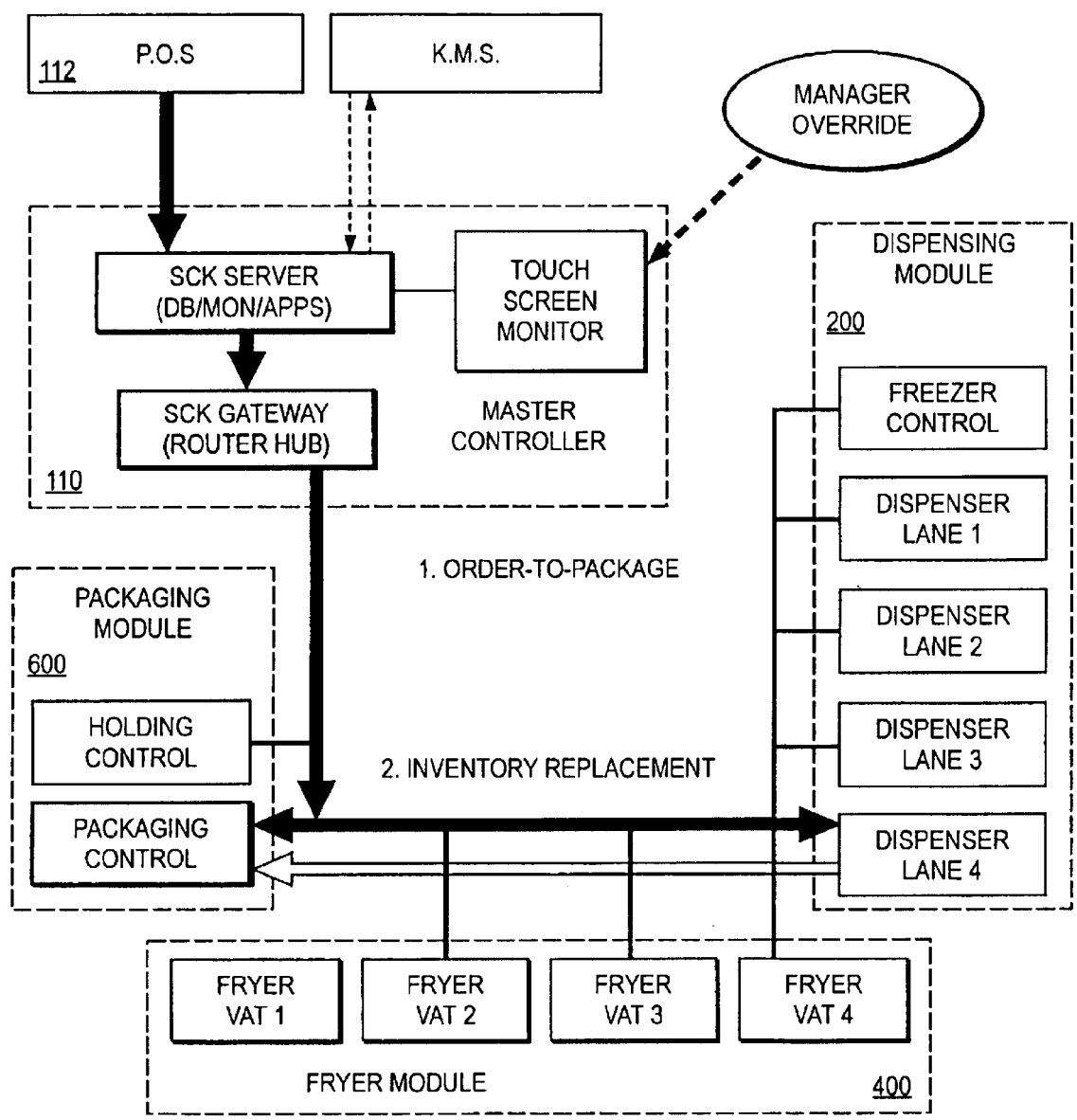
FIG. 70 is a diagrammatic view of a control system in accordance with the present invention.

Generally, the Control System can comprise two loops, shown in FIG. 70. The primary loop is the "Order-to-Package" loop, whereby the Master Control takes an Order Event input from the POS and directs the appropriate Packaging Module subsystem to package and deliver an appropriate portion of product. A secondary loop is the "Buffer Replacement" loop, where the Master Controller receives an Inbound Event signal from the Packaging Module that its buffer inventory of ready-to-package fried product is low and additional product must be dispensed and fried. As currently specified, all products other than salted French fries typically can have a default buffer inventory of zero, meaning that an order for that (other) product will immediately initiate a full dispense-fry-package (if packaged by the System) production routine.

In accordance with one aspect of this embodiment of the Control System, the Fryer Module vat operation is not directly controlled by the production demand cycle. Each fry vat of the fry module will operate continuously and on a pre-set uniform operating cycle. Frozen product is dropped into the fry module when additional inventory is called for. The product is fried according to the pre-set cooking cycle and then is dumped into the Packaging (or Protein) Module receiving apron. None of the cooking cycle is affected by order demands, or inventory conditions. In one embodiment, the Control System can vary the time between incremental rotation and speed of rotation of fry wheel 410 to accommodate for varying conditions, such as the level of cooking oil in the fry vat. The level of cooking oil can vary as a result of the amount of product that is being fried in a particular fry vat, since product present in the fry vat displaces cooking oil, thereby raising the level of cooking oil in the fry vat particularly since the product is held below the cooking oil surface during a cooking cycle. Preferably, to ensure the workstation reliability and system uptime, extensive control redundancy can be provided. As a result, the control subsystems for each Fryer Module vat and each Dispensing Module chute are designed and constructed as individual units that operate even if one or more subsystem fails.

Additionally, the control of the Dispensing Module freezer environment and operation can be an independent subsystem.

Preferably, the Control System includes the capability to operate all modules individually. This allows the operator to disconnect and remove a module from the network and operate the remaining modules in a semi-automatic method, manually performing some of the operations. Preferably, there are controls on each module that permit an operator to operate that module's functions locally.

Orders for product are preferably processed sequentially as they are received, although the specific products within a customer order may be arranged in a logical manner as desired. The Monitor will display all products being processed by the workstation from the time the order is received until it is removed from the workstation. The status of each product that is ordered can be tracked in its various stages including, for example, on order, packaged and ready to pick up, ready to manually package, and held too long.

Preferably, products in the process of being fried can also be tracked, and cooking times for each basket in each wheel will count down to when product is ready to package.

Master Controller

In one embodiment, the Master Controller 110 hardware may suitably comprise, or equivalent:

Intel Pentium III (or higher) with 1.0 GHz (or higher) CPU
Ethernet network interface and hub
256 MB (or more) system RAM
20 GB (or more) hard disk drive
Touch-Screen Monitor Interface
Plug and Play Touch-Screen Monitor
SCK Gateway (Ethernet)
Interconnect cabling (as needed)
Optional Keyboard and pointing device (mouse) for installation and maintenance purposes Typical operating system software requirements are:
Windows 2000 professional (or server) SP4 or higher
A suitable Database Server, such as Fast SCK Version 3.0 (or higher) from Fast, Inc. of Stratford, Conn.
Fast SCK Version 3.0 (or higher) Utility Applications (SCK Editor, SCK Engine, SCK Events, and SCK Site Editor) from Fast, Inc.

The Subsystem Interface Modules provide the functionality to communicate specific control events (information) conditions, and/or commands to and from the Master Controller. These modules typically can be incorporated into the circuitry of controller boards. In cases where the network needs to interface with a control subsystem (such as PLCs, for example), appropriate imbedded memory interface (input-output) circuit cards known in the art can be utilized. All of the foregoing hardware and software or equivalent is readily available or can be produced by those skilled in the art.

Fryer Controller

The frying of the frozen product is controlled by a combination of cooking oil temperature and the time the frozen product is immersed in the cooking oil. Frying is accomplished by moving the frozen product through the heated cooking oil by a rotating fry wheel. As previously described, a programmable stepper or other motor can provide the desired precisely controlled movement of the fry wheel.

The following Table I lists typical control parameters and several optional parameters that can be used, if desired.

TABLE I

Fryer Module Control Signals
(One set for each of 4 Product Lanes)

| Description | Input | Output | Op. Adj. |
|---|---|---|---|
| Set Temperature | X | | X |
| Actual Temperature | | X | |
| "Ready" Band Width | | X | |
| Temperature Offset | X | | |
| C or F | X | | X |
| Probe #1 | X | | |
| Heater Relay #1 | | X | |
| Total Cook Time | X | | X |
| Jog Speed | X | | |
| Jiggle Time | X | | |
| Cleaner Level | | X | |
| Oil Fill | | X | |
| Cleaner Fill | | X | |
| Probe #2 | X | | |
| Heater Relay #2 | | X | |
| Flex Time | X | | |

Figure 71:
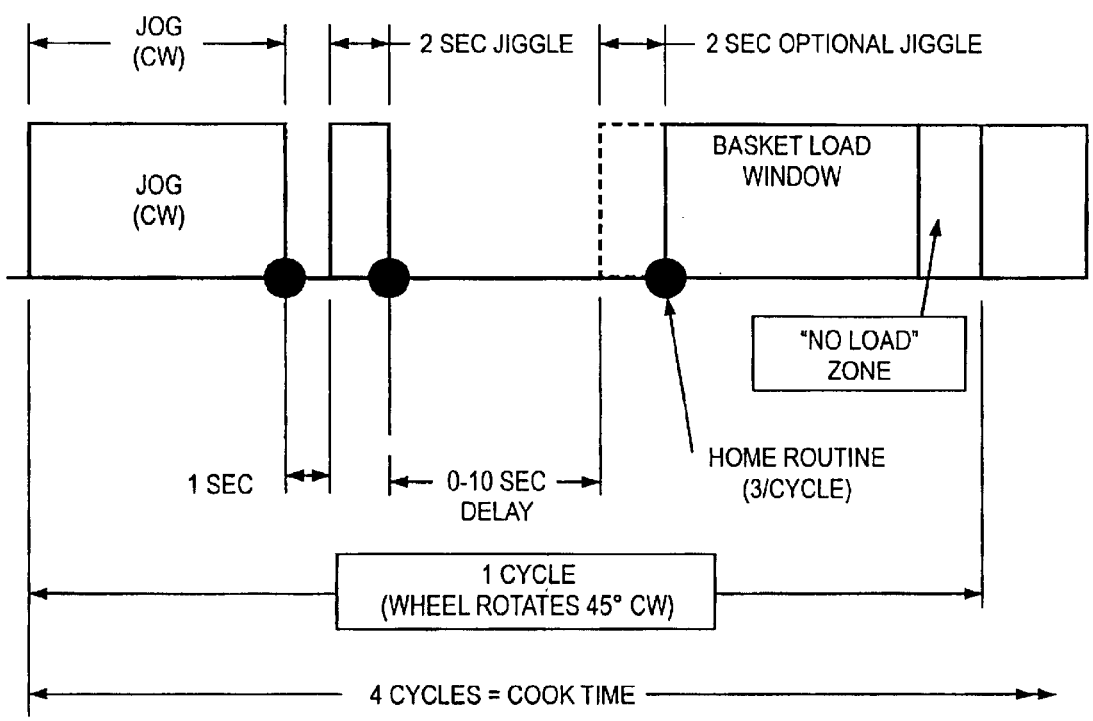
FIG. 71 is a diagrammatic view of a frying cycle in accordance with the present invention.

FIG. 71 depicts a typical motor/fry wheel/basket cycle. Virtually every parameter can be fixed or adjustable as desired. For example, during one typical cycle, which may be for a preset period of time that is one-quarter of the cooking time for food contained in a compartment, fry wheel 410 is rotated clockwise 45° in the direction of arrow K of FIG. 13. After some period of time after the 45° incremental rotation, a basket shaking simulation of back and forth rotation occurs over a period of about two seconds. After a 0 to 10 second delay, another basket simulation shaking occurs. Thereafter, a period of time ("Basket Load Window") is available for loading another compartment, such as compartment 436 with a charge of French fries or other food to be fried. Thereafter, a "no load zone" or relatively short period of time towards the end of the cycle is set aside just prior to another 45° fry wheel 410 rotation in the direction of arrow K, which commences another cycle. During each cycle, three "home routines" can be employed, one after each rotation of fry wheel 410 to accurately locate fry wheel 410 so that it is properly positioned with the upper end of compartment bottom 508 of one of fry wheel 410 compartments adjacent discharge 498 and another of the compartments properly aligned to receive a charge of French fries or other food to be fried, such as from food dispensing device 200.

To ensure proper operation of the basket/fry wheel, including positioning the unit precisely for smooth loading and complete unloading, the basket/fry wheel position must be constantly synchronized. To do this, a "homing" sensor circuit can be utilized that resets the home position after every move of the wheel. This sensor preferably is electromagnetic and is impervious to dirt and grease build up and has no moving parts although any suitable sensor can be used.

Dispensing Controller

The Dispensing Module control system 114 separates functions by the product delivery lane they support. In one embodiment, where there are four delivery lanes, there are four control subsystems. Each subsystem controls a vibrating product conveyor, a portioning load cell, and a dump actuator. Additionally, there are optional module configurations that affect the controls design. If lanes 1, 2, and/or 3 are configured with bulk food hoppers, a product level sensor can be provided to alert operators to reload frozen product before the hopper is empty. If each of lanes 2, 3 and/or 4 are configured with an array of coil magazines for food items, the controls must sequentially switch power to each of the motors in the lane to maintain a constant flow of frozen product.

Table II lists defined control signal parameters for each of the Dispensing Module Lane controllers:

TABLE II

Dispensing Control Signals
(One set for each of 4 Product Lanes)

| Description | Input | Output |
|---|---|---|
| Load - Small Qty. | X | |
| Load - Large Qty. | X | |
| Load Coil A | X | |
| Load Coil B | X | |
| Load Coil C | X | |
| Load Coil D | X | |
| Load Coil E | X | |
| Ready to Dump | | X |
| Vibrator Frequency | X | |
| Bulk Fill Level | | X |
| Time Out | | X |
| Overweight | | X |
| Clean Out | X | |

Freezer Controller

In addition to properly dispensing products into the Fryer Module, the dispensing device 200 control 114 must also maintain a proper frozen environment for all products. To accomplish this, another controller subsystem can be provided. Table III lists the applicable control signal parameters for the freezer subsystem. A safety circuit interrupts all dispensing activity when the aisle door is opened.

TABLE III

Freezer Control Signals

| Description | Input | Output | Op. Adj. |
|---|---|---|---|
| Set Temperature | X | | X |
| Actual Temperature | | X | |
| Aisle Door Open | | X | |

The separation of the Dispensing Module controls into these five subsystems when there are five makes for a convenient mechanical arrangement in the base of the module, and allows for the required flexibility given the configuration options.

In one embodiment, for manual operation, four "dispense" buttons are provided, one for each lane. One button would cause the release of a pre-set portion of the frozen product for that lane. The controls preferably should be located so the operator could by visual observation determine the appropriate Fryer basket to make sure the product dispenses into the proper basket.

Packaging Controller

Packaging Controller 118 for the Packaging Module incorporates several event signal generators for the control system to sense or read. The main Packaging Module or device 600 elements are depicted in FIGS. 25–29. In one embodiment, the Packaging Module or device control system includes two subsystems within the Packaging Module, the packaging subsystem and the heated food storage device 635 that can be used in place of packaging device 600.

The Packaging Subsystem

The packaging control subsystem initially interfaces with the Packaging Module PLC and sends packaging device 600 a signal to start the sequential operation of packaging one of an appropriately-sized portion of French fries. The actions and reactions of all the electromechanical devices (e.g., container handling system 610, dispensing member 606, overflow member 613, load cell 702 and chute mechanism 608) can be, if desired, sequenced and controlled by the local on-board controller (i.e., PLC) and not Master Controller 110.

Once the automated arm 764 sets the filled package of fries on conveyor 614 and the receptacle load gate 926 opens to allow receptacle 612 to move to the pick up area, a signal will be sent back to Master Controller 110 indicating that the particular order of fries is ready for pick up. Until that receptacle 612 moves to the return gate 928 (located at the operator right front of the Packaging Module) and the gate permits receptacle 612 to move therepast after receptacle 612 is empty, Master Controller 110 will believe (and display) that the order of fries is waiting to be picked up. Preferably, the crew member will pick up fries from right to left to ensure that the order sequence is followed and that the oldest fries are served first.

Because the number of receptacles 612 that can fit between gate 926 and return gate 928 typically is limited, Master Controller 110 intelligence preferably keeps track of how many orders of fries are in the pick up cue. This allows audible/visual alerts to be triggered on the Monitor to remind the crew that orders have been waiting. Also, even if orders are picked out of sequence, the Master Controller will remember what was on an empty receptacle 612 and clear it when it passes return gate 928.

Preferably, the Master Controller is configured to remember the hold time of each packaged fry order. If the order has not been picked up in time, the Monitor will alert the operator by audible/visual signal to "waste" that order.

The Secondary Loop

The remainder of the Packaging Module or device 600 control 118 functions address the secondary loop, "buffer inventory replacement." Preferably, there are two typical system requirements for the buffer inventory: (1) there must be a minimum amount of fries in member 606 or chute mechanism 608 to completely fill the next packaging order (that is, one portion of a given size); and (2) the buffer inventory is low and needs to be replenished.

For the first requirement, if there is insufficient buffer inventory to fill the package, chute mechanism 608 is disabled and an error message alarm is sent. This condition should not happen, but the control intelligence prevents packaging device 600 from under filling an order.

During normal operations, the level of fries in the buffer inventory will drop to a level where an inventory replenishment order will be initiated. In that event, Master Controller 110 can signal dispensing device 200 to start its fill sequence. This process should typically start soon enough that the replacement product can be fried, salted, and added to the dispensing member 606 before the "out-of-product" condition is reached. The KMS data can be integrated into the Master Control intelligence to help insure that there is replacement product in process before the actual need arises. This capability minimizes order delivery delays while also preventing the dispensing member 606 inventory growing beyond actual need.

The dispensing member 606 inventory can be managed in a number of ways, as desired. For example, any of the following can be utilized and implemented by one of ordinary skill in the art: (a) direct sensors; (b) a load cell that constantly weighs the buffer inventory; and (c) a dynamic empirical calculation.

The dynamic empirical calculation embodiment uses the Master Controller to constantly calculate how much product has been added to dispensing member 606, and subtract out the portion packaged, any bonus amount, waste, and a safety factor. This empirical total will then be compared to pre-set "reload" levels. The formula may also include how much product is in process. In all cases, the buffer inventory level can be adjusted during the day to reflect actual sales levels.

The controls system design for all other (i.e., non-salted French fries) products is that the same control process would be used, but that the "buffer inventory" for those products would be defaulted to zero. That is, an order for hash browns would immediately signal an "out-of-inventory" condition and launch an "inventory replacement" command to the dispensing device 200. Later, if the need arises, controller intelligence would allow the operator to utilize some buffer inventory for these products.

Optionally, a provision can be made for unsalted French fries. Unsalted French fries would be handled like the non-French fries products. When an order for unsalted French fries is received, Master Controller 110 will signal the Packaging Module to move diverter bar 605. The next load of French fries coming from the Fryer Module will then be diverted to a portion of chute 604 of packaging device 600 for manual packaging. The extra unsalted fries can be manually returned to chute 604.

An important feature of the automated system is to maintain product integrity. One facet of that is to dispose of product that has exceeded its authorized holding time. Master Controller 110 will remember when each load of French fries came out of fry device 400. The mechanical design of packaging device 600 assures a substantially "first in—first out" product movement. How long the "oldest" fries have been in dispensing member 606 is tracked by Master Controller 110 or packaging device controller 118, as desired. Whenever the allowable holding time has been reached, Master Controller 110 will signal the Packaging Module subsystem Controller 118 to start the buffer waste cycle (or the packaging device Controller 118 can directly control this function). It is possible that some French fries in the buffer will not have reached their limit, but through control parameter refinement, this can be minimized. Table IV lists the control signals for one embodiment of the packaging control subsystem:

TABLE IV

Packaging Control Signals

| Description | Input | Output | Op. Adj. |
| --- | --- | --- | --- |
| Package #1 | X | | |
| Package #2 | X | | |
| Package #3 | X | | |
| Package #4 | X | | |
| Divert Fries | X | | |
| Produce #5 | X | | |
| Produce #6 | X | | |
| Produce #7 | X | | |
| Produce #8 | X | | |
| Produce #9 | X | | |
| Dump Buffer | X | | |
| Buffer Low | | X | |

TABLE IV-continued

Packaging Control Signals

| Description | Input | Output | Op. Adj. |
|---|---|---|---|
| Buffer Full |  | X |  |
| Receptacle Loaded |  | X |  |
| Receptacle Empty |  | X |  |
| Time out - System 610 |  | X |  |
| Product #5 - 9 Picked |  | X |  |

Holding Controller

The other control subsystem is that dedicated to holding product at proper temperatures. Generally, a standard temperature controller with timer channels to manage all holding functions can be utilized, as is known in the art.

Table V lists the various control parameters for the holding control subsystem for food holding device 635:

TABLE V

Holding Control Signals

| Description | Input | Output | Op. Adj. |
|---|---|---|---|
| Buffer Temp Set | X |  | X |
| Buffer Temp Act |  | X |  |
| Pick Up Temp Set | X |  | X |
| Pick Up Temp Act |  | X |  |
| Apron Temp Set | X |  | X |
| Apron Temp Act |  | X |  |
| Holding Temp Set | X |  | X |
| Holding Temp Act |  | X |  |
| Holding Time #1 Start | X |  |  |
| Holding Time #1 End | X |  |  |
| Holding Time #2 Start | X |  |  |
| Holding Time #1 End | X |  |  |

Touch-Screen Monitor

The Touch-Screen Monitor is the primary system user interface and can be considered part of the Master Controller configuration. The Monitor has four main functions: (1) display the status of fried foods orders; (2) allow the operator to manually control the system; (3) alert the operator to any needed manual intervention; and (4) allow the operator to reconfigure the workstation and/or change the individual operating parameters.

Figure 72:
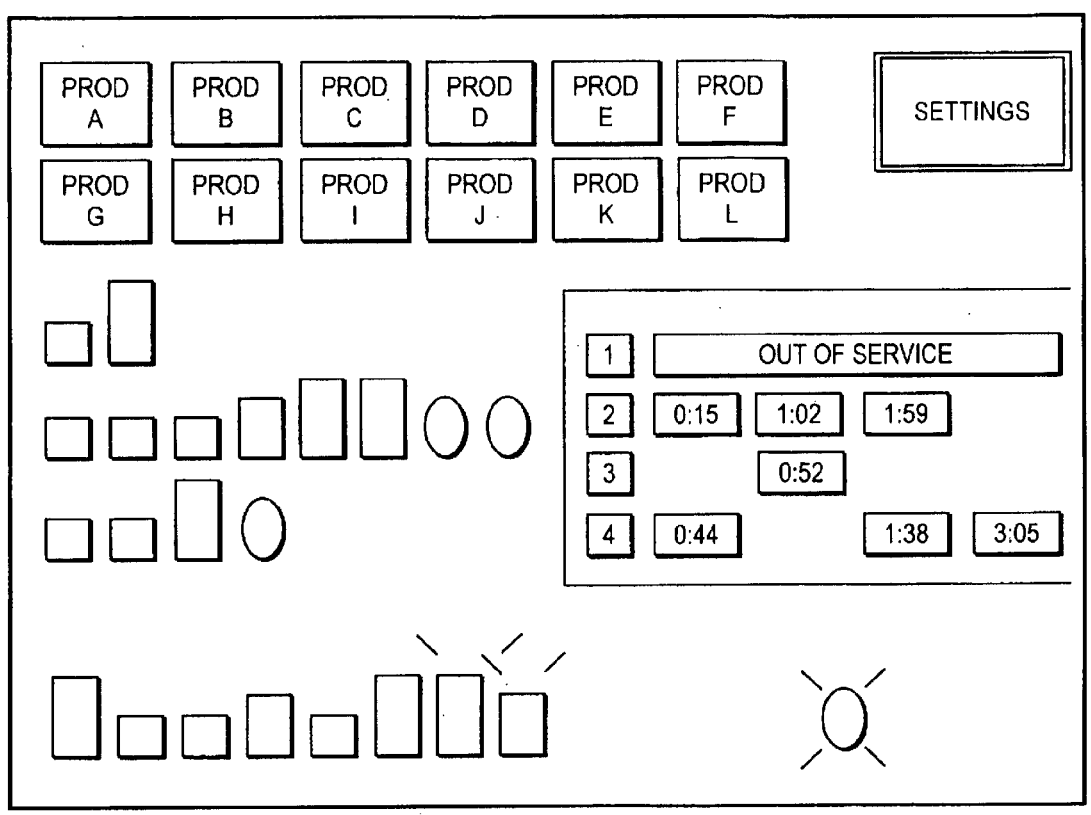
FIG. 72 is a schematic illustration of a sample touch screen monitor useful in accordance with the invention.

The Monitor display can be configured as desired. Preferably, the main display menu is simple, uncluttered and only presents the basic information needed to track ongoing order status. A sample Monitor display layout is shown in FIG. 72.

In the illustrated embodiment, products on order would appear as horizontal rows of the appropriate product (type and portion size) icon, reading from the left edge of the screen. All products from a single POS customer order would appear on a single line. As additional POS orders are entered, the screen would refresh, moving the older orders down a line. Products on order, and not yet ready for pick up would appear as gold icons.

Across the bottom of the screen would appear the same number of locations as there are packaging device 600 receptacles 612 in the pick up zone. As packages of fries are placed on receptacles 612 and the receptacles 612 travel within the pick up zone, the appropriate icon will disappear from the "on order" line and reappear as a green icon in the spot where its receptacle is. When a package is removed from a receptacle and that receptacle passes return gate 928, the display icon will disappear from the screen.

In one embodiment, should the "hold timer" for a packaged product expire before it is picked up, its green icon will change color (i.e., to red) and/or flash. In another embodiment, an audible alarm can be provided as well, indicating clearly that this product should be wasted.

Across the top of the screen is a line of control "buttons." There can be one for each product (again, type and portion size). The system is programmed so that touching the button on the screen will enter an order for one each of that product. There is also a screen button at the upper right corner of the screen that enables the operator to change the screen display to the "Settings" screen.

Figure 73:
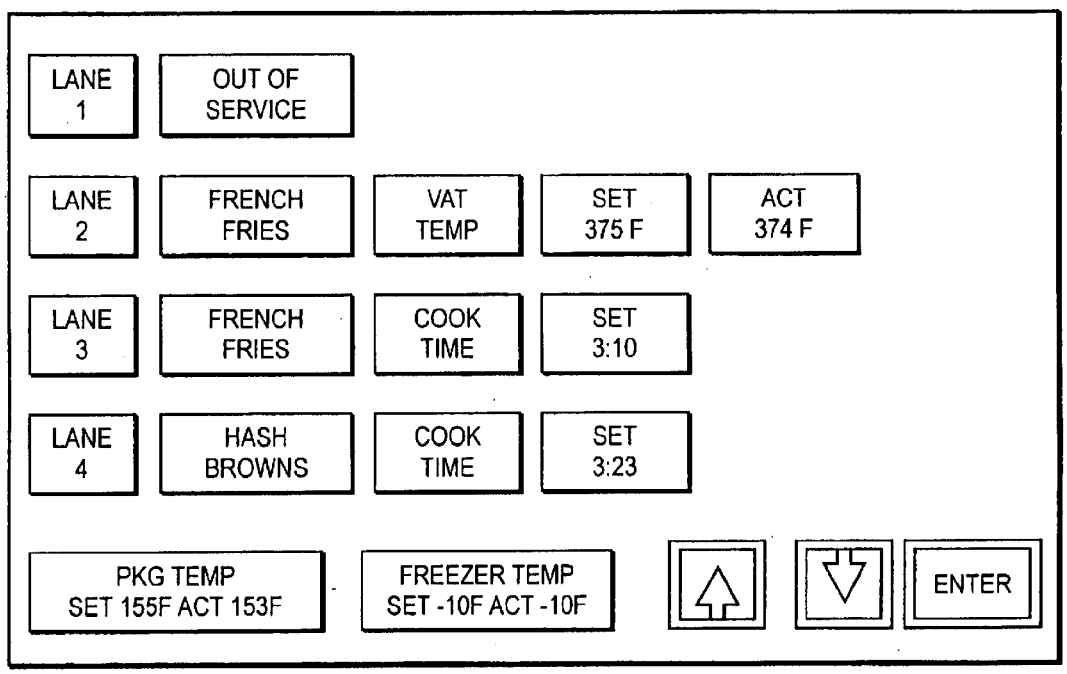
FIG. 73 depicts another touch screen layout in accordance with the present invention.

The "Settings" screen layout is depicted in FIG. 73. From this screen, the operator may now configure all the operating settings for the product to be run in each product lane. The individual settings may include dispensing load size(s), fry vat temperature, cooking cycle time, buffer inventory level, packaging device Module heater setting, and other settings as desired. In this embodiment, all settings for a particular product are linked to that product. The operator can merely scroll in each product lane and signify the product that will be run in it. Master Controller 110 will then set all operating parameters for that product. If it is necessary to check or adjust an individual control setting (such as cook time), the operator can scroll through the items in the "settings" box for that lane and product. Then, using the "up" and "down" keys, readjust the setting and press the "enter" key to reset.

If required, a secure "manager only screen" can be configured to allow someone to adjust and/or reset selected operating parameters. Access to this screen and these settings would require some type of password to prevent any non-authorized store employee from changing basic system parameters.

Operator alert messages or alarms (e.g., bulk product low—refill now: "bridging/time out"—clear lane 2; etc.) will appear as an "error message box" in the center of the screen, along with some type of audible alarm.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A device for the automated frying of foods comprising:
   (a) a fry vat for containing and heating cooking oil;
   (b) at least one circular fry wheel having at least a generally circular perimeter and a plurality of compartments each having an opening towards the perimeter, the fry wheel mounted for rotational movement relative to the radial axis of the wheel which radial axis is disposed above a normal operating level of the cooking oil in the fry vat;
   (c) a drive mechanism for rotating the fry wheel;
   (d) a control system for causing the drive mechanism to periodically rotate the fry wheel back and forth through a degree of angular rotation to simulate shaking of a fry basket.

2. The device of claim 1 wherein said degree of angular rotation is in the range of from about 2 to about 20 degrees.

3. The device of claim 1 wherein the back and forth rotation in one direction is of a larger angle of rotation than the rotation in the other direction.

4. The device of claim 1 wherein the control system further causes the drive mechanism to rotate the fry wheel in one direction to cause food deposited into one of the compartments to travel through the cooking oil in the fry vat over a period of time to fry the food and out of the cooking oil for subsequent discharge of the food from the compartment.

5. The device of claim 1 wherein the fry wheel comprises a hub, a circular rim, a plurality of spokes connecting the hub to the rim and a plurality of fry baskets secured to spokes.

6. The device of claim 4 wherein the control system causes periodic incremental rotation of the fry wheel.

7. The device of claim 6 wherein the periodic incremental rotation is based on 360 degrees divided by the number of compartments.

8. The device of claim 1 wherein the fry wheel comprises a rim and the drive mechanism comprises a roller and means for urging the roller against the rim.

9. An automated method of frying food comprising:
(a) placing food in a fry wheel compartment of a fry wheel having at least a generally circular perimeter and a plurality of compartments each having an opening towards the perimeter, the fry wheel mounted for rotational movement relative to the radial axis of the wheel which radial axis is disposed above a normal operating level of the cooking oil in a fry vat having heated cooking oil therein;
(b) rotating the fry wheel so that the compartment containing the food travels submerged in the heated cooking oil; and
(c) periodically rotating the fry wheel back and forth through a degree of angular rotation to simulate shaking of a fry basket while the food is submerged in the cooking oil.

10. The method of claim 9 wherein said degree of angular rotation is in the range of from about 2 to about 20 degrees.

11. The method of claim 9 wherein the periodic rotation in one direction is of a larger angle of rotation than the rotation in the other direction.

12. The method of claim 9 wherein said rotating the fry wheel so that the compartment containing the food travels submerged in the heated cooking oil comprises rotating the fry wheel in one direction to cause food deposited into one of the compartments to travel through the cooking oil in the fry vat over a period of time to fry the food and out of the cooking oil for subsequent discharge of the food from the compartment.

13. The method of claim 12 wherein the said rotating the fry wheel so that the compartment containing the food travels submerged in the heated cooking oil further comprises periodic incremental rotation of the fry wheel.

14. The method of claim 13 wherein the degree of periodic incremental rotation is based on 360 degrees divided by the number of compartments.

* * * * *